(12) United States Patent
Okazaki

(10) Patent No.: US 8,125,120 B2
(45) Date of Patent: Feb. 28, 2012

(54) VIBRATION DEVICE, ANTIDUST DEVICE, CAMERA, VIBRATION DEVICE INSPECTION METHOD, METHOD FOR MANUFACTURING VIBRATION DEVICE AND VIBRATION METHOD

(75) Inventor: Mitsuhiro Okazaki, Saitama (JP)

(73) Assignee: Nikon Corporation, Tokyo (JP)

( * ) Notice: Subject to any disclaimer, the term of this patent is extended or adjusted under 35 U.S.C. 154(b) by 263 days.

(21) Appl. No.: 12/320,270

(22) Filed: Jan. 22, 2009

(65) Prior Publication Data
US 2009/0206698 A1 Aug. 20, 2009

(30) Foreign Application Priority Data

Feb. 15, 2008 (JP) ................................. 2008-035078
Feb. 15, 2008 (JP) ................................. 2008-035093

(51) Int. Cl.
*H01L 41/04* (2006.01)
*H01L 41/09* (2006.01)
(52) U.S. Cl. ...................... 310/317; 310/313 R; 310/328
(58) Field of Classification Search ............... 310/313 R, 310/313 A, 313 B, 313 C, 313 D, 317, 323.01–323.21, 328
See application file for complete search history.

(56) References Cited

U.S. PATENT DOCUMENTS

| 5,729,263 | A | * | 3/1998 | Thiel et al. ...................... 347/71 |
| 7,215,372 | B2 | | 5/2007 | Ito et al. |
| 7,224,102 | B2 | * | 5/2007 | Miyazawa ............... 310/323.02 |
| 7,324,149 | B2 | | 1/2008 | Takizawa et al. |
| 2004/0263669 | A1 | | 12/2004 | Kobayashi |
| 2007/0292126 | A1 | * | 12/2007 | Oshima ......................... 396/429 |
| 2008/0055459 | A1 | | 3/2008 | Ito et al. |
| 2008/0252171 | A1 | * | 10/2008 | Kirigaya et al. .......... 310/313 D |

FOREIGN PATENT DOCUMENTS

| JP | A-2003-333395 | 11/2003 |
| JP | A-2007-193126 | 8/2007 |
| JP | A-2007-228246 | 9/2007 |

* cited by examiner

*Primary Examiner* — Derek Rosenau
(74) *Attorney, Agent, or Firm* — Oliff & Berridge, PLC

(57) ABSTRACT

A vibration device comprising; a vibrator which generates bending vibration on a predetermined member, a controller which controls a driver to drive the vibrator, wherein; the vibrator comprises a plurality of driving electrodes electrically insulated respectively, the controller controls the driver to make phases of driving signals respectively output to the plurality of driving electrodes changeable relatively and adjust an order of the bending vibration.

34 Claims, 33 Drawing Sheets

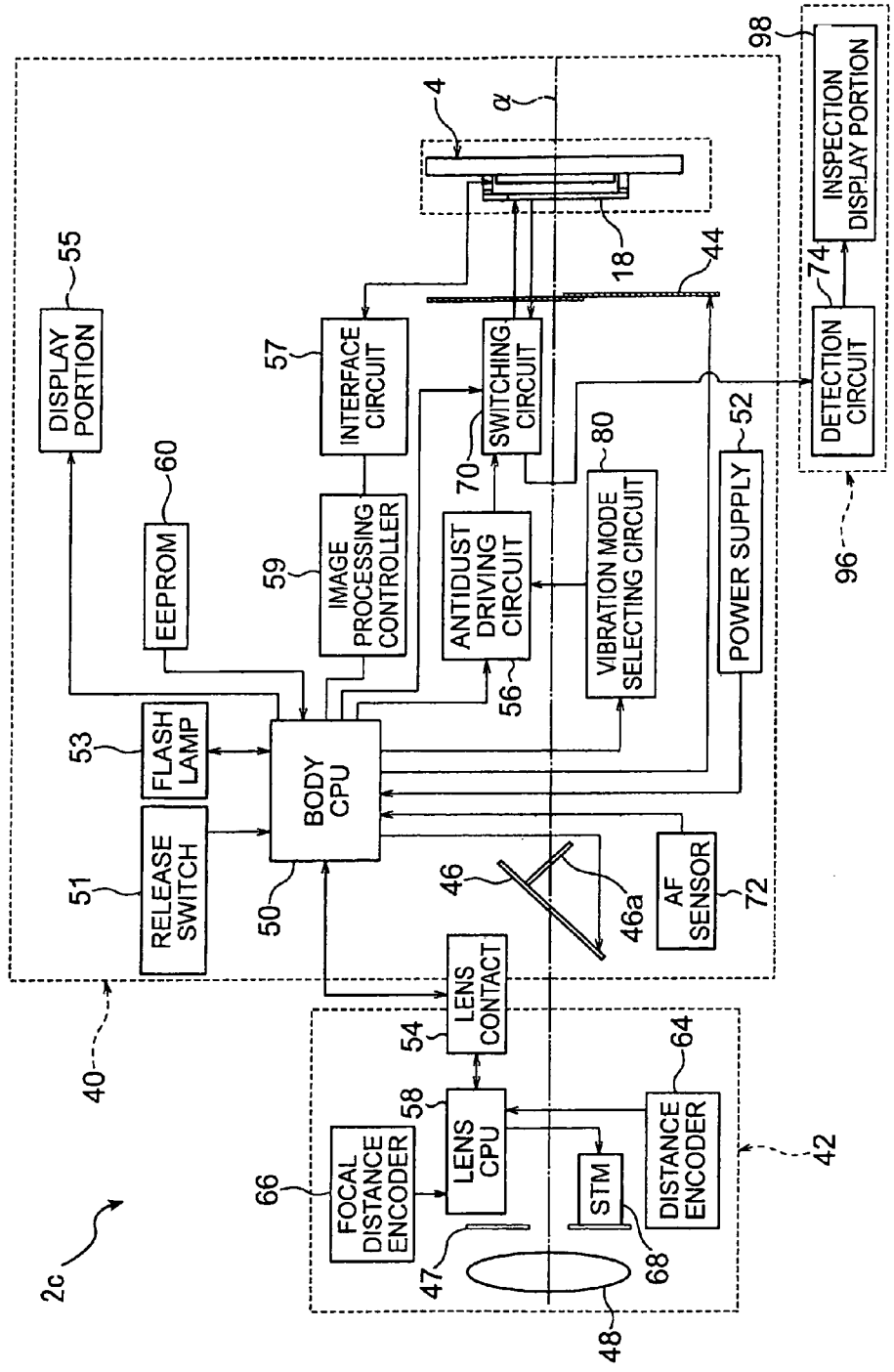

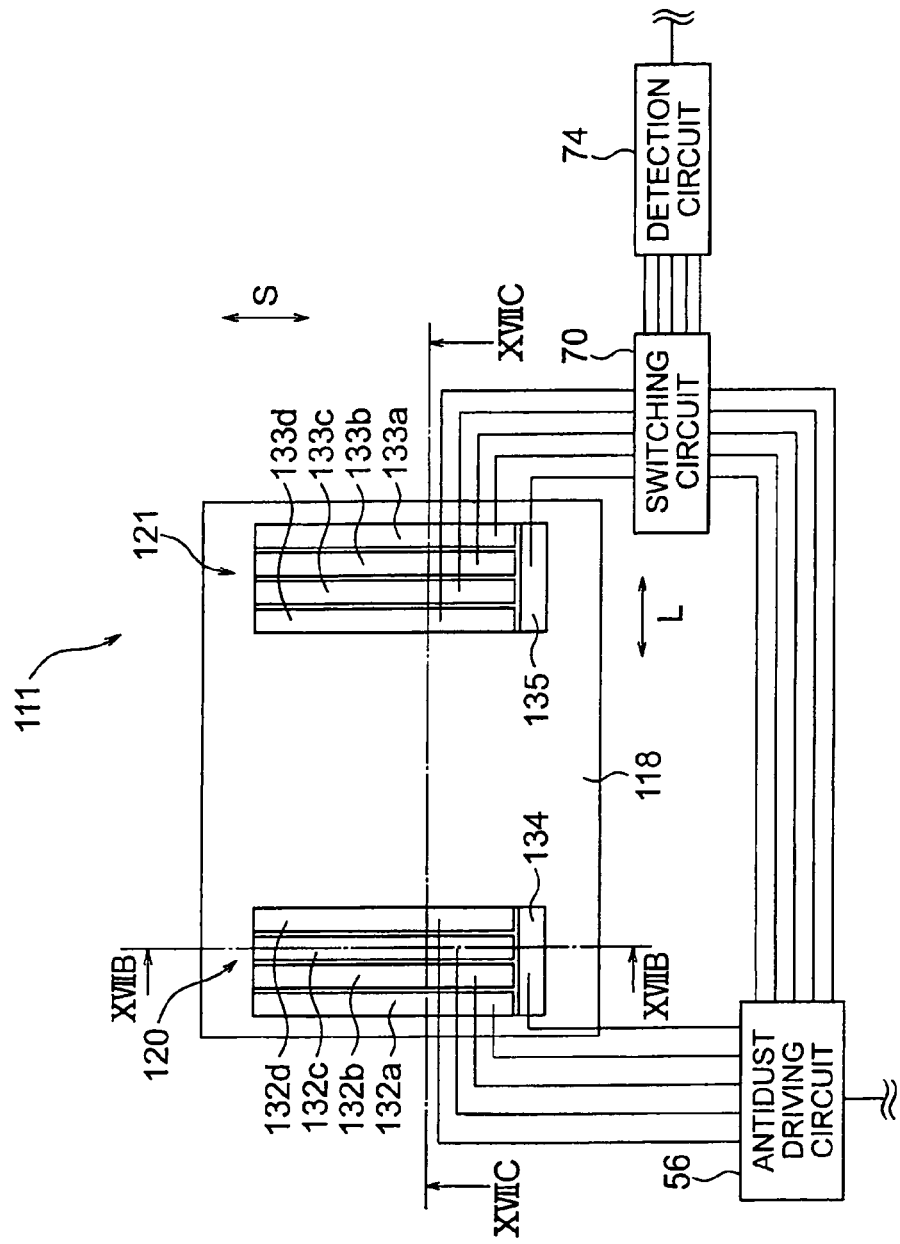

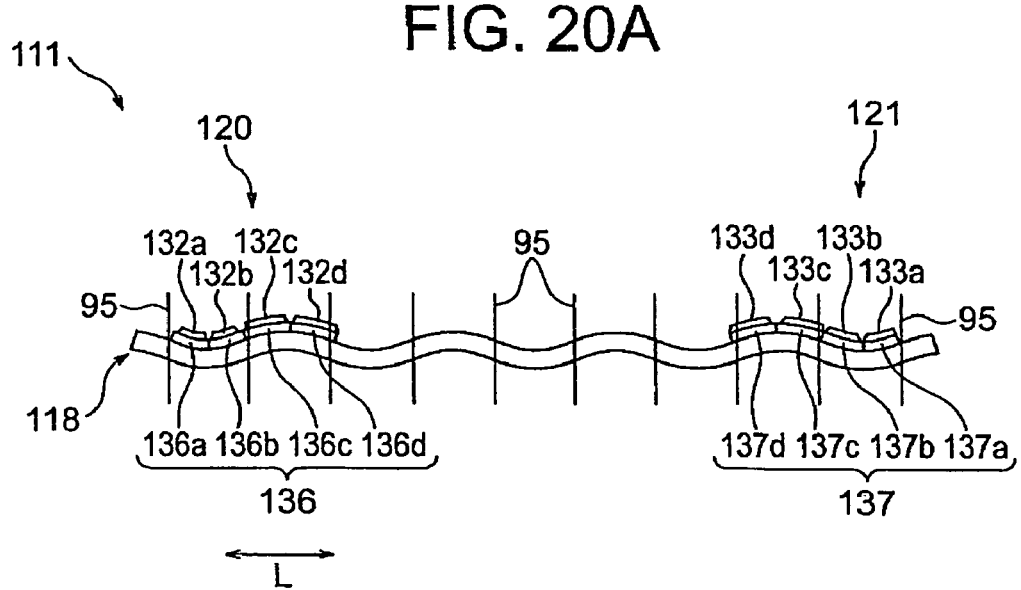
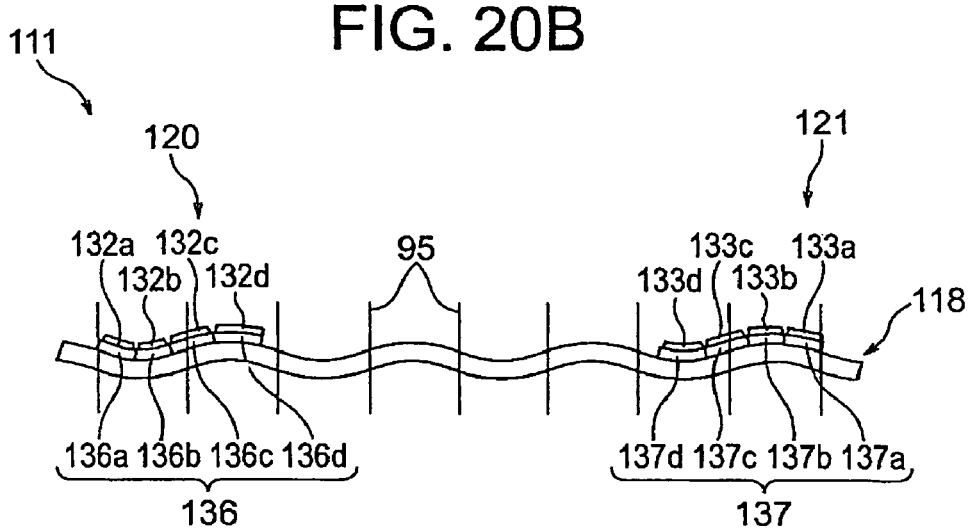

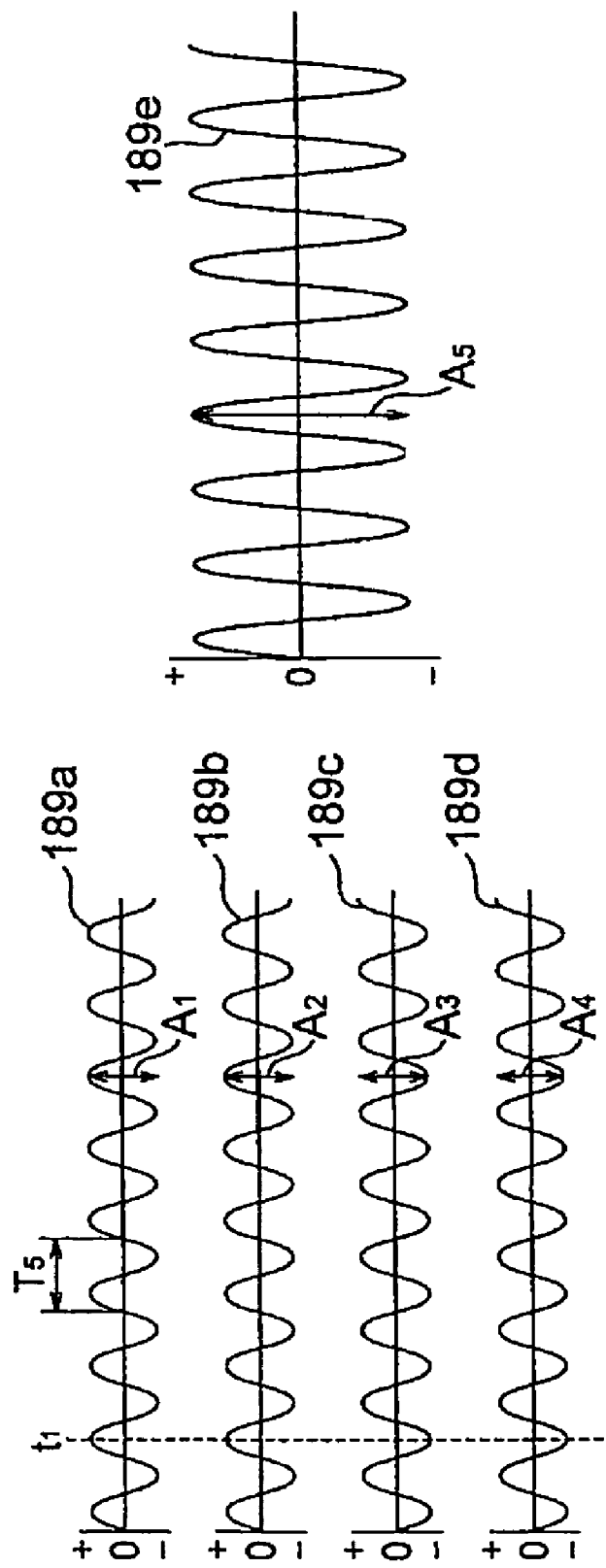

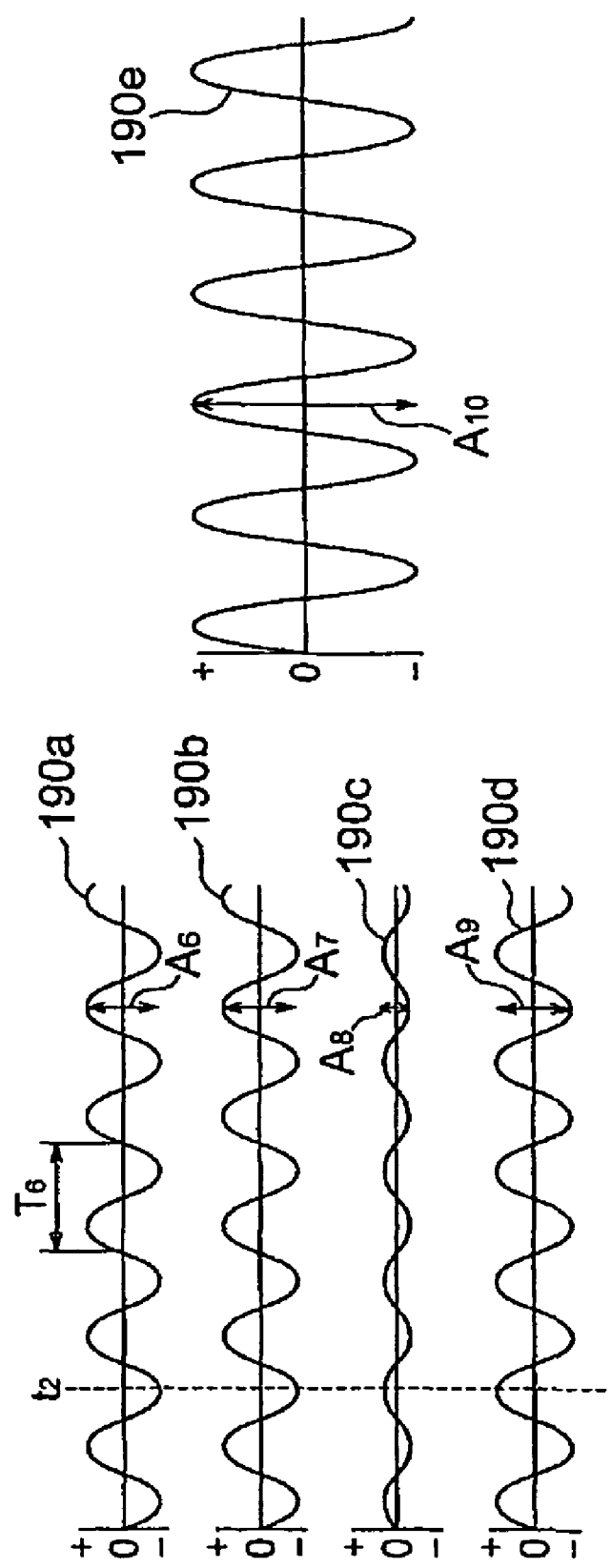

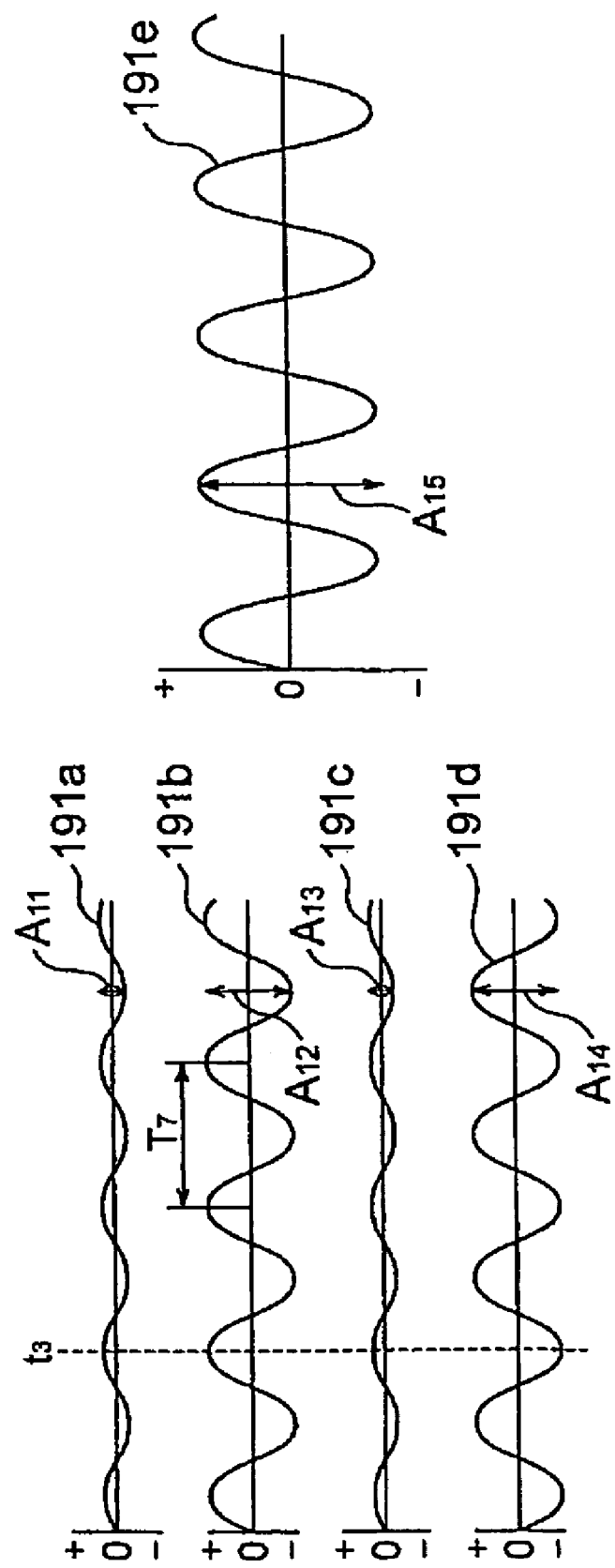

VIBRATION DEVICE, ANTIDUST DEVICE, CAMERA, VIBRATION DEVICE INSPECTION METHOD, METHOD FOR MANUFACTURING VIBRATION DEVICE AND VIBRATION METHOD

BACKGROUND

1. Field of the Invention

The present invention relates to a vibration device and the like, more precisely, relates to a vibration device and the like so as to occur vibration efficiently.

2. Description of the Related Art

In recent years, in a lens interchangeable digital camera and the like, there are problems such that dust is shown in a taken image due to adherence of the dust on a surface of a filter of an image pick-up element. In order to solve such problems, a system has been developed that an antidust member, to which a piezoelectric element is attached, is provided between an image pick-up element and an optical system, to remove the dust on the antidust member with a standing wave integrated on the antidust member by the piezoelectric element and the like (JP Patent Publication No. 2003-333395). Also, it has been known that there is another system comprising a sensing electrode to detect vibration status of a filter surface.

However, according to conventional systems, since an acceleration of the standing wave occurred on a vibration node is so small, it has been difficult to remove dust attached on the node. According to the conventional sensing electrode, for example, an output detected by the sensing electrode in a vibration mode such as overlapping a vibration node position and the sensing electrode, there is sometime difficult to detect the vibration accurately.

SUMMARY

The present invention has been made due to considering these circumstances, and a purpose of the invention is to provide a vibrator, an antidust device the vibrator, and inspection method for the vibration device and the like.

In order to achieve the above purpose, a vibration device according to a first aspect of the present invention comprises, a vibrator which generates bending vibration on a predetermined member, a controller which controls a driver to drive the vibrator, wherein;

the vibrator comprises a plurality of driving electrodes electrically insulated respectively, the controller controls the driver to make phases of driving signals respectively output to the plurality of driving electrodes changeable relatively and adjust an order of the bending vibration.

Also, for example, in the case of varying the bending vibration order, when varying the bending vibration order, number of the driving electrodes existing between adjacent two vibration nodes may be changed.

Also, for example, the vibration device according to the present invention, number of the driving electrodes existing between adjacent two vibration nodes may be more than two.

Also, for example, the controller may change the phase of the driving signal relative to a positioning relation of the vibration node and the driving electrodes.

Also, for example, the driving electrodes may comprise a first driving electrode arranged at a position including a vibration node and a second driving electrode arranged at a position not including a vibration node, the driver may differ a phase of a driving signal to be output to the first driving electrode and a phase of a driving signal to be output to the second driving electrode.

Also, for example, in one of the vibration mode, the driver causes to differ a phase of driving signal to be output to a first driving electrode and a phase of a driving signal to be output to a second driving electrode in which the vibration node exists the first and second driving electrodes.

Also, for example, in one of the vibration mode, a phase difference of a driving signal to be output from the driver to a first driving electrode and a driving signal to be output to a second driving electrode positioned to sandwich one of the vibration nodes between the first and second driving electrodes may be 180° in one of the vibration modes.

Also, for example, a vibration device according to the present invention that, a plurality of the driving electrodes may be arranged between two adjacent the vibration nodes, and the driver is controlled that polar characters of the driving signals to be output to the plurality of driving electrodes arranged between the two adjacent vibration nodes are the same with each other.

Also, for example, the vibrator may comprise the vibrator comprises a piezoelectric element, and a common electrode arranged on the piezoelectric element opposite to the driving electrode, the driver outputs a driving signal so as to hold electric potential of the common electrode as substantially constantly.

Also, for example, the vibrator may comprise a piezoelectric element and a common electrode arranged on the piezoelectric element opposite to the driving electrode, the driver outputs the driving signals capable of holding electrical potential of the common electrode substantially constantly to the driving electrode arranged at a position where a vibration node is included.

Also, for example, the vibrator may comprise a piezoelectric element and a common electrode, the common electrode includes a first portion arranged on a first face of the piezoelectric element opposite to the driving electrode, and a second portion arranged on a second face of the piezoelectric element as bent from the first portion to sandwich the piezoelectric element An antidust device according to a second aspect of the present invention comprises the vibration device according to the first aspect of the present invention, wherein;

the predetermined member is a light transmissive member passing through a light guided by an optical system, and the light transmissive member is provided between an image pick-up element obtaining an image from the optical system and the optical system.

A camera according to a third aspect of the present invention comprises the antidust device according to the second aspect of the present invention.

A vibration device inspection method according to a fourth aspect of the present invention comprises steps of;

connecting at least one of the driving electrodes with a detector which detects a detection signal occurred by the driving electrode, instead of the driver, detecting the detection signal generated by the driving electrode connected with the detector to inspect vibration status of the predetermined member.

Also, in the vibration device inspection method according to the present invention, the driving electrode connected with the detector is arranged at a position where the vibration node is not included in at least one of the vibration modes.

A vibration device manufacturing method according to a fifth aspect of the present invention uses the vibration device inspection method according to the fourth aspect of the present invention.

A vibration device according to a sixth aspect of the present invention comprises;

a vibrator which occurs bending vibration having vibration node on a predetermined member, a driver which drives the vibrator, wherein;

the vibrator comprises a driving electrode electrically connectable with the driver, and a detection electrode may be electrically connected with a detector to detect vibration of the predetermined member.

Also, for example, a vibration device according to the present invention may comprise a plurality of the driving electrodes electrically insulated respectively, and a plurality of the detection electrodes electrically insulated respectively and provided with the driving electrodes respectively.

Also, for example, a vibration device according to the present invention may comprise a switcher to switch a first status that the detection electrode is connected with the detector and a second status that the detection electrode is connected with the driver.

Also, for example, the detection electrodes may be provided respectively at positions where displacement generated by the bending vibration are substantially synchronized with corresponding the driving electrodes.

For example, a vibration device according to the present invention may comprise a plurality of the driving electrodes electrically insulated respectively, wherein;

the driver may be controlled to make a voltage given to one of the driving electrode variable and generate vibrations having different orders.

Also, for example, the detector that a polar character of detection signal detected from the detection electrode may be adjusted in response to a polar character of a driving signal to be output to the driving electrode.

Also, for example, the driving electrode may be provided on one end portion of the predetermined member, and the detecting electrode may be provided on the other end portion of the predetermined member.

Also, for example, the vibrator may comprise a piezoelectric element and a common electrode arranged on the piezoelectric element opposite to the driving electrode, and the common electrode is provided on a surface of the predetermined member.

Also, for example, the predetermined member may be an optical component passing through a light guided by an optical system, and the optical component may be provided between an image pick-up element obtaining an image from the optical system and the optical system.

A camera according to a seventh aspect of the present invention comprises the antidust device according to the sixth aspect of the present invention.

A vibration device inspection method according to eighth aspect of the present invention is an inspection method for vibration device having a plurality of electrodes, vibrator which occurs bending vibration including vibration node on a predetermined member, and a driver which drives the vibrator, comprises steps of connecting the driver electrically with a first electrode of the vibrator, outputting a driving signal to the first electrode so as to occur the bending vibration, connecting electrically a detector which detects the bending vibration with a second electrode of the vibrator, and detecting the bending vibration based on a detection signal from the detector.

Also, for example, the detector may be connected with a display device which is available to display the detection signal.

Also, for example, a vibration device inspection method according to the present invention is that, the second electrode may be electrically connectable with the driver, a connection of the second electrode may be switched between the driver and the detector.

A vibration device inspection method according to ninth aspect according to the present invention uses the vibration device inspection method according to the eighth aspect of the present invention.

A vibration method according to a tenth aspect of the present invention comprises following steps;

generating bending vibration of a first order by using vibrator having a plurality of driving electrodes electrically insulated with each other, changing relative phases of driving signals to be output respectively to plurality of the driving electrodes, and generating bending vibration of second order to the predetermined member by using the vibrator.

Also, for example, a vibration method according to the present invention that number of the driving electrodes existing between adjacent two vibration nodes may different between the bending vibration of the first order and the bending vibration of the second order.

Also, for example, a phase of the driving signal may be changed relative with a positional relation of vibration node and the driving electrodes.

Also, for example, the driving signals may be different in phase between the driving electrode arranged at a position including vibration node and the driving electrode arranged at a position not including vibration node.

Also, for example, a phase of the driving signal is that there may be 180° phase difference of the driving signals between a first driving electrode and a second driving electrode arranged at a position where one vibration node is included between the first and second driving electrodes.

Also, in a vending method according to the present invention, polar properties of the driving signals may be conformed between the driving electrodes arranged between adjacent two vibration nodes.

BRIEF DESCRIPTION OF THE DRAWINGS

Below, the present invention will be specified based on embodiments shown in drawings.

FIG. 13 is a block diagram of a camera and an inspection device according to a third embodiment of the present invention;

FIG. 17A is a plane view of an antidust portion shown in FIG. 15 and FIG. 16;

FIG. 20A is a pattern diagram showing an antidust filter in a status that ninth-order bending vibration is added by a vibrator;

FIG. 20B is a pattern diagram showing an antidust filter in a status that eighth-order bending vibration is added by a vibrator;

FIG. 21A shows an example of a signal to be detected by a detecting electrode when ninth-order bending vibration is occurred;

FIG. 21B shows an example of a signal to be detected by a detecting electrode when eighth-order bending vibration is occurred;

FIG. 21C shows an example of a signal to be detected by a detecting electrode when seventh-order bending vibration is occurred;

DETAILED DESCRIPTION OF EMBODIMENTS

First Embodiment

Figure 1:
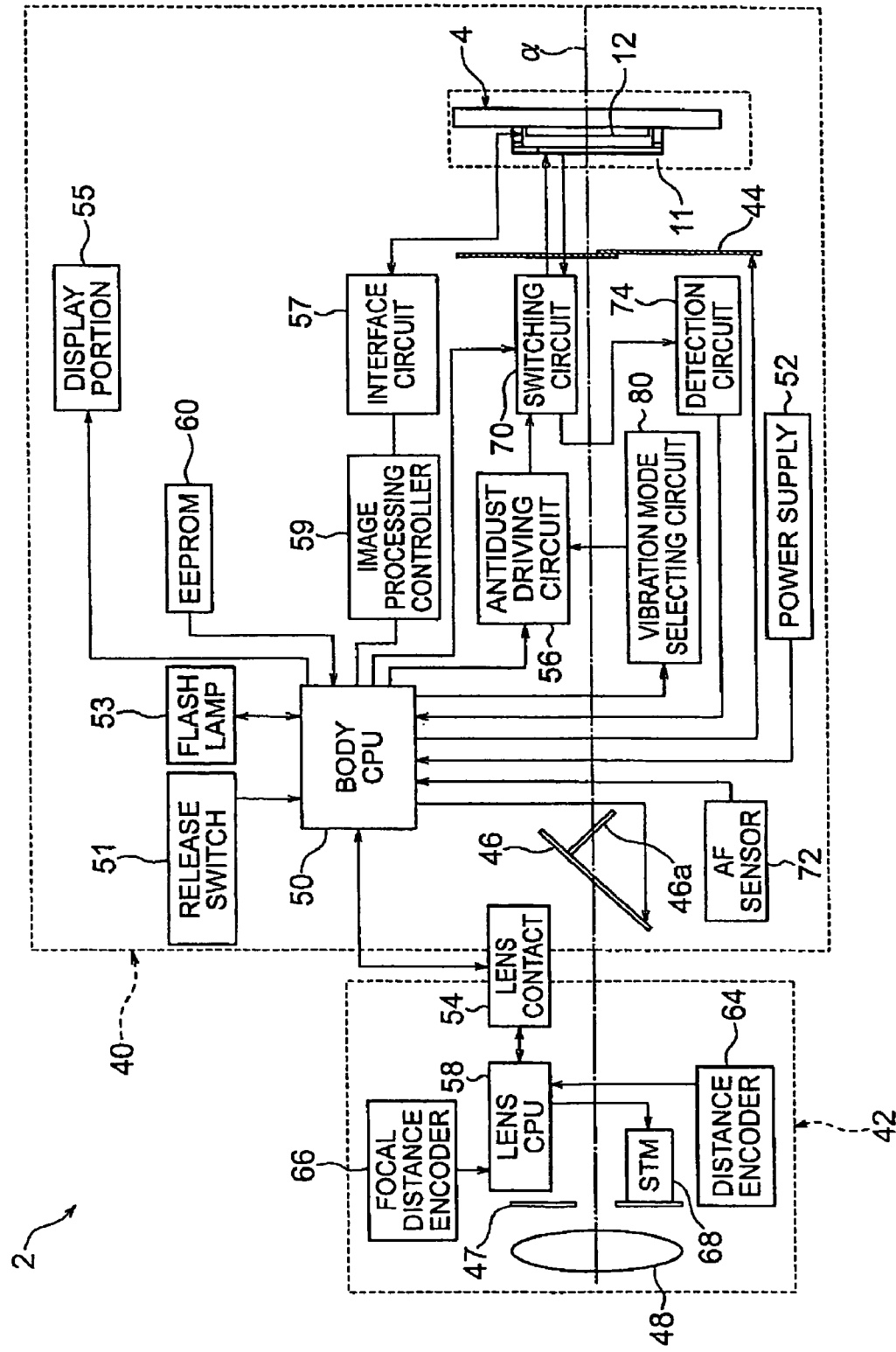
FIG. 1 is whole diagram of a camera according to one embodiment of the present invention.

Firstly, whole constitution of a camera 2 of the present embodiment will be specified based on FIG. 1. An imaging element unit 4 is provided in a camera body 40 so that an antidust portion 11 crossing substantially vertical to an optical axis α of optical lens group 48. With respect to the antidust portion 11, it will be specified later. Note that, in the camera 2, it will be specified as a direction from the imaging element unit 4 to the optical lens group 48 is a front side of the optical axis α, and a direction from the optical lens group 48 to the imaging element unit 4 is a back side of the optical axis α.

A shown in FIG. 1, a lens barrel 42 is detachably mounted to the camera body 40. There is a camera, in which the lens barrel 42 and the camera body 40 are integrated such as a compact camera, thus, a type of camera is not particularly limited.

In the camera body 40, a shutter member 44 is provided at a front side of the optical axis α of the imaging element unit 4. A mirror 46 is provided at a front side of the optical axis α of the shutter member 44, and a diaphragm 47 and an optical lens group 48 contained within the lens barrel 42 are arranged at a front side of the optical axis α of the shutter member 44.

A body CPU 50 is contained within the camera body 40 and is connected to a lens CPU 58 via a lens contact 54. The lens contact 54 causes electrically connecting the body CPU 50 and the lens CPU 58 by connecting the lens barrel 42 with the camera body 40. A power supply 52 is connected with the body CPU 50. The power supply 52 is contained within the camera body 40.

A release switch 51, a flash lamp 53, an display portion 55, EEPROM (memory) 60, antidust filter driving circuit 56, an image processing controller 59, AF sensor 72, a detection circuit 74, a vibration mode selecting circuit 80 and the like are provided to the body CPU 50. The image pick-up element 12 of the image pick-up element unit 4 (refer to FIG. 2) is connected with the image controller 59 via an interface circuit 57, and the image controller 59 enables to control an image processing taken by the image pick-up element 12. As the image pick-up element 12, a solid image pick-up element such as CCD and CMS and the like are used.

The body CPU 50 comprises a communication function with the lens barrel 42 and a control function of the camera body 40. For example, the body CPU 50 conducts a communication whether the lens barrel 42 is equipped completely, and calculates a target position from a focal distance and a distance information input from the lens CPU 58. When a signal showing a release switch 51 is pressed half-way is input to the body CPU 50, the body CPU 50 outputs a signal for preparing operation of capturing an image such as AE and AF, or the like. Also, when a signal showing a release switch 51 is fully pressed is input to the body CPU 50, the body CPU 50 outputs signals for operating mirror driving, shutter driving, diaphragm driving and the like.

The display portion 55 is composed of, mainly, a liquid crystal display device and the like, which is visible from outside of camera body 40. The display portion 55 displays output results, menu and the like. Also, it is available to display calculation results by body CPU 50, such as an inspection result for vibration status of the antidust portion 11 and the like.

The release switch 51 is a switch for operating timing of shutter driving, which outputs signals concerning a condition of the switch to the body CPU 50 such as the switch is pressed halfway or fully pressed and the like. The camera 2 operates AF, AE and the like when the release switch 51 is pressed halfway, and operates mirror-up, shutter drive and the like when the switch is fully pressed.

The mirror 46 is for showing an image to a finder at decision of picture composition, which retracts from an optical line during exposure. Information of the release switch 51 is input from the body CPU 50, the camera 2 operates mirror-up when fully pressed and subsequently operates mirror down after exposure is finished. The mirror 46 is driven by a mirror driver (for example, DC motor) which is not shown in figures. A sub-mirror 46a is connected with the mirror 46.

The sub-mirror 46a is a mirror for transmitting light to an AF sensor which introduces light beam through the mirror to the AF sensor by reflection. The sub-minor 46a eliminates from the optical line during exposure.

A shutter member 44 is a mechanism to control an exposure time. Information of the release switch 51 is input from the body CPU 50, when the switch fully pressed, the camera 2 operates shutter driving. The shutter member 44 is driven by a shutter driver (for example, DC motor) which is not shown in figures. The AF sensor 72 is a sensor for conducting Auto focusing (AF). As the AF sensor, normally, a CCD is used.

Figure 3:
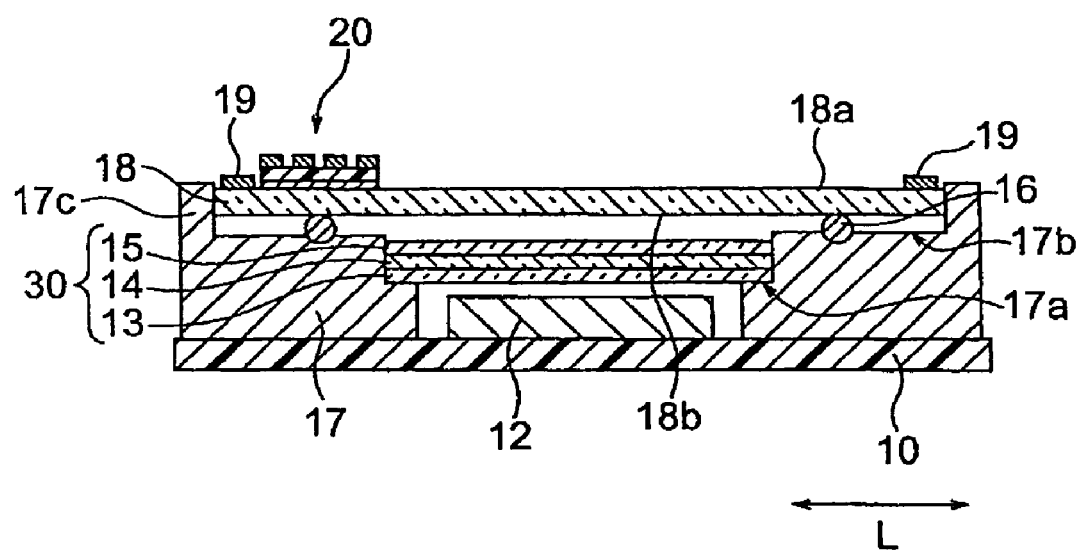
FIG. 3 is a schematic cross sectional view along a line III-III shown in FIG. 2.
Figure 4A:
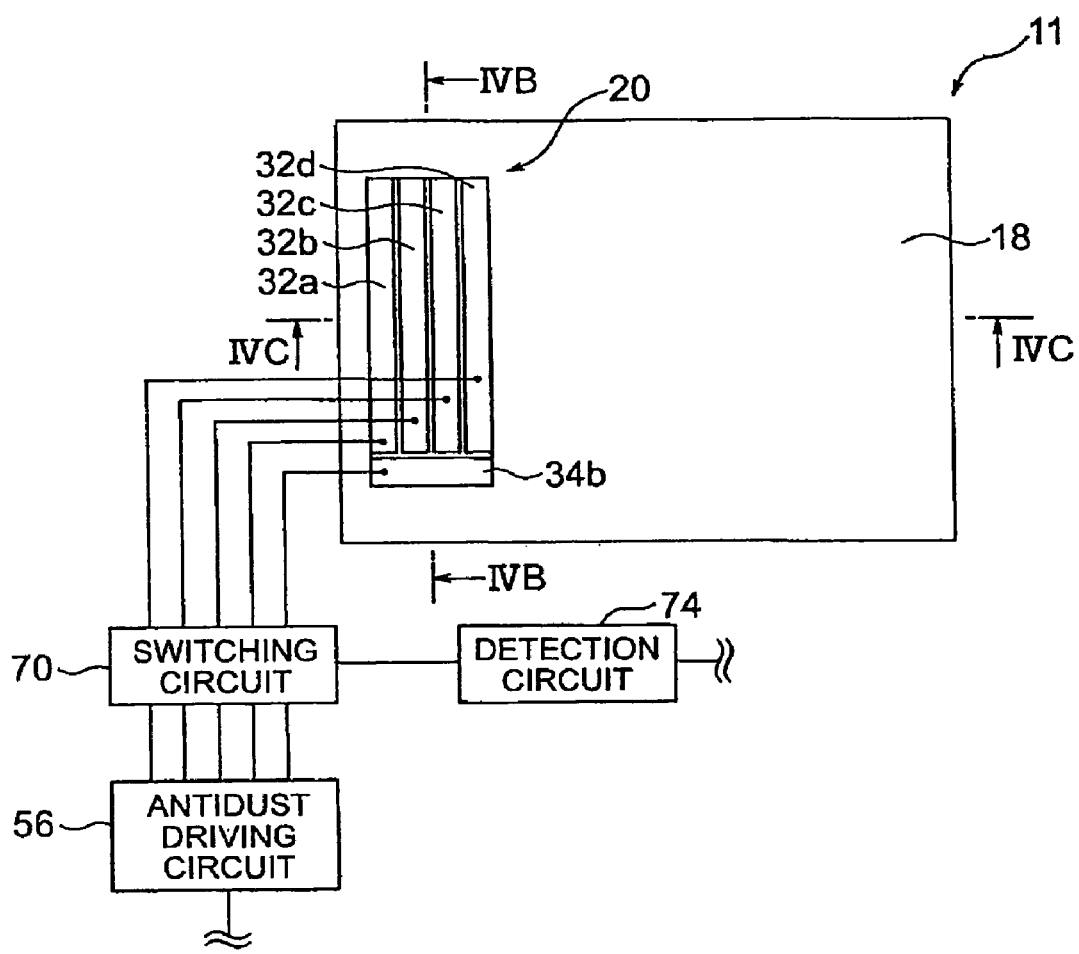
FIG. 4A is a plane view of an imaging device shown in FIG. 2 and FIG. 3.

The antidust filter driving circuit 56 is, as shown following specified in FIG. 3, FIG. 4A and the like, electrically connected with a vibrator 20 of the antidust portion 11 via a switching circuit 70. The antidust driving circuit 56 drives a vibrator 20 by receiving control from the body CPU 50, when predetermined conditions are satisfied. The antidust filter driving circuit 56 operates an antidust operation for removing dust and the like adhered on the surface of an antidust filter 18, as shown in FIG. 7A to FIG. 7D by generating bending vibration on the antidust filter 18.

The antidust filter driving circuit 56 outputs a driving signal such as periodic rectangular wave or sine wave and the like (FIG. 9A to FIG. 9D) to the vibrator 20. Electric voltage in response to the driving signal is applied to piezo 36 of the vibrator 20 shown in FIG. 4C via a first to a fourth driving electrodes 32a to 32d.

The piezo 36 to which electric voltage is applied generates bending vibration on the antidust filter 18 by expansion and contraction towards a long side direction L of the anti-filter 18. The dust adhered on the surface of the antidust filter 18 comes off from the surface of the antidust filter 18 because a force received from the bending vibration exceeds an adherence of the dust. Note that, a capturing means constituted by adhesive tape and the like may be provided around the antidust filter 18 so as to capture the dust removed from the surface of the antidust filter 18 by the bending vibration.

Preferably, as for the driving frequency of the vibrator 20, it is preferable to be a resonance frequency to resonate the surface of the antidust filter 18, in order to provide large amplitude to the antidust filter 18. A resonate frequency is determined by a shape, material, manner of support and vibration mode of the antidust filter 18.

In the present embodiment, as shown in FIG. 1, a vibration mode selecting circuit 80 is connected with the antidust filter driving circuit 56. The vibration mode selecting circuit 80 determines driving signal and a frequency thereof to be output from the antidust filter driving circuit 56 by receiving instructions from the body CPU 50. Also, the antidust driving circuit 56 outputs the driving signal to the antidust portion 11 based on determination of the vibration mode selecting circuit 80.

Namely, in the present embodiment, an order of the bending vibration which is generated on the antidust filter 18 of the antidust portion 11 can be changed by changing the driving signal and the frequency thereof to be output from the antidust driving circuit 56 based on the vibration mode selecting circuit 80. Relation of the driving signal to be output from the antidust filter driving circuit 56 and the bending vibration which is generated on the antidust filter 18 will be mentioned below.

In the lens barrel 42 shown in FIG. 1, the focal distance encoder 66, a distance encoder 64, a diaphragm portion 47, a stepping motor (STM) 68 for controlling a diaphragm portion 47, the lens CPU 58, a lens contact point 54 with a body portion and a plurality of lens group 48 are equipped. In the lens contact 54, there are three contact points that a contact point for supplying power for a lens driving system from the camera body 40, a contact point for CPU power supply for driving the lens CPU 58 and a contact point for digital communication. The driving system power supply and the CPU power supply are supplied from the power supply 52 of the camera body 40 to provide electric power for the lens CPU 58 and the driving system.

The focal distance encoder 66 equipped on the lens barrel 42 outputs positional information of the zooming lens group, which is one of constitutional elements of the lens group 48, to the lens CPU 58. The distance encoder 64 outputs positional information of the focusing lens group, which is one of constitutional elements of the lens group 48, to the lens CPU 58.

The lens CPU 58 comprises a communication function with the camera body 40 and a controlling function for the lens group 48. The lens CPU 58 outputs the focal distance and the subject distance and the like to the body CPU 50 via the lens contact 54. Release information and AF information are input from the body CPU 50 to the lens CPU 58, via a lens contact 54.

Figure 2:
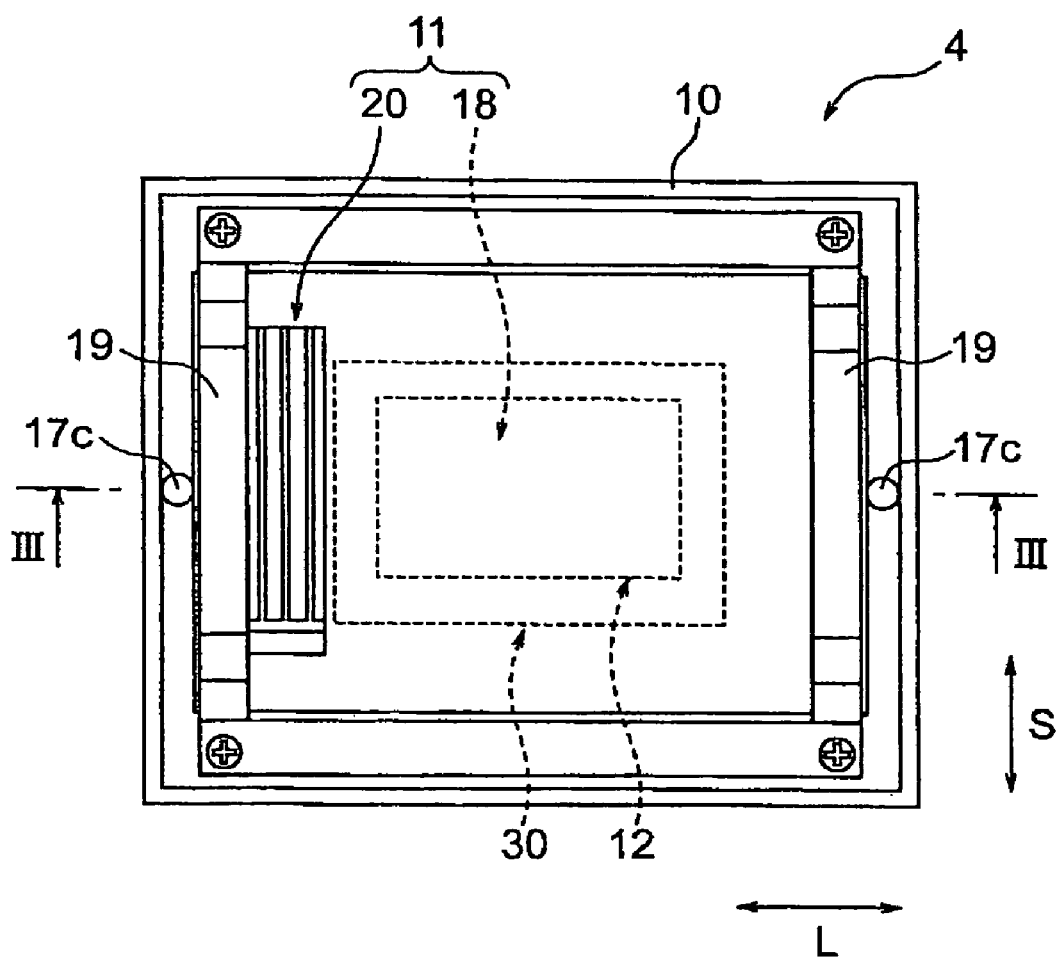
FIG. 2 is a plane view of a vibration unit shown in FIG. 1.

As shown in FIG. 2 and FIG. 3, the image pickup element unit 4 according to the present embodiment includes a substrate 10, and the image pickup element 12 is fixed on an upper face of center portion of the substrate 10. A case 17 is arranged at a circumference of the image pickup element 12, and the case is detachably or not detachably fixed to a surface of the substrate 10.

The case 17 is composed of an insulating body, for example, such as synthetic resin or ceramic and the like, and an inner circumferential side attaching portion 17a and an outer circumferential side attaching portion 17b are formed at an upper face thereof in a step-like pattern. An outer circumference of optical member elements 30 having light transmissive property is attached to the inner circumferential side attaching portion 17a. As a result, a circumference of the image pickup element 12 is hermetically sealed by the substrate 10, the case 17 and the optical member elements 30.

The antidust filter 18 is provided at the outer circumferential side attaching portion 17b of the case 17 via a hermetic sealing member 16, and compressed toward the hermetic sealing member 16 by a pressing member 19. In the present embodiment, a metal plate is used as the pressing member 19, and the antidust filter 18 is biased toward a side of the hermetic sealing member 16 by an elastic force due to deformation of the pressing member 19. A sealed face 18b, which is one of surfaces of the antidust filter 18 provided on a side facing the image pick-up element 12 seals a space where the optical member element 30 and the like are provided by sandwiching the air-tight sealing member 16 between the sealed face 18b and the outer circumferential side attaching portion 17b of the case 17.

As a result, a storage space wherein the image pick-up element 12 and the optical member element 30 are provided becomes sealed status, it is available to prevent the dust insertion from an exterior of the case to the storage space. Also, since there is a case that the vibrator 20 include brittle member, when the vibrator 20 is driven, there is a case that the vibrator 20 itself generates dust. However, in the present embodiment, since the vibrator 20 is arranged at an outer portion of the storage space, there is a little invasion of the dust generated from the vibrator 20 itself to the storage space, the dust adhesion to a surface of the optical member element 30 is further prevented.

Further, in the present embodiment, the vibrator 20 which generates bending vibration on the antidust filter 18 is fixed on an outer face 18a of the antidust filter 18, which is an opposite face to the sealed face 18b provided on a side facing the image pick-up element 12 by adhesive agent and the like. Namely, the antidust portion 11 comprises the antidust filter 18 and the vibrator 20.

The pressing member 19 shown in FIG. 2 and FIG. 3 is fixed detachably to the outer circumferential side attaching portion 17b of the case 17, for example by a screw. Also, the antidust filter 18 having a rectangular shape is determined its layout toward a long side direction L by a positioning pin 17c formed on an upper face of the case 17. Note that, the hermetic sealing member 16 shown in FIG. 3 is composed by material having low rigidity, for example foamed resin, rubber and the like, which restrains transferring vibration of the antidust filter 18 to the case 17 by absorbing vibration movement of a antidust filter 18 which will be mentioned below.

In the present embodiment, the optical member element 30 shown in FIG. 3 has a layered structure of a plurality of optical plates which is composed of a layered plate of a crystal plate 13, an infrared ray absorbing glass plate 14 and a crystal wavelength plate 15 (λ/4 wavelength plates). The optical member element 30 composed of the layered plate has a rectangular shape and area being smaller with respect to the crystal plate 18, and larger with respect to an acceptance surface of the image pickup element 12 so as to cover the whole image pickup element 12.

The crystal wavelength plate 15 is available to change lineally polarized light to circular polarized light, the infrared ray absorbing glass plate 14 has a function to absorb an infrared ray. Also, the crystal plate 13 is a crystal plate whose birefringence direction is different at 90° mutually with respect to that of the crystal plate 18, in case that one is a crystal plate includes 90° direction birefringence (short side direction), the other crystal plate includes 0° direction birefringence (long side direction). In the present embodiment, the crystal plate 18 includes 0° direction birefringence (long side direction) and the crystal plate 18 includes 90° direction birefringence (short side direction).

Namely, in the present invention, an optical low pass filter (OLPF) is composed by a crystal plate 13 and the antidust filter 18 arranged as spaced each other and the infrared ray absorbing glass plate 14 and the crystal wavelength plate 15 provided therebetween. However, as a light transmissive member according to the present invention, it is not limited to the antidust filter 18 which is on part of the optical low pass filter. For example, the optical low pass filter may be composed by the optical member element 30 only, and the optical member element 30 may be sealed by the antidust filter composed by a sealing glass and the like.

FIG. 4A is a plane view of the antidust filter 18 to which the vibrator 20 is attached. The vibrator 20 comprises four sheets of a first to a fourth driving electrodes 32a to 32d which are electrically insulated respectively.

Figure 4B:
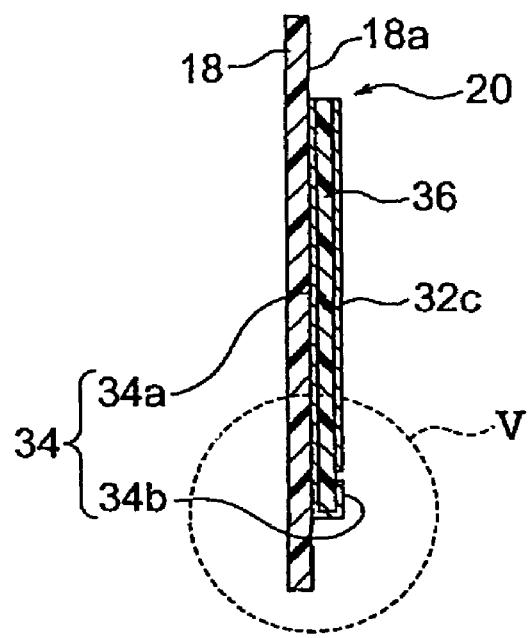
FIG. 4B is a cross sectional view along a line IVB-IVB shown in FIG. 4A.

Also, as shown in a cross sectional view of FIG. 4B, the vibrator 20 further comprises a common electrode 34 attached to the outer face 18a of the antidust filter 18 and a piezo 36 sandwiched between the first to fourth driving electrodes 32a to 32d and the common electrode 34.

Figure 5:
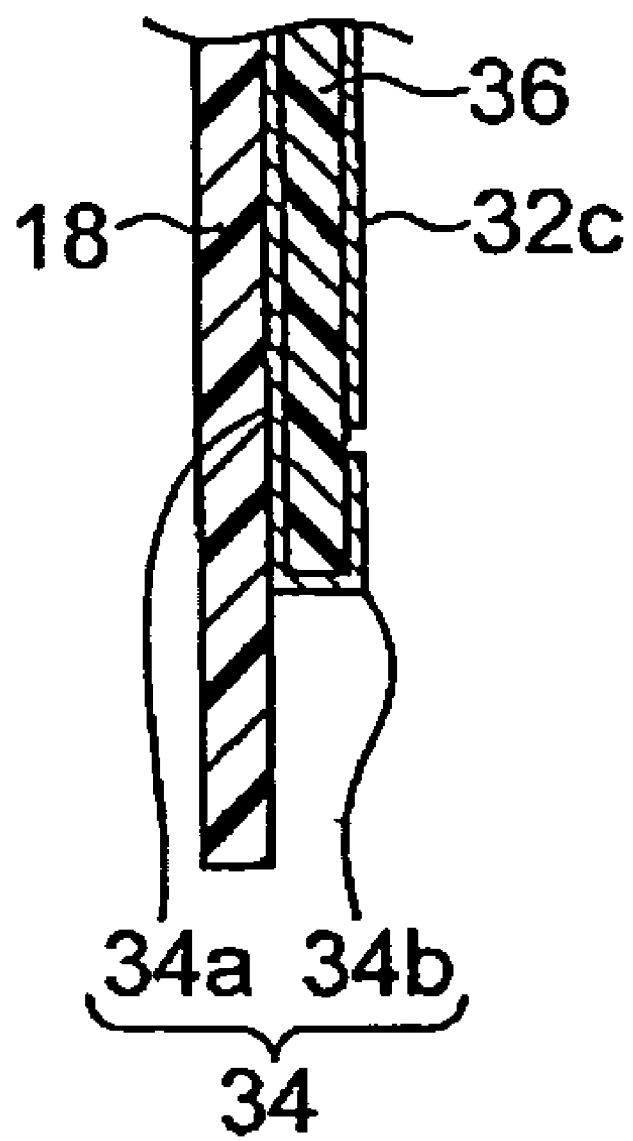
FIG. 5 is a main section enlarged cross sectional view enlarging one portion (surrounded portion by dashed line V) of the cross sectional view of FIG. 4B.

As shown in an enlarged drawing of FIG. 5, the common electrode 34 comprises a first portion 34a and a second portion 34b bent from and opposite to the first portion 34a. The first portion 34a is provided on a surface of the antidust filter 18 side at the piezo 36. The second portion 34b is provided on a surface opposed to the surface of the antidust filter 18 side at the piezo 36.

Figure 4C:
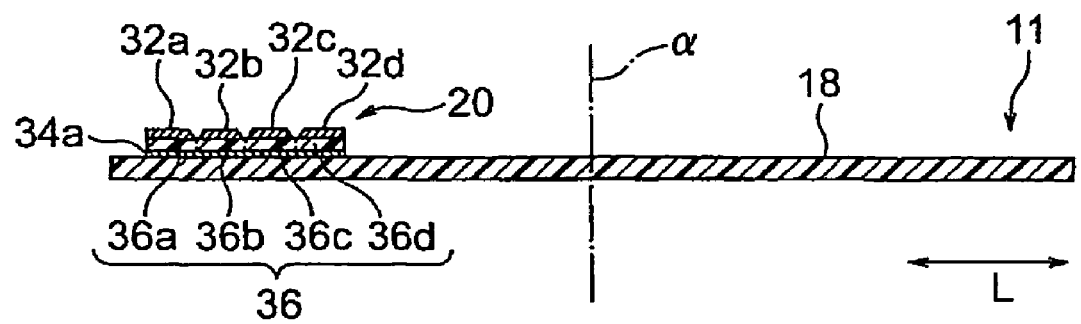
FIG. 4C is a cross sectional view along a line IVC-IVC shown in FIG. 4A.

As shown in FIG. 4C, the first portion 34a of the common electrode 34 is arranged on the piezo 36 opposite to the first to the fourth electrode 32a to 32d. The piezo 36 is deformed by a voltage potential difference formed between the first portion 34a of the common electrode 34 and the respective driving electrode 32a to 32d. In the present embodiment, the bending vibration is generated on the antidust filter 18 by using deformation of the long side direction L of the piezo 36.

The second portion 34b of the common electrode 34 is formed as it is bent from the first portion 34a provided on the surface of the antidust filter 18 side at the piezo 36, as shown in FIG. 4B. Thus, the first portion 34a and the second portion 34b are electrically connected. Thereby, in the present embodiment, a switching circuit 70 is electrically connected with the second portion 34b provided at a front surface of the vibrator 20. Namely, in the common electrode 34 of the present embodiment, electrical voltage is applied to the first portion 34a via the second portion 34b.

As above, since the switching circuit 70 may be connected electrically with the second portion 34b, it is easy to wiring from the common electrode 34 to the switching circuit 70. Note that, the common electrode 34 is, as shown in FIG. 4A, connected with the antidust filter driving circuit 56 via the switching circuit 70. During the following mentioned the antidust operation, the common electrode 34 is held at predetermined voltage. However, in view of that the vibrator 20 is driven with electric power saving, it is desirable to hold the common electrode 34 at a ground potential during the dust removing operation.

The first to fourth driving electrodes 32a to 32d are also wired to the antidust filter driving circuit 56 via the switching circuit 70 as similar with the common electrodes 34a and 34b. The antidust filter driving circuit 56 outputs driving signals selected by the vibration mode selecting circuit 80 shown in FIG. 1, to the respective first to fourth driving electrodes 32a to 32d individually. Note that, when following mentioned detecting operation is not performed, it is not necessary to provide the switching circuit 70, the antidust filter driving circuit 56 may be wired directly to the respective electrodes 32a to 32d, 34.

Also, the antidust filter circuit 56 may output driving signals having different phases respectively to the respective driving electrodes 32a to 32d by a control signal from the body CPU 50. Therefore, as shown in FIG. 4C, the piezo 36 are controlled as divided to the first to the fourth section 36a to 36d arranged along with the longitudinal direction L, and as corresponding to the respective driving electrodes 32a to 32d.

However, the piezo 36 is formed integrally, the first to the fourth section 36a to 36d of the piezo 36 have an identical direction of polarization. Thus, when polar characters of the voltage applied to the respective driving electrodes 32a to 32d are identical, deformation directions of the respective sections 36a to 36d of the piezo 36 become identical. Contrary, when polar characters of the voltage applied to the respective driving electrodes 32a to 32d are different, the respective sections 36a to 36d of the piezo 36 deform in different direction.

Figure 7A:
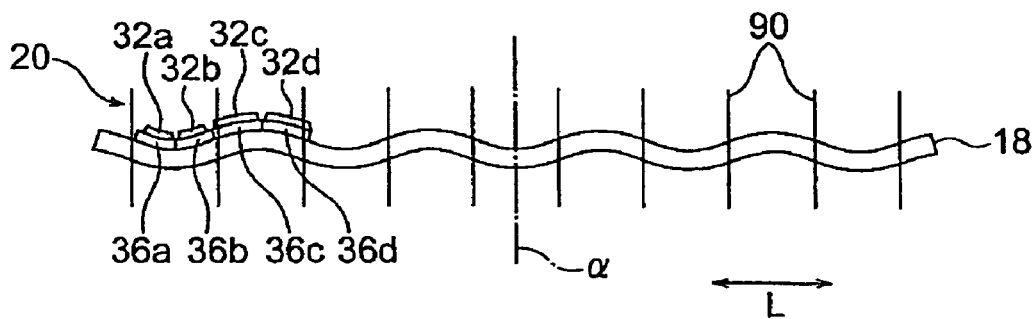
FIG. 7A is a pattern diagram showing an antidust filter in a status that ninth-order bending vibration is added by a vibrator.

For example, when electric voltage is applied to the respective driving electrodes 32a to 32d so as to be polar characters of the first and the second driving electrode 32a, 32b are positive, polar characters of the third and the fourth driving electrodes 32c, 32d are negative, the piezo 36 deforms as shown in FIG. 7A. Namely, deformation of contracting towards the long side direction L of the antidust filter 18 occurs to the section 36a, 36b of the piezo.

Against this, elongated deformation towards the long side direction L of the antidust filter 18 occurs to the sections 36c, 36d. Note that, the common electrode 34 which is omitted in FIG. 7A is held as ground potential.

As mentioned above, in spite of the piezo 36 is formed integrally and having substantially uniform polar direction, the deformations are controlled as each of the first to the fourth sections 36a to 36d in response to the respective driving electrodes 32a to 32d. However, embodiments in which the respective section 36a to 36d of the piezo 36 or the common electrode 34 are divisionally formed as the driving electrode 32, are included in a modified version of the present embodiment.

The switching circuit 70 shown in FIG. 4A may switch a predetermined one electrode connection of the first to the fourth driving electrodes 32a to 32d between the antidust filter driving circuit 56 and the detection circuit 74 by controlling from the body CPU 50. At this time, the driving electrode connected with the detection circuit 74 acts as a monitoring electrode to detect vibration generated on the antidust filter 18.

Figure 6:
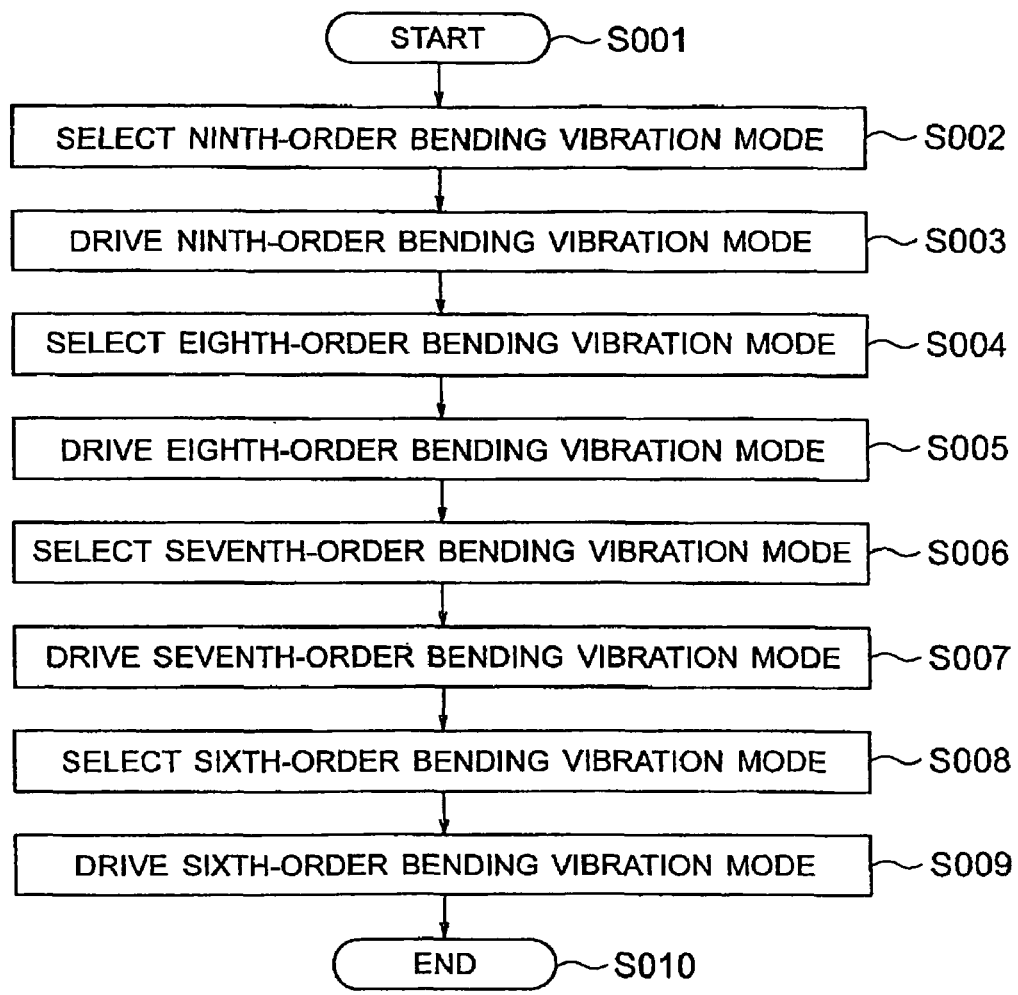
FIG. 6 is a flow chart showing a series of processes at dust-removing operation in a camera shown in FIG. 1.

A series of procession at dust removing operation in the camera 2 shown in FIG. 1 will be specified by using a flow chart shown in FIG. 6. In a step S001, the body CPU 50 outputs a dust removing operation starting signal to commence the dust removing operation. The dust removing operation may be started in response to a predetermined action of the camera such as power ON action and the like, also, it may be started when a camera user selects menu button which is not shown in drawings and the like provided with a main body of the camera.

After starting the dust removing operation, an order of the bending vibration generated on the antidust filter 18 shown in FIG. 1 is determined (step S002 and the like). Note that, an order of the bending vibration performed at one time dust removing operation or combination of the order may be recorded on EEPROM 60 and the like by pre-setting. Here, the antidust driving circuit 56 according to the present embodiment may generate a sixth-order bending vibration (FIG. 7D), a seventh-order bending vibration (FIG. 7C), an eighth-order bending vibration (FIG. 7B), a ninth-order bending vibration order (FIG. 7A) to the antidust filter 18. Also, the antidust filter driving circuit 56 causes to change the order of the bending vibration by each one order at one time dust removing operation by sequence of the ninth, the eighth, the seventh and the sixth. According to changing the vibration by each one order, nodes of the vibration are not overlapped as mentioned below.

Figure 7D:
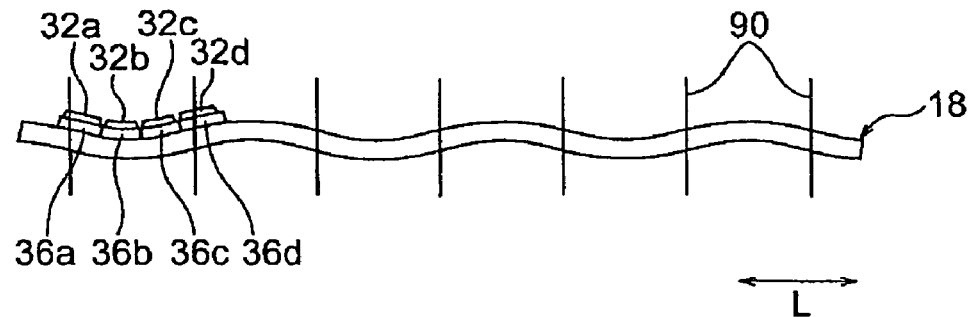
FIG. 7D is a pattern diagram showing an antidust filter in a status that sixth-order bending vibration is added by a vibrator.
Figure 8:
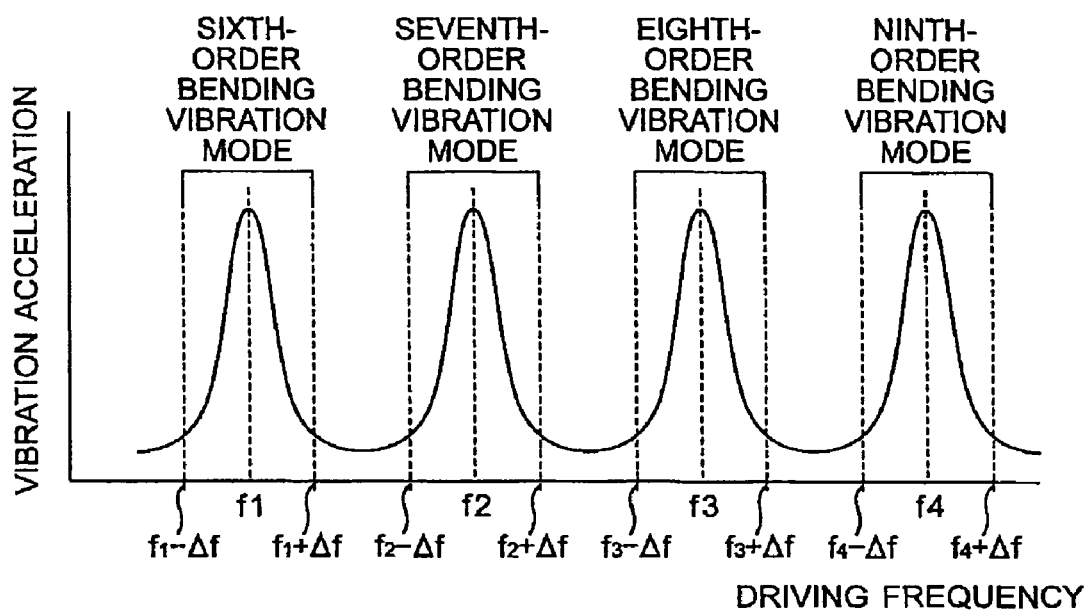
FIG. 8 is a graph showing a relation of a vibration frequency added to an antidust filter and a vibration acceleration of the antidust filter.

FIG. 8 shows a relation of a frequency of the driving signal applied to the vibrator 20 and a vibration acceleration of the bending vibration generated on the antidust filter 18, under a predetermined condition. In the antidust filter 18 according to the present embodiment, when the vibrator 20 is driven at standard resonance frequencies f1 to f4, the vibration acceleration of the bending vibration generated at the antidust filter 18 is being local maximum value. When the vibrator 20 is driven at frequencies adjacent to the standard resonance frequencies f1 to f4 respectively, the corresponding sixth to ninth order vending vibration occurs on the antidust filter 18 as shown in FIG. 7D to FIG. 7A. Note that, the information relating to the standard resonance frequencies f1 to f4 are recorded on the EEPROM 60 and the like shown in FIG. 1.

In the step S002, the vibration mode selecting circuit 80 selects the ninth order vibration mode by receiving the dust removing operation starting signal from the body CPU 50. The vibration mode selecting circuit 80 instructs the antidust filter driving circuit 56 to drive the vibrator 20 at the ninth order bending vibration mode.

In a step S003, the antidust filter driving circuit 56 drives the vibrator 20 at the ninth-bending vibration mode. In the present embodiment, the antidust filter driving circuit 56 outputs driving signals 85a to 85d shown in FIG. 9A to the first to the fourth driving electrodes 32a to 32d shown in FIG. 4A.

At this time, a driving frequency which is an inverse number of a driving cycle T1 is determined as optimal value, by sweeping from a first value $f4+\Delta f$ which is higher by a predetermined value $\Delta f$ than the standard resonance frequency f4 shown in FIG. 8 to a second value $f4-\Delta f$ which is lower by a predetermined value $\Delta f$ from the standard resonance frequency f4. This is because, the resonance frequency in which the bending acceleration on the antidust filter 18 at the ninth-bending vibration mode is being local maximum value, changes in response to a condition of the antidust filter 18 provided.

In this manner, the antidust filter driving circuit 56 drives the vibrator 20 with changing the driving frequencies of the driving signal from the first value $f4+\Delta f$ to the second value $f4-\Delta f$. Therefore, the antidust filter driving circuit 56 may generate bending vibration to the antidust filter 18 so that the vibration acceleration of the antidust filter 18 becomes local maximum value in spite of provided condition of the antidust filter 18. Namely, since the antidust filter driving circuit 56 may provide the larger vibration acceleration to the antidust filter 18, effective dust removing can be operated.

In the ninth vibration mode of the step S003, the ninth bending vibration occurs as shown in FIG. 7A. In the ninth bending vibration, a standing wave having ten vibration nodes 90 occurs on the antidust filter 18. In the ninth bending vibration, one vibration node 90 of the vibration nodes 90 occurring on the antidust filter 18 and the vibrator 20, occur at a position sandwiched between the second driving electrode 32b and the third driving electrode 32c.

Figure 9A:
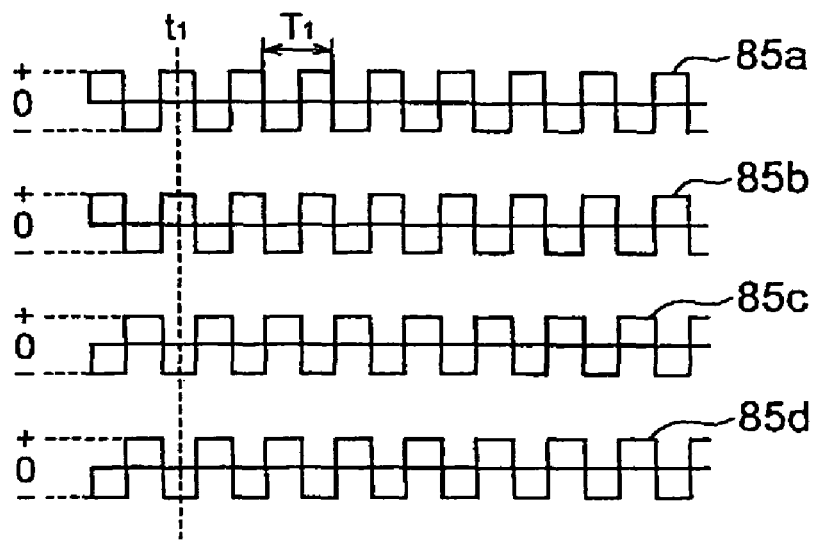
FIG. 9A shows an example of a driving signal to be output from a driver to respective electrodes when adding ninth-order bending vibration.

In the ninth vibration mode of the step S003, phases of the driving signals to be output to the first and the second driving electrodes 32a, 32b shown in FIG. 7A and phases of the driving signals applied to the third and the fourth driving electrodes are different each other. FIG. 9A shows the driving signal to be output to the respective driving electrodes 32a to 32d in the ninth vibration modes. The first driving signal 85a shows a driving signal to be output to the first driving electrode 32a, and a second driving signal 85b shows a driving signal to be output to the second driving electrode 32b, respectively. Also, a third driving signal 85c of FIG. 9A shows a driving signal to be output to the third driving electrode 32c and a fourth driving signal 85d shows a driving signal to be output to the fourth driving electrode 32d.

Also, The first to fourth driving signals 85a to 85d shown in FIG. 9A correspond to polar characters and magnitudes of the voltage applied to the first to fourth driving electrodes 32a to 32d. Output values X(t) at a time t of the driving signals shown in FIG. 9A can be specified as following formula (1) by using a sign function sgn and a sine function sin, $$X(t)=A1 sgn(\sin((360° \times t/T1)+\alpha)) \quad \text{formula (1)}$$

Here, A1 is amplitudes of the first to fourth driving signals 85a to 85d, T1 is cycles of the first to fourth driving signal 85a to 85d, α is an initial phase of the first to fourth driving signals 85a to 85d, (360°×t/T1)+α shows a phase at a time t of the first to fourth driving signals 85a to 85d. Note that, the sign function sgn(x) is a sign function which returns 0 when x=0 or returns |x|/x when x>0 and x<0.

The first driving signal 85a and the second driving signal 85b are that initial phases a thereof at the formula (1) is 0°, contrary this, the third driving signal 85c and the fourth driving signal 85d are that initial phases α at the formula (1) is 180°. Therefore, phase difference of the first or the second driving signal 85a, 85b and the third or the fourth driving signals 85c, 85d is 180°, in which the electrodes to be output the third or the fourth driving signals 85c, 85d are provided at positions where one node 90 is sandwiched between the electrodes to be output the first or the second driving signal 85a, 85b and the electrodes to be output the third or the fourth driving signals 85c, 85d.

As above, in the ninth vibration mode, by outputting the driving signals 85a to 85b as shown in FIG. 9A to the respective driving electrodes 32a to 32d, deformations suitable to deforming direction of abdominal section of bending vibration occur to respective sections of the piezo 36 as shown in FIG. 7A. Note that, FIG. 7A shows vibration status of the antidust filter 18 at the time t1 shown in FIG. 9A.

Namely, the antidust filter 18 may receive a force which amplifies oscillation of the bending vibration from the respective sections 36a to 36d of the piezo 36. In this manner, the antidust filter driving circuit 56 may vibrate the antidust filter 18 efficiently by outputting the driving signals which are suitable to the bending vibration generated on the antidust filter 18 to the respective electrodes 32a to 32d of the vibrator.

Next, in a step S004 shown in FIG. 6, the vibration mode selecting circuit 80 selects the eighth vending mode. Then, the vibration mode selecting circuit 80 instructs the antidust filter driving circuit 56 so as to drive the vibrator 20 under the eighth bending vibration mode.

In a step S005, the antidust filter driving circuit 56 drives the vibrator 20 under the eighth bending vibration mode. In the present embodiment, the antidust filter driving circuit 56 outputs a driving signal shown in FIG. 9B to the respective driving electrodes 32a to 32d shown in FIG. 4A.

Figure 9B:
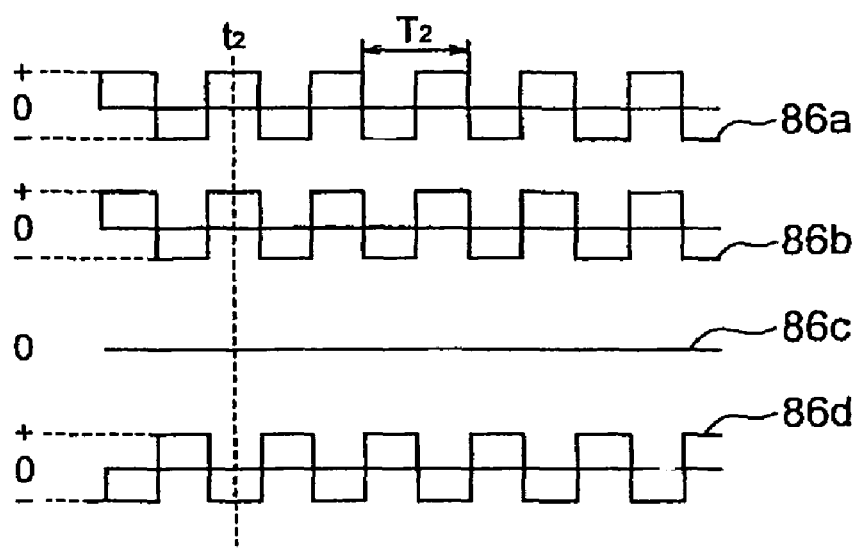
FIG. 9B shows an example of a driving signal to be output from a driver to respective electrodes when adding eighth-order bending vibration.

Driving frequencies which are inverse numbers of driving frequencies T2 shown in FIG. 9B are swept from a first value f3+Δf which is higher by a predetermined value Δf than the standard resonance frequency f3 shown in FIG. 8 to a second value f3−Δf which is lower by a predetermined value Δf from the standard resonance frequency f3.

Figure 7B:
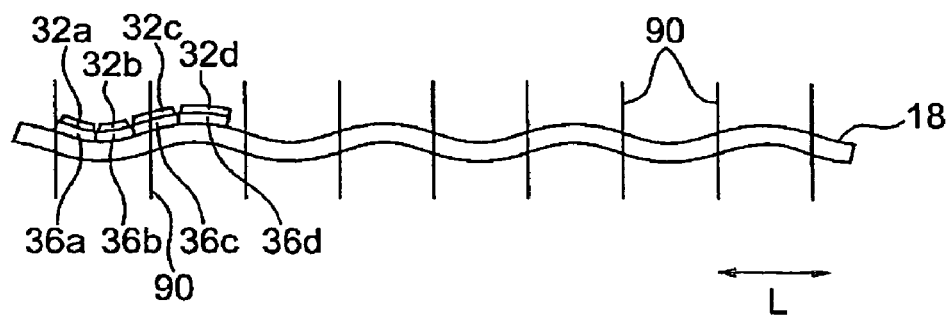
FIG. 7B is a pattern diagram showing an antidust filter in a status that eighth-order bending vibration is added by a vibrator.

In the eighth-order vibration mode, the eighth-order bending vibration occurs as shown in FIG. 7B. In the eighth-order bending vibration, a standing wave having nine vibration nodes 90 is generated on the antidust filter 18. In the eighth-order bending vibration, one vibration node 90 of the vibration nodes 90, which are generated on the antidust filter 18 and the vibrator 20, occurs at a position where the third driving electrode 32c is provided. In the eighth-order vibration mode, there are differences between phases of driving signals to be output to the first or the second driving electrode 32a and 32b, a phase of a driving signal to be output to the third or fourth driving electrode 32c, 32d.

FIG. 9B shows driving signals to be output to the respective driving electrodes 32a to 32d under the eighth vibration mode. A fifth driving signal 86a shows a driving signal to be output to the first driving electrode 32a, and a sixth driving signal 86b shows a driving signal to be output to the second driving electrode 32b respectively. Also, a seventh driving signal 86c of FIG. 9B shows a driving signal to be output to the third driving electrode 32c, an eighth driving signal 86d shows a driving signal to be output to the fourth driving electrode 32d, respectively.

Also, the fifth to eighth driving signals 86a to 86d shown in FIG. 9B correspond to polar characters and magnitudes of the voltage applied to the first to fourth driving electrodes 32a to 32d. Output values X(t) at a time t of the driving signals shown in FIG. 9B can be specified as following formula (2).

$$X(t)=A2 sgn(\sin((360° \times t/T2)+\alpha)) \quad \text{formula (2)}$$

Here, A2 is amplitudes of the fifth to eighth driving signals 86a to 86d, T2 is cycles of the fifth to eighth driving signals 86a to 86d, α is an initial phase of the fifth to eighth driving signals 86a to 86d, (360°×t/T2)+α shows a phase at a time t of the fifth to eighth driving signals 86a to 86d.

The fifth driving signal 86a and the sixth driving signal 86b are that initial phases a thereof at the formula (2) is 0°, contrary this, the eighth driving signal 86d is that initial phases a thereof at the formula (2) is 180°. Therefore, phase difference of the fifth or the sixth driving signal 86a, 86b and the eighth driving signal 86d is 180°, in which the electrode to be output the eighth driving signals 86d is provided at position where one node 90 is sandwiched between the electrodes to be output the fifth or the sixth driving signal 86a, 86b and the electrode to be output the eighth driving signal 86d.

Also, as shown in FIG. 7B, a seventh driving signal 86c is output to the third driving electrode 32c provided at a position including a node 90 of the vibration, wherein the phase in the formula (2) of the seventh driving signal 86c becomes 0 in spite of the time t. Thereby, under the eighth-order vibration mode, an electric potential of the third driving electrode 32c is held at ground as similar with the common electrode 34.

As above, in the eighth-order vibration mode, the seventh driving signal 86c to be output to the third driving electrode 32c provided at a position including the node 90 of the vibration differ in phase from the fifth, the sixth and the eighth driving signals 86a, 86b, 86c to be output to the first, the second and the fourth driving electrodes 32a, 32b, 32d provided at positions not including the nodes 90 of the vibration respectively.

In other words, in the eighth-order vibration modes, phases of the driving signals to be output to the respective driving electrodes 32a to 32d are changed in response to their positioning relation between the nodes 90 of the vibration and the respective driving electrodes 32a to 32d. Thus, in the eighth-order vibration mode, as shown in FIG. 7B, the respective sections 36a, 86b, 36d occur deformation suitable to deforming directions of abdominals of the vibration in the bending vibration. Further, a third section 36c is not applied the voltage generating deformation, and a third section 36c is held at ground potential in response to that a deformation amount adjacent to the node 90 of the vibration is small. Note that, FIG. 7B shows vibration status of the antidust filter 18 at the time t2 shown in FIG. 9B.

Namely, the antidust filter 18 may receive a force which amplifies oscillation of the bending vibration from the respective sections 36a, 36b, 36d of the piezo 36.

Also, since the third section 36c is provided at a position including the node 90 of the vibration, the voltage of the third driving electrode 32c is held at ground. Namely, the antidust filter driving circuit 56 may drive the vibrator 20 with saving electric power and maintaining antidust effect, since the voltage of the third driving electrode 32c provided at the position including the nodes 90 and having small amplitude of the bending vibration is not changed.

Next, in a step S006 shown in FIG. 6, the vibration mode selecting circuit 80 selects the seventh bending vibration mode. The vibration mode selecting circuit 80 provides instructions to the antidust driving circuit 56 to drive the vibrator 20 under the seventh vibration mode.

In a step S007, the antidust filter driving circuit 56 drives the vibrator 20 under the seventh-order bending vibration. In the present embodiment, the antidust filter driving circuit 56 outputs driving signals shown in FIG. 9C to the respective driving electrodes 32a to 32d shown in FIG. 4A. Driving frequencies which are inverse numbers of driving cycles T3 shown in FIG. 9C are swept from a first value f2+Δf which is higher by a predetermined value Δf than a resonance frequency f2 under the seventh bending vibration mode shown in FIG. 8 to a second value f2−Δf which is lower by a predetermined value Δf from the resonance frequency f2.

Figure 7C:
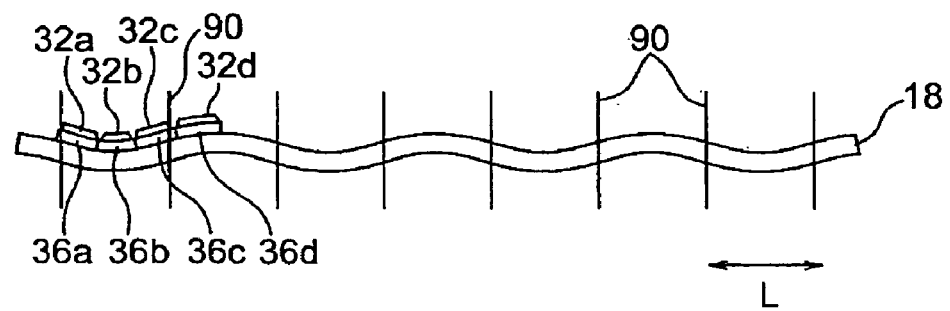
FIG. 7C is a pattern diagram showing an antidust filter in a status that seventh-order bending vibration is added by a vibrator.

In the seventh-order vibration mode, a seventh-order bending vibration occurs as shown in FIG. 7C. In the seventh-order bending vibration, a standing wave having eight vibration nodes 90 is generated on the antidust filter 18. Further, one vibration node of the vibration nodes 90 generated on the antidust filter 18 and the vibrator 20 occurs at a position where the first driving electrode 32a is provided, another node 90 occurs at a position where the third driving electrode 32c is provided.

In the seventh-order vibration mode, as shown in FIG. 7C, there are differences between phases of the driving signals to be output to the first or the third driving electrodes 32a, 32c, a phase of the driving signal to be output to the second driving electrode 32b and a phase of the driving signal to be output to the fourth driving electrode 32d.

Figure 9C:
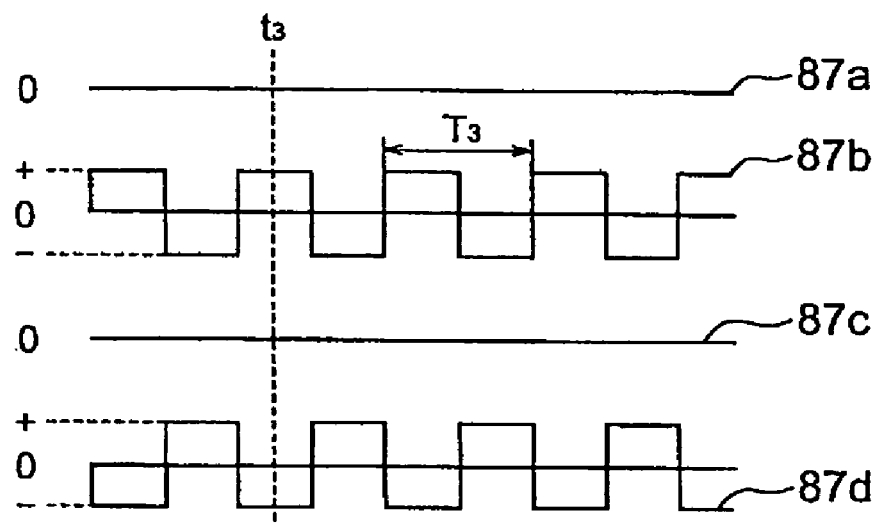
FIG. 9C shows an example of a driving signal to be output from a driver to respective electrodes when adding seventh-order bending vibration.

FIG. 9C shows driving signals to be output to the respective driving electrodes 32a to 32d under the seventh-order vibration mode. A ninth driving signal 87a shows a driving signal to be output to the first driving electrode 32a, and a tenth driving signal 87b shows a driving signal to be output to the second driving electrode 32b respectively. Also, a eleventh driving signal 87c of FIG. 9C shows a driving signal to be output to the third driving electrode 32c, a twelfth driving signal 87d shows a driving signal to be output to the fourth driving electrode 32d, respectively.

Also, the ninth to twelfth driving signals 87a to 87d shown in FIG. 9C correspond to polar characters and magnitudes of the voltage applied to the first to fourth driving electrodes 32a to 32d. Output values X(t) at a time t of the driving signals shown in FIG. 9C can be specified as following formula (3).

$$X(t)=A3 sgn(\sin((360°×t/T3)+\alpha))$$ formula (3)

Here, A3 is amplitudes of the ninth to twelfth driving signals 87a to 87d, T3 is cycles of the ninth to twelfth driving signals 87a to 87d, α is an initial phase of the ninth to twelfth driving signals 87a to 87d, (360°×t/T3)+α shows a phase at a time t of the ninth to twelfth driving signals 87a to 87d.

The tenth driving signal 87b is that an initial phase α at the formula (3) is 0°, contrary this, the twelfth driving signal 87d is that an initial phase α at the formula (3) is 180°. Therefore, phase difference of the tenth driving signal 87b and the twelfth driving signal 87d is 180°, in which the electrode to be output the twelfth driving signal 87d is provided at position where one node 90 is sandwiched between the electrode to be output the tenth driving signal 87b and the electrode to be output twelfth driving signal 87d.

Also, as shown in FIG. 7C, driving signals 87a, 87c are output to the first and the third driving electrodes 32a, 32c provided at a position including a node 90 of the vibration, wherein the phases in the formula (3) of driving signals 87a, 87c become 0 in spite of the time t. Thereby, under the seventh-order vibration mode, an electric potential of the first and the third driving electrodes 32a, 32c are held at ground as similar with the common electrode 34.

Namely, in the seventh-order vibration mode, phases of the driving signals to be output to the respective driving electrodes 32a to 32d are changed in response to their positioning relation between the nodes 90 of the vibration and the respective driving electrodes 32a to 32d. Thus, in the seventh-order vibration mode, as shown in FIG. 7C, the second and the fourth section occur deformations suitable to deforming directions of abdominals of the vibration in the bending vibration. Further, the first and the third sections 36a, 36c are not applied the voltage generating deformation, and the first and the third sections 36a, 36c is held at ground potential in response to that the deformation amount adjacent to the node 90 of the vibration is small. Note that, FIG. 7C shows vibration status of the antidust filter 18 at the time t3 shown in FIG. 9C.

Namely, the antidust filter 18 may receive a force which amplifies oscillation of the bending vibration from the second and fourth sections 36b, 36d of the piezo 36.

Also, since the first and third sections 36a, 36c are provided at a position including the node 90 of the vibration, the voltage of the first and third driving electrodes 32a, 32c are held at ground. Namely, the antidust filter driving circuit 56 may drive the vibrator 20 with saving electric power and maintaining antidust effect, due to the voltage of the first and third driving electrodes 32a, 32c provided at the position including the nodes 90 having small amplitude of the bending vibration is kept at a constant value.

Next, in the step S008 shown in FIG. 6, the vibration mode selecting circuit 80 selects the sixth-order bending vibration mode. The vibration mode selecting circuit 80 provides instructions to the antidust driving circuit 56 to drive the vibrator 20 under the sixth-order vibration mode.

Figure 9D:
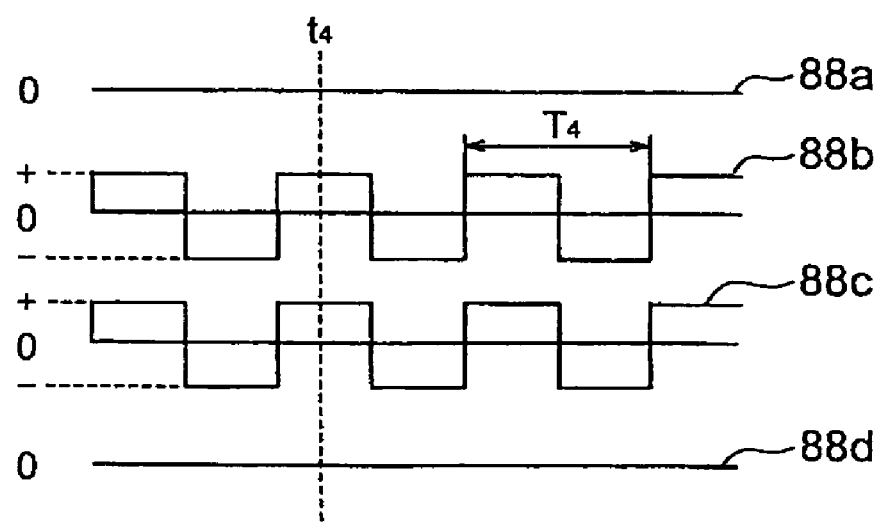
FIG. 9D shows an example of a driving signal to be output from a driver to respective electrodes when adding sixth-order bending vibration.

In a step S009, the antidust filter driving circuit 56 drives the vibrator 20 under the sixth-order bending vibration. In the present embodiment, the antidust filter driving circuit 56 outputs driving signals shown in FIG. 9D to the respective driving electrodes 32a to 32d shown in FIG. 4A. Driving signals of the sixth-order bending vibration mode include driving frequencies T4 as shown in FIG. 9D, the driving frequencies T4 changes within a predetermined range in the sixth-order bending vibration mode.

A shown in FIG. 8, driving frequencies which are inverse numbers of driving cycles are swept from a first value f1+Δf which is higher by a predetermined value Δf than a standard resonance frequency f1 under the sixth bending vibration mode to a second value f1−Δf which is lower by a predetermined value Δf from the resonance frequency f1. By sweeping the driving frequencies, large vibration acceleration may be provided to the surface of the antidust filter, even if the resonance frequencies are different from the standard resonance frequencies under the condition of the antidust filter 18 provided.

In the sixth-order vibration mode, a sixth-order bending vibration occurs as shown in FIG. 7D. In the sixth-order bending vibration, a standing wave having seven vibration nodes 90 is generated on the antidust filter 18. Also, the vibrator 20 fixed on the surface of the antidust filter 18 vibrates in accordance with the standing wave generated at the surface of the antidust filter 18. Further, one vibration node 90 of the vibration nodes 9Q generated on the antidust filter 18 and the vibrator 20 occurs at a position where the first driving electrode 32a is provided, another node 90 occurs at a position where the fourth driving electrode 32d is provided.

In the sixth vibration mode, as shown in FIG. 7D, there are differences between phases of the driving signals to be output to the first or the fourth driving electrodes 32a and 32d and phases of the driving signal to be output to the second and third driving electrode 32b, 32c. FIG. 9D shows driving signals to be output to the respective driving electrodes 32a to 32d under the sixth-order vibration mode. A thirteenth driving signal 88a shows a driving signal to be output to the first driving electrode 32a, and a fourteenth driving signal 88b shows a driving signal to be output to the second driving electrode 32b respectively. Also, a fifteenth driving signal 88c of FIG. 9C shows a driving signal to be output to the third driving electrode 32c, a sixteenth driving signal 88d shows a driving signal to be output to the fourth driving electrode 32d, respectively.

Also, the thirteenth to sixteenth driving signals 88a to 88d shown in FIG. 9D correspond to polar characters and magnitudes of the voltage applied to the first to fourth driving electrodes 32a to 32d. Output values X(t) at a time t of the driving signals shown in FIG. 9D can be specified as following formula (4).

$$X(t)=A4sgn(\sin((360°\times t/T4)+\alpha))\quad\text{formula (4)}$$

Here, A4 is amplitudes of the thirteenth to sixteenth driving signals 88a to 88d, T4 is cycles of the thirteenth to sixteenth driving signals 88a to 88d, α is an initial phase of the thirteenth to sixteenth driving signals 88a to 88d, (360°×t/T4)+α shows a phase at a time t of the thirteenth to sixteenth driving signals 87a to 87d.

The fourteenth driving signal 88b and the fifteenth driving signal 88c are that initial phases α at the formula (4) are 0°. Namely, there is no phase differences between the fourteenth driving signal 88b and the fifteenth driving signal 88c, polar characters of the second driving electrode 32b to which the fourteenth driving signal is input and the third driving electrode 32c to which the fifteenth driving signal 88c is input are constantly the same with each other during the sixth-order bending vibration occurring.

In the sixth-order bending vibration mode, due to polar characters of the second driving electrode 32b and the third driving electrode 32c provided between two adjacent nodes 90 of the vibration are same with each other, deformation directions of the second and the third sections (direction along the optical axis α) are matched with each other, thereby large vibration acceleration may be provided to the surface of the antidust filter 18.

Also, as shown in FIG. 7D, driving signals 86a, 86d are output to the first and the fourth driving electrodes 32a, 32d provided at a position including a node 90 of the vibration, wherein the phase in the formula (4) of driving signals 86a, 86d becomes 0 in spite of the time t. Thereby, under the sixth-order bending vibration mode, an electric potential of the first and the fourth driving electrode 32a, 32d are held at ground as similar with the common electrode 34.

Namely, in the sixth-order vibration mode, phases of the driving signals to be output to the respective driving electrodes 32a to 32d are changed in response to their positioning relation between the nodes 90 of the vibration and the respective driving electrodes 32a to 32d. Thus, in the sixth-order vibration mode, as shown in FIG. 7D, the second and the third sections 36b, 36c generate deformations suitable to deforming directions of abdominal of the vibration in the bending vibration. Further, the first and the fourth sections 36a, 36d are not applied the voltage generating deformation of piezo 36 in response to that a deformation amount adjacent to the node 90 of the vibration is small. Note that, FIG. 7D shows vibration status of the antidust filter 18 at the time t4 shown in FIG. 9D.

Namely, the antidust filter 18 may receive a force which amplifies oscillation of the bending vibration from the second and third sections 36b, 36c of the piezo 36.

Also, since the first and fourth sections 36a, 36d are provided at a position including the node 90 of the vibration, the voltage of the first and fourth driving electrodes 32a, 32d are held at ground. Namely, the antidust filter driving circuit 56 may drive the vibrator 20 with saving electric power and maintaining antidust effect, due to the voltage of the first and fourth driving electrodes 32a, 32d provided at the position including the nodes 90 having small amplitude of the bending vibration is kept at a constant value.

After a sequence of vibration modes including from the ninth-order vibration mode to the sixth-order vibration mode is finished, a series of dust removing operation is finished (step S010). Driving times of the respective bending vibration can be set to appropriate time in response to amount and kind of the dust adhered to the antidust filter. For example, it is available to set driving times of the respective vibration modes are 200 to 300 msec, a time of a series of the dust removing operation from start (step S001) to the finish (step S010) may be set to an about 1.0 sec.

Also, as orders of the bending vibration generated on the antidust filter 18 are not limited to sixth to ninth, it may be available to adopt any combination of orders, if the combination of orders may change the node position of the vibration in a sequence of vibration modes. By changing position of node of vibration at the bending vibration, it becomes available to remove away the dust and the like at whole surface of the antidust filter, and the antidust effects are increased. Namely, the dust and the like remained without blown away at the node 90 of the vibration on the surface of the antidust filter 18 in a specific vibration mode, is blown away in the other vibration mode by the acceleration of the vibration since the node 90 position of the vibration is changed. As a result of this, it becomes possible to remove the dust at whole area of the outer face 18a of the antidust filter 18.

According to this, the antidust filter driving circuit 56 in the present embodiment drives the vibrator 20 by receiving controlling from the body CPU 50 to perform dust removing operation. The body CPU 50 may control the antidust filter driving circuit 56 so as to output driving signals which have different phases respectively to the respective driving electrodes 32a to 32d. Since the respective driving electrodes 32a to 32d are driven by the driving signals having different phases each other, the respective sections 36a to 36d of the piezo 36 corresponding to the respective driving electrodes deform respectively in response to each of the driving signal. So the respective sections 36a to 36d of the piezo 36 provide forces which are suitable to the bending vibration occurring on the antidust filter 18 with the antidust filter 18.

Also, as it is clear from comparison of FIG. 7C and FIG. 7D, the body CPU 50 may adjust an order of the bending vibration occurring on the antidust filter 18 by controlling the vibration mode selecting circuit 80 so as to cause changing number of the driving electrodes 32a to 32d which exist between two adjacent vibration nodes. In this case, the body CPU 50 may change the phases of the driving signals by each of the driving electrodes 32a to 32d with respect to the positional relation between the respective driving electrodes and the vibration nodes 90 generated on the antidust filter 18. The respective sections 36a to 36d of the piezo 36 may course deformation so as to provide the antidust filter 18 with forces corresponding to the deformation direction generated by the bending vibration, since the respective driving electrodes 32a to 32d are controlled by the driving signals having different phases in response to the positional relation between the vibration nodes and the respective driving electrodes.

Further, an antidust device including the antidust filter 18 and the like may comprise vibration modes being two or more number of driving electrodes exist between the two adjacent vibration nodes like the sixth bending vibration mode shown in FIG. 7D. In a constitution like this, the phases of the driving signals to be output to the respective driving electrodes may be changed more appropriately, since widths between the respective electrodes are small against spaces of the vibration nodes 90. Note that, the space and the position of the vibration nodes 90 generated on the antidust filter 18 in the respective vibration modes may be adjusted according to a shape, material, manner of support and vibration mode of the antidust filter 18 or the vibrator 20.

The body CPU 50 shown in FIG. 1 provides a command to the switching circuit 70 provided between the antidust filter driving circuit 56 and the vibrator 20 and the body CPU 50 is available to switch wiring to the driving electrodes 32a to 32d shown in FIG. 4A. The switching circuit 70 electrically connects one of the driving electrodes 32a to 32d to the detection circuit 74 by switching one of the wirings electrically connecting the antidust filter driving circuit 56 and the driving electrodes 32a to 32d. Note that, the other driving electrodes remain to be connected to the antidust filter driving circuit 56.

When the piezo 36 provided between the driving electrode electrically connected with the detection circuit 74 (hereinafter such a driving electrode are referred to as "detection electrode") and the common electrode 34, the detection circuit 74 may detect voltage difference occurring between the detection circuit and the common electrode 34. Therefore, the camera 2 may inspect that the vibrations occur on the antidust filter 18 as planned, since the body CPU 50 analyze signals detected by the detection circuit 74 while the body CPU 50 drives the vibrator 20 via the antidust filter driving circuit 56. Note that, as shown in FIG. 4A, the antidust filter driving circuit 56 drives the vibrator 20 so as to deform the piezo 36 by outputting driving signals to the driving electrode except for detection electrode. Thus, number of the detection electrode is preferably one or two.

Figure 10:
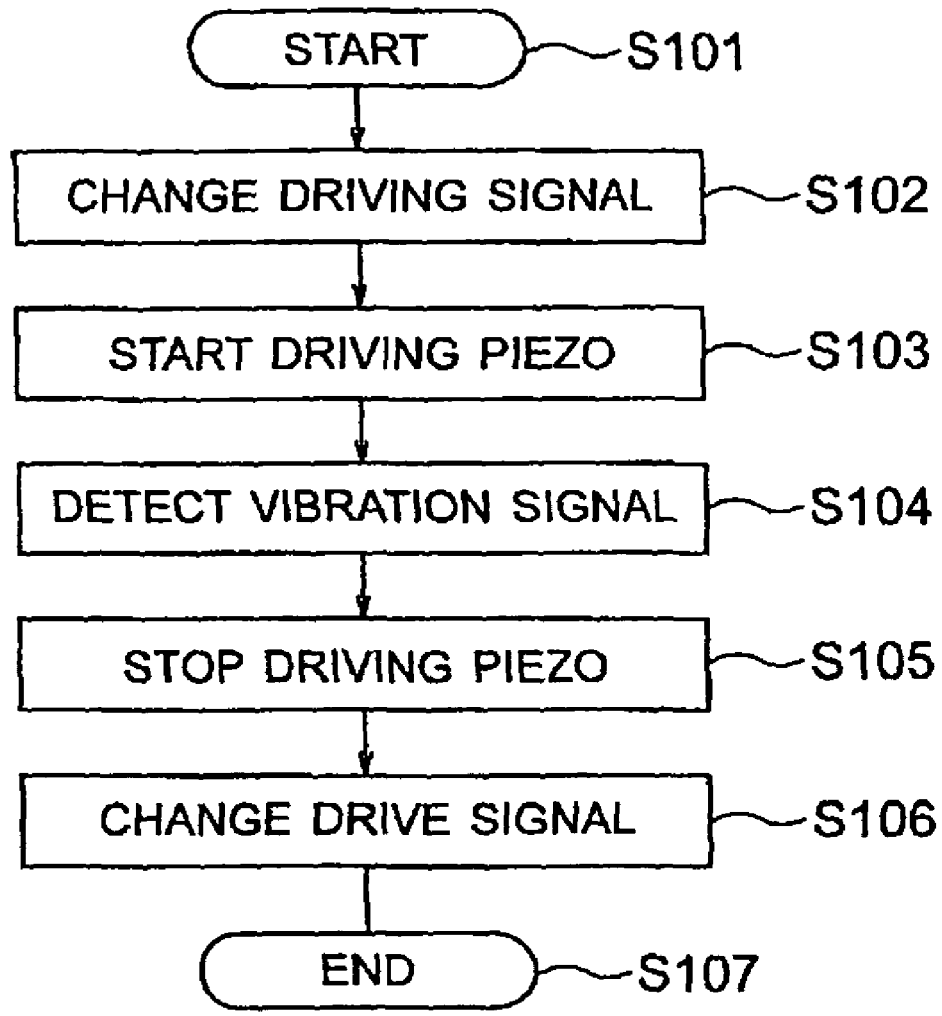
FIG. 10 is a flow chart showing a series of processes at inspection operation in a camera shown in FIG. 1.

FIG. 10 is a flow chart showing a series of procession at an inspecting operation. In step S101, the inspecting operation is started. The inspecting operation may be performed at the time of manufacturing the camera 2 shown in FIG. 1, also, it may be performed at a predetermined timing based on instructions and the like from user of the camera.

In a step S102, the switching circuit 70 shown in FIG. 4A electrically connects the second driving electrode 32b to the detection circuit 74 instead of the antidust filter driving circuit 56 by receiving instructions from the body CPU 50. Although the switching circuit 70 may connect any driving electrodes to the detection circuit 74, it is preferable to connect the driving electrode provided at a position not including vibration node 90 generated on the antidust filter 18 under every driving mode in the dust removing operation. This is because the driving electrode provided at an abdominal of the vibration may output a larger detection signal than the driving electrode provided at the node 90 of the vibration. Note that, the driving electrode connected with the detection circuit 74 may be changed in response to the vibration mode and a plurality of the driving electrode may be connected to the detection circuit 74.

In a step S103, the driving of the vibrator shown in FIG. 4A is started. For example, the body CPU 50 generates one bending vibration mode on the antidust filter 18 by controlling the antidust filter driving circuit 56 as similar with the dust removing operation specified in the flow chart of FIG. 6. However, the antidust filter driving circuit 56 does not output the driving signal to the second driving electrode 32b switched and connected to the detection circuit 74.

Figure 11:
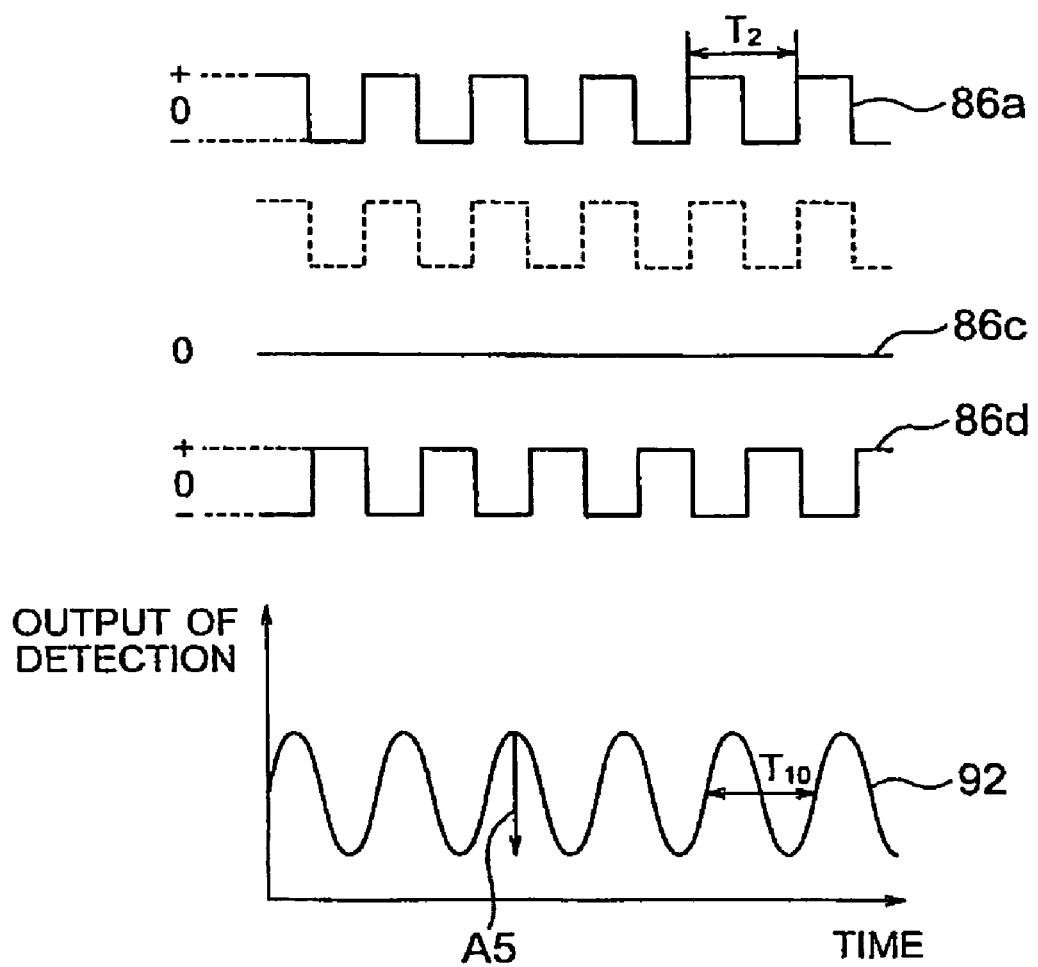
FIG. 11 shows an example of a driving signal to be output from a driver to respective electrodes and an output to be detected by a detection circuit.

Next, in a condition that bending vibration is generated on the antidust filter 18 by the antidust filter driving circuit 56, a vibration signal of the antidust filter 18 is detected by the detection electrode and the detection circuit 74 (step S104 of FIG. 10). FIG. 11 shows driving signals 86a, 86c, 86c to be output from the antidust filter driving circuit 56 to the respective driving electrodes and a signal detected by the detection circuit 74 with an aligned temporal axis.

FIG. 11 shows respective driving signal that the fifth driving signal 86a is output to the first driving electrode 32a, the seventh driving signal 86c is output to the third driving electrode 32c, the eighth driving signal 86d is output to the fourth driving electrode 32d. The respective driving signals are similar with the driving signals to be output under the eighth bending vibration mode in the dust removing operation (FIG. 9B). However, driving signal is not output to the second driving electrode 32b.

Voltages corresponding to the respective driving signals 86a, 86c, 86d are applied to the respective driving electrodes 32a, 32c, 32d shown in FIG. 4A. Here, in case that the vibrator 20 and the antidust filter 18 are operated normally, the eighth bending vibration shown in FIG. 7B is generated on the antidust filter 18 and the like.

The second section 36b of the piezo 36 deforms by receiving a force from bending vibration generated on the antidust filter 18, because it is integrally fixed to the antidust filter 18 via the common electrode 34. By occurring the deformation of the second section 36b of the piezo 36, voltage difference which is corresponding to the deformation is generated between the second driving electrode 36b as the detection electrode and the common electrode 34. Thus, the detection circuit 74 electrically connected to the second driving electrode 32b may detect a vibration signal 92 shown in FIG. 11.

A cycle T10 of the vibration signal 92 almost conforms a cycle T2 of the bending vibration generated on the antidust filter 18, amplitude A5 of the vibration signal 92 is substantially proportional to amplitude A2 of the bending vibration generated on the antidust filter 18. Therefore, by analyzing the vibration signal 92 detected at the detection circuit 74 with using the body CPU 50 and the like, vibration of the antidust filter 18 may be inspected.

For example, in case that fixation of the vibrator 20 and the antidust filter 18 is insufficient, the amplitude A5 of the vibration signal 92 leads to be small value against the designed value, or the cycle T10 of the vibration signal 92 leads to be a different value from a driving cycle T2 of the driving signal 86*a*, 86*d*. Note that, with respect to the other bending vibration modes, the bending vibration occurring on the antidust filter 18 may be inspected as similar with the eighth-order bending vibration mode.

After detecting the vibration signal 92, the driving of the vibrator 20 (piezo 36) is finished by stopping the output of the driving signal in a step S105 of FIG. 10. Further, in a step S106, the switching circuit 70 shown in FIG. 4A switches connection of the second driving electrode 32*b* from the detection circuit 74 to the antidust filter driving circuit 56.

In the step S106, a series of the inspection operation is finished. Note that, in a step S107, the body CPU 50 shown in FIG. 1 may perform processing such as displaying the inspection result on the display portion 55, recording the inspection result to EEPROM 60 and the like.

In this manner, in the present embodiment, it is not necessary to provide electrode for detection which is not used to drive the antidust filter 18, since one of the driving electrode may be used as a detection electrode. Therefore, the vibrator 20 and the image pick-up unit 4 including thereof can be downsized. Also, comparing from a detection electrode is comprised separately, the antidust filter 18 can be efficiently vibrated, antidust effect can be increased.

Second Embodiment

Figure 12A:
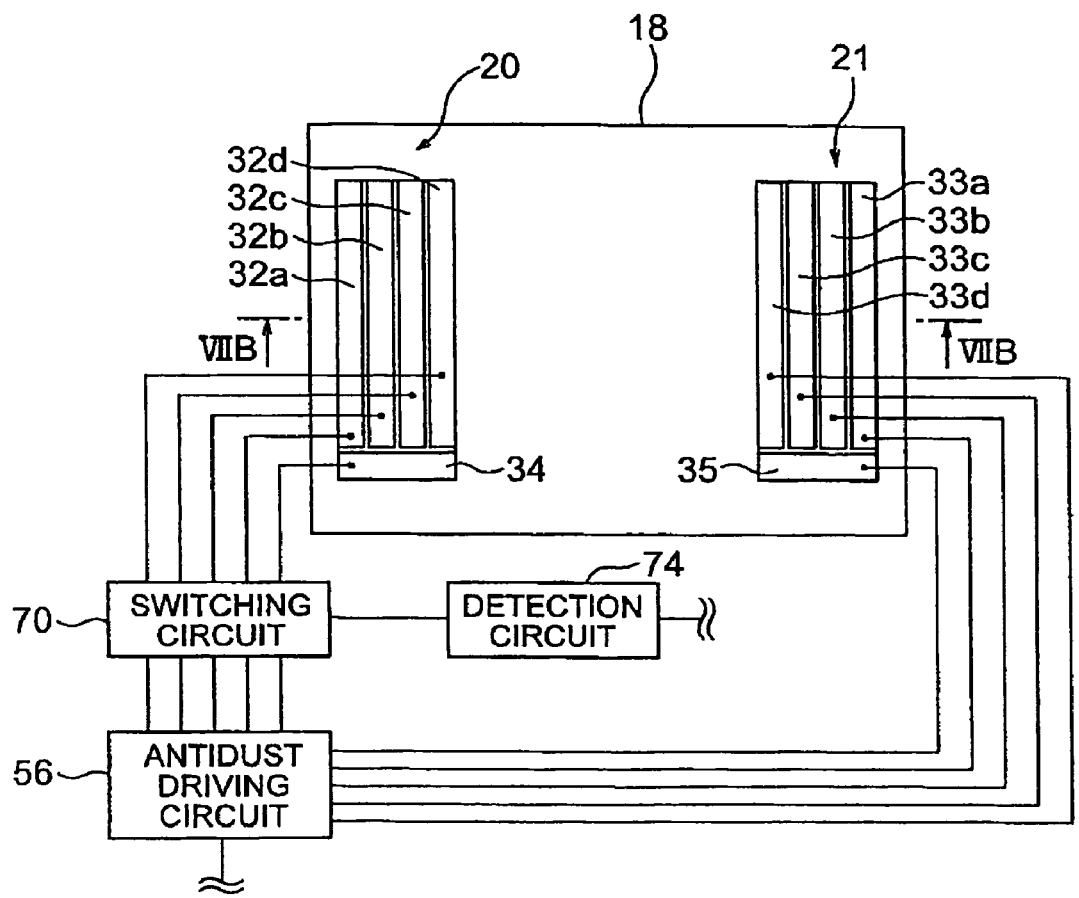
FIG. 12A is a plane view of an imaging device according to a second embodiment of the present invention.
Figure 12B:
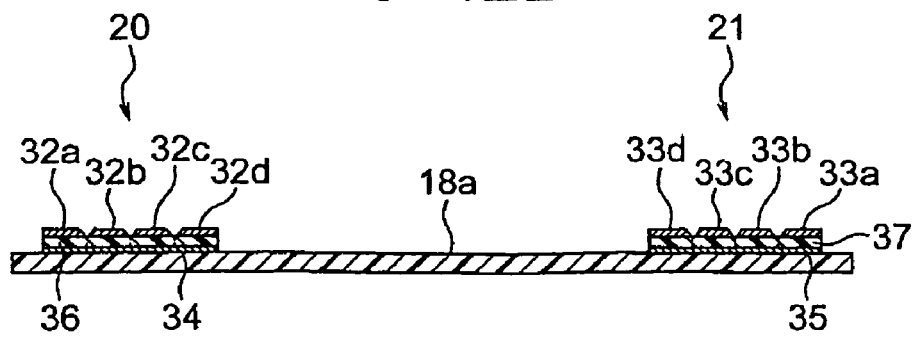
FIG. 12B is a cross sectional view along a line XIIB-XIIB of FIG. 12A.

FIG. 12A is a plane view of an antidust portion 11 according to a second embodiment of the present invention, FIG. 12B is a cross sectional view along a line XIIB-XIIB of FIG. 12A. As shown in FIG. 12A and FIG. 12B, the antidust portion 11 according to the second embodiment comprises two vibrators 20, 21. Note that, constitutions other than shown in FIG. 12A and FIG. 12B are similar with the camera 2 including the antidust portion 11 according to the first embodiment.

Namely, in the second embodiment, in addition to the vibrator 20 attached on one side of the long side direction L of the antidust filter 18, a second vibrator 21 is attached on another end of the long side direction L. The second vibrator 21 includes four sheets of a first to a fourth driving electrodes 33*a* to 33*d* which are insulated respectively, as similar with the vibrator 20. Also, as shown in a cross sectional view of FIG. 12B, the second vibrator 21 further comprises a common electrode 35 attached on an outer face 18*a* of the antidust filter 18 and a piezo 37 which is sandwiched between the first to fourth driving electrodes 33*a* to 33*d* and the common electrode 35.

The antidust filter driving circuit 56 shown in FIG. 12A outputs driving signals to the both driving electrodes 32*a* to 32*d* of the vibrator 20, and the driving electrodes 33*a* to 33*d* of the second vibrator 21. In this case, the driving signals to be output to the respective driving electrodes 33*a* to 33*d* of the second vibrator 21 may be the same with that of the respective driving electrodes 32*a* to 32*d* of the vibrator 20.

For example, in case that the ninth-order bending vibration mode shown in FIG. 9A, the first and the second driving signals 85*a*, 85*b* may be output to the first and the second driving electrodes 32*a*, 33*a*, 32*b*, 33*b*, the third and the fourth signals 85*c*, 85*d* may be output to the third and the fourth driving electrodes 32*c*, 33*c*, 32*d*, 33*d*. Also, with respect to the eighth-order to the sixth-order bending vibration modes shown in FIG. 9A to FIG. 9D, it may be output as similar to this. Namely, the body CPU 50 changes phases of the driving signals to be output to the respective driving electrodes of the second vibrator 21 in response to the order of the vending vibration generated on the antidust filter 18 and the vibrators 20, 21 as similar with vibrator 20.

Note that, as positioning of the vibrator 20 and the second vibrator 21, it is not limited to the both side portion of the long side direction of the antidust filter 18, and it may be any arrangements if the respective driving electrodes may generate bending vibrations. For example, it may be provided at both side portion of a short side direction of the antidust filter 18.

An antidust portion 11 according to the second embodiment has following effects in addition to the effect performed by the antidust portion 11 of the first embodiment. Namely, since the antidust portion 11 according to the second embodiment may drive the antidust filter 18 by using two vibrators 20, 21, a stronger bending vibration is generated on the antidust filter 18 so as to increase dust removing effects. Also, in an inspection operation by the antidust portion 11 of the second embodiment, the inspection operation may be performed, for example, with outputting driving signals to seven driving electrodes of the eight driving electrodes. Accordingly, the inspection operation may be performed with generating vibration which is more close to the bending vibration of the dust removing operation.

Third Embodiment

FIG. 13 is a block diagram showing a camera 2*c* according to a third embodiment of the present invention. A camera 2 according to the third embodiment does not include a detection circuit 74 in a camera body 40. With respect to other constitutions, they are similar with the camera 2 according to the first embodiment shown in FIG. 1 and the like.

The camera 2*c* shown in FIG. 13 is connected with an inspection device 96 at the time of vibration inspection performed in manufacturing process and the like. A detection circuit 74 is provided with the inspection device 96, the detection circuit 74 is electrically connected to one of driving electrodes of a vibrator via a switching circuit 70.

Therefore, in the inspection operation of a flow chart of FIG. 10, the vibration signal shown in FIG. 11 is displayed to an inspection display portion 98 and the like such as monitor provided in the inspection device 96. In this manner, the camera 2*c* according to the third embodiment has a simple system as compared from the constitution shown in FIG. 1 since the detection circuit 74 is not provided in a camera body 40. Note that, in a vibration inspection operated in the manufacturing process and the like of the camera, the camera can be selected as failure article and conforming article in response to an inspection result. Also, in the inspection operation, the detection circuit 74 may be electrically connected manually to a predetermined driving electrode, without providing the switching circuit 70 in the camera body 40.

Fourth Embodiment

Figure 14:
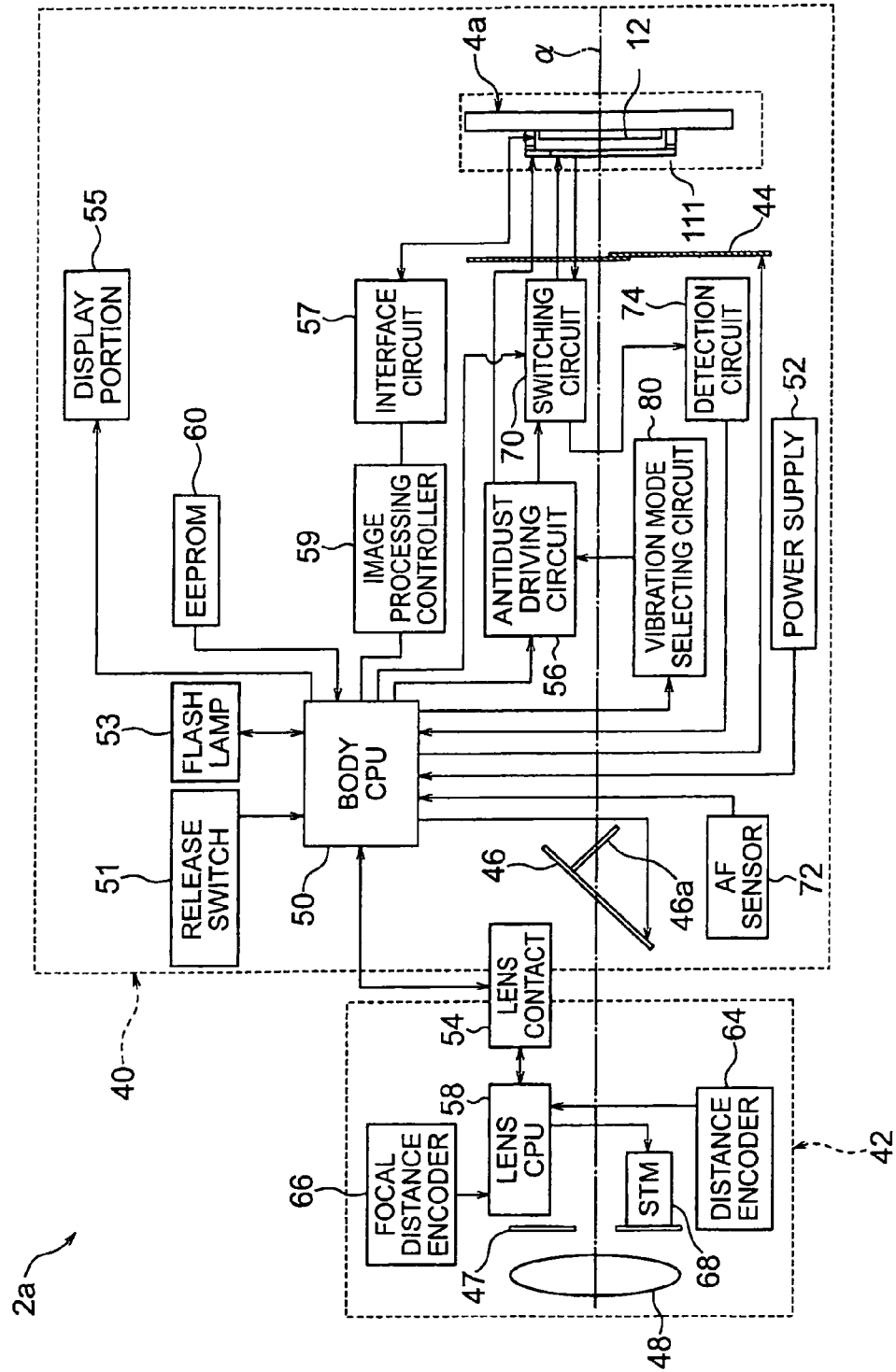
FIG. 14 is whole block diagram of a camera according to a fourth embodiment of the present invention.

Whole constitution of a camera 2*a* of the present embodiment is similar with the camera 2 according to the first embodiment specified with using FIG. 1, except for an image pick-up unit 4*a*, as shown in FIG. 14.

An antidust filter driving circuit 56 according to a fourth embodiment is electrically connected to an antidust portion 111 and a switching circuit 70. As shown in FIG. 17A, a first vibrator 120 and a second vibrator 121 are provided on the antidust portion 111. The antidust filter driving circuit 56 is electrically connected with respective electrodes of the first vibrator 120. Also, the antidust filter driving circuit 56 may be electrically connected with the second vibrator, via the switching circuit 70.

The antidust filter driving circuit 56 may drive the first and the second vibrators 120, 121 by receiving control from the body CPU 50, when a predetermined condition is satisfied. The antidust filter driving circuit 56 may perform dust removing performance to remove the dust adhered on a surface of the antidust filter 118, by driving, for example, the first vibrator 120 so as to generate bending vibration on an antidust filter 118 as shown in FIG. 20A to FIG. 20D.

The antidust filter driving circuit 56, as similar with the first embodiment (FIG. 1), outputs a driving signal such as periodic rectangular wave or sine wave and the like (FIG. 9A to FIG. 9D) to the first vibrator 120. Electric voltage in response to the driving signal is applied to a piezo 136 of the first vibrator 120 shown in FIG. 17C via a first to a fourth driving electrodes 132a to 132d.

The first piezo 136 to which electric voltage is applied generates bending vibration on an antidust filter 118 by expansion and contraction towards a long side direction L of the antidust filter 118. The dust adhered on the surface of the antidust filter 118 comes off from the surface of the antidust filter 118 because a force received from the bending vibration exceeds an adherence of the dust. Note that, a capturing means constituted by adhesive tape and the like may be provided around the antidust filter 118 so as to capture the dust removed from the surface of the antidust filter 118 by the bending vibration.

Preferably, as for the driving frequency of the first and the second vibrators 120, 121, it is preferable to be a resonance frequency to resonate the surface of the antidust filter 118, in order to provide large amplitude to the antidust filter 118. A resonate frequency is determined by a shape, material, manner of support and vibration mode of the antidust filter 118.

In the present embodiment, as shown in FIG. 14, a vibration mode selecting circuit 80 is connected with the antidust filter driving circuit 56. The vibration mode selecting circuit 80 determines driving signal and a frequency thereof to be output from the antidust filter driving circuit 56 by receiving instructions from the body CPU 50. Also, the antidust driving circuit 56 outputs the driving signal to the antidust portion 111 based on determination of the vibration mode selecting circuit 80.

Namely, the vibration mode selecting circuit 80 may change an order of the bending vibration generated on the antidust filter 118 of the antidust portion 111 by changing the driving signal and the frequency thereof to be output from the antidust driving circuit 56. Relation of the driving signal to be output from the antidust filter driving circuit 56 and the bending vibration generated on the antidust filter 118 will be mentioned below.

Figure 15:
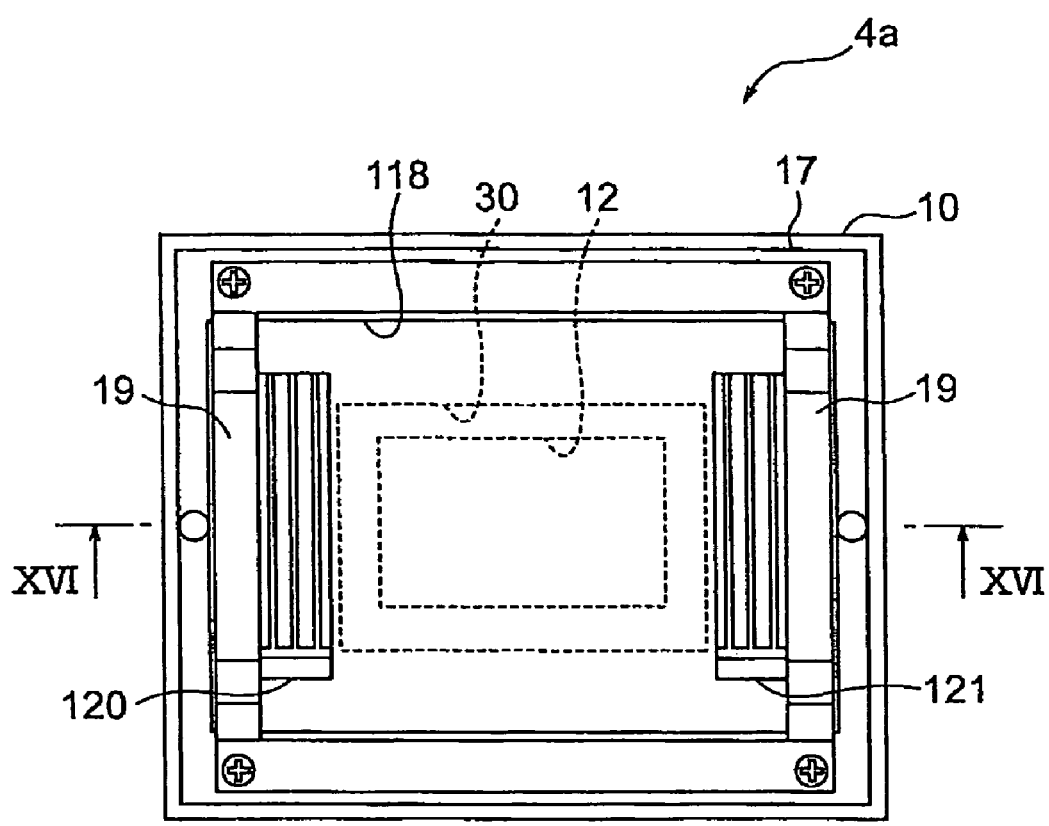
FIG. 15 is a plane view of an imaging device shown in FIG. 14.
Figure 16:
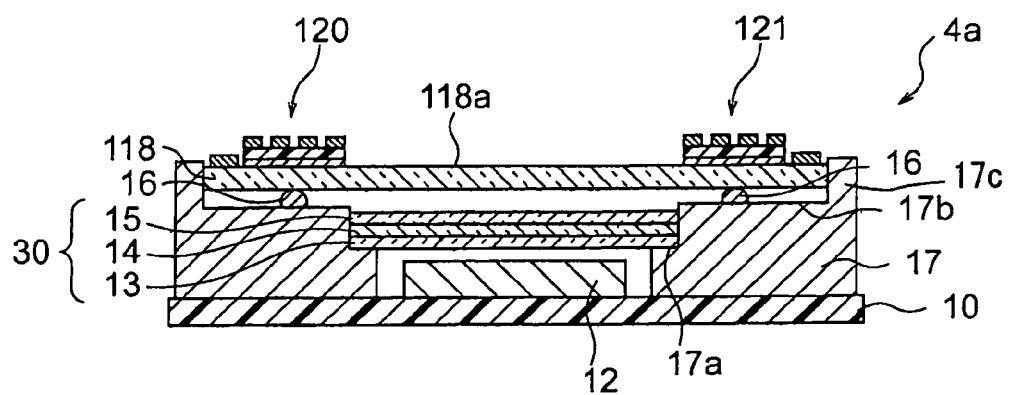
FIG. 16 is a schematic cross sectional view along a line XVI-XVI shown in FIG. 15.

As shown in FIG. 15 and FIG. 16, the image pickup element unit 4a according to the present embodiment includes a substrate 10, and the image pickup element 12 is fixed on an upper face of center portion of the substrate 10. A case 17 is arranged at a circumference of the image pickup element 12, and the case is detachably or not detachably fixed to a surface of the substrate 10.

As shown in FIG. 15, in the image pickup element unit 4a, the image pickup element 12 is sealed by a case 17, an optical member element 30 and the like. A sealing constitution of the image pickup element 12 provided with the image pickup unit 4a according to the fourth embodiment is similar with the image pickup unit 4 according to the first embodiment shown in FIG. 2 and FIG. 3.

In the present embodiment, as shown in FIG. 16, the first vibrator 120 which generates bending vibration to the antidust filter 118 and the second vibrator 121 which detects the bending vibration of the antidust filter 118 are fixed on an outer face 118a, which is an opposite face to a side where the image pickup element 12 of the antidust filter 118 is provided, by adhesive agent and the like. Namely, the antidust portion 111 comprises the antidust filter 118, the first vibrator 120 and the second vibrator 121.

The pressing member 19 shown in FIG. 15 and FIG. 16 is fixed detachably to the outer circumferential side attaching portion 17b of the case 17, for example by a screw. Also, the antidust filter 118 having a rectangular shape is determined its layout toward a long side direction L by a positioning pin 17c formed on an upper face of the case 17. Note that, the hermetic sealing member 16 shown in FIG. 16 is composed by material having low rigidity, for example foam resin, rubber and the like, which restrains transferring vibration of the antidust filter 118 to the case 17 by absorbing vibration movement of a antidust filter 118 which will be mentioned below.

An optical member element 30 shown in FIG. 16, as similar with the first embodiment, has a layered structure of a plurality of optical plates which is composed of a layered plate of a crystal plate 13, an infrared ray absorbing glass plate 14 and a crystal wavelength plate (λ/4 wavelength plates). Also, an optical low pass filter (OLPF) is composed by a crystal plate 13 and the antidust filter 118 arranged as spaced each other, and the infrared ray absorbing glass plate 14 and the crystal wavelength plate 15 provided in which they are sandwiched between the crystal plate 13 and the antidust filter 118. However, as a light transmissive member according to the present invention, it is not limited to the antidust filter 118 which is on part of the optical low pass filter.

FIG. 17A is a plane view of the antidust filter 118 to which the first vibrator 120 and the second vibrator 121 are attached. On the antidust filter 118, the first vibrator 120 is mounted at one side portion of a long side direction L, the second vibrator 121 is mounted at another side portion of the long side direction L.

The first vibrator 120 comprises four sheets of a first to a fourth driving electrodes 132a to 132d which are arranged along the longitudinal direction L, and are electrically insulated respectively. Also, as shown in a cross sectional view of FIG. 17B, the first vibrator 120 further comprises a first common electrode 134 attached to the outer face 118a of the antidust filter 118 and a first piezo 136 sandwiched between the first to fourth driving electrodes 132a to 132d and the first common electrode 134.

As similar with the first vibrator 120, the second vibrator 121 comprises four sheets of a first to fourth detection electrodes 133a to 133d which are arranged along the longitudinal direction L, and are electrically insulated respectively. Also, As similar with the first vibrator 120, as shown in a cross sectional view of FIG. 17A, the second vibrator 121 further comprises a second common electrode 135 attached to the outer face 118a of the antidust filter 118 and a second piezo 137 (FIG. 17C) sandwiched between the first to fourth detection electrodes 133a to 133d and the first common electrode 135.

Figure 17B:
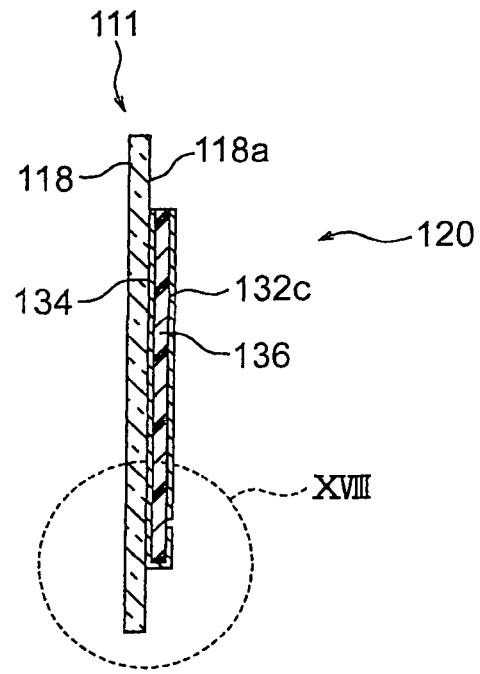
FIG. 17B is a cross sectional view along a line XVIIB-XVIIB shown in FIG. 17A.
Figure 18:
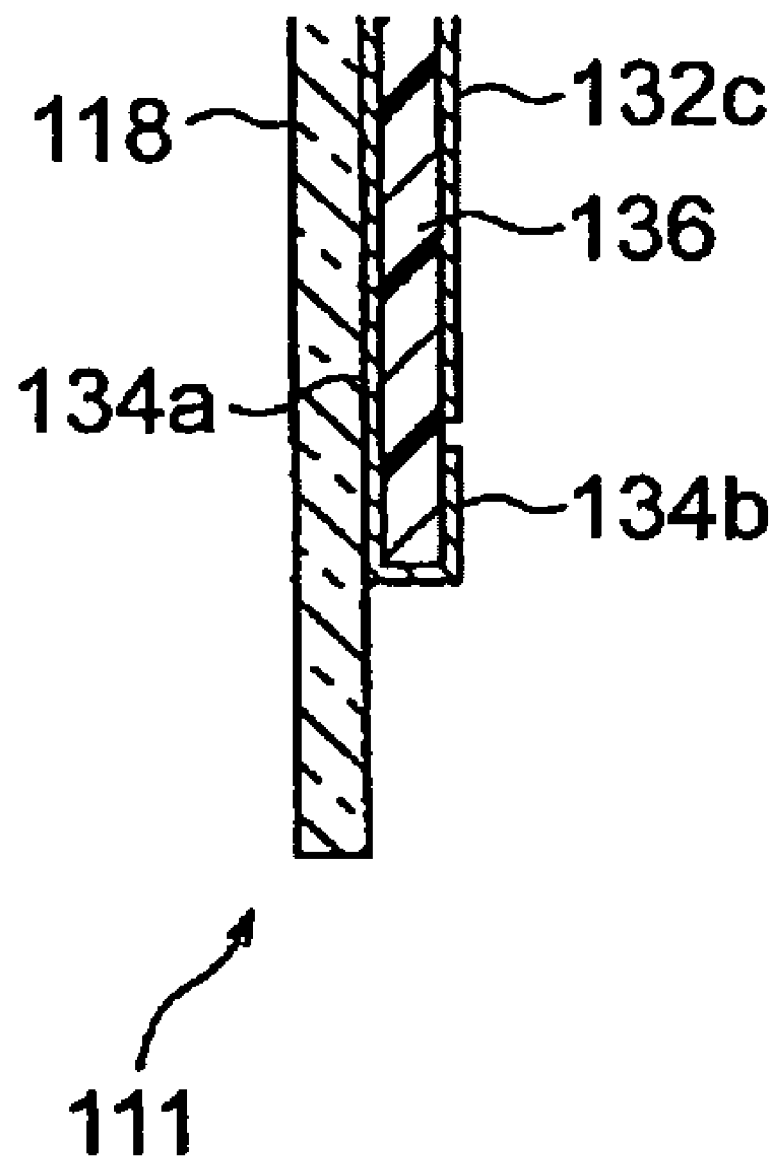
FIG. 18 is a main section enlarged cross sectional view enlarging one portion of the cross sectional view of FIG. 17B.

FIG. 18 is enlarged cross sectional view enlarging one portion of the first vibrator 120 shown in FIG. 17B. The first common electrode 134 comprises a first portion 134a which is opposed to driving electrodes such as a third driving electrode 132c and a second portion 134b bent from the first portion 134a to sandwich the piezo 136. The first portion 134a is provided on a surface of the antidust filter 118 side at the piezo 136. The second portion 134b is provided on a surface opposed to the surface of the antidust filter 118 side at the piezo 136. Note that, with respect to the second common electrode 135 of the second vibrator 121 shown in FIG. 17A, also it comprises a first portion and a second portion bent from the first portion to sandwich the piezo 137, as similar with the first common electrodes 134.

The second portions 134b of the first common electrode 134 and the second common electrode 135 are formed as they are bent from the first portion 134a provided on the outer face of the antidust filter 118. Since the first portion 134a and the second portion 134b are electrically connected, wiring may be achieved with connecting electrically a switching circuit 70 to the second portion 134b provided at a front surface of the first and second vibrators 120, 121. Therefore, it is easy that wiring from the first common electrode 134 and the second common electrode 135 to the antidust filter driving circuit 56 or the switching circuit 70.

Figure 17C:
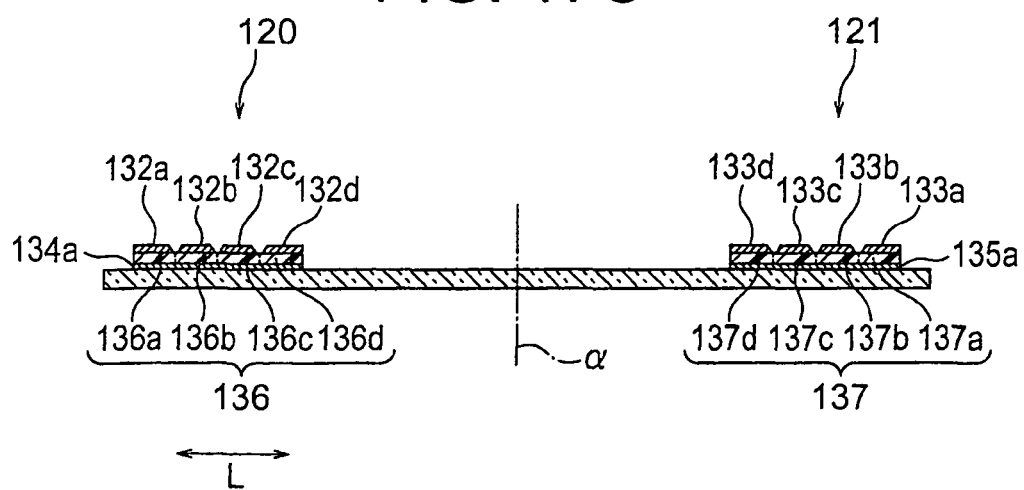
FIG. 17C is a cross sectional view along a line XVIIC-XVIIC shown in FIG. 17A.

As shown in FIG. 17C, the first portion 134a of the first common electrode 134 is arranged on the first piezo 136 opposite to the first to the fourth electrode 132a to 132d. The first piezo 136 is deformed by a voltage potential difference formed between the first portion 134a of the first common electrode 134 and the respective driving electrode 132a to 132d. In the present embodiment, the bending vibration is generated on the antidust filter 118 by using deformation of the long side direction L of the piezo 136.

The first common electrode 134 and the second common electrode 135 are held at predetermined voltage, during the following mentioned the antidust operation. However, in view of that the vibrators 120, 121 are driven with saving electric power, it is desirable to hold the first common electrode 134 and the second common electrode 135 at a ground potential during the dust removing operation.

The first to fourth driving electrodes 132a to 132d are wired to the antidust filter driving circuit 56, as shown in FIG. 17A. The antidust filter driving circuit 56 outputs driving signals selected by the vibration mode selecting circuit 80 shown in FIG. 14, to the respective first to fourth driving electrodes 132a to 132d individually.

Also, the antidust filter circuit 56 may output driving signals having different phases respectively to the respective driving electrodes 132a to 132d by controlling from the body CPU 50. Therefore, as shown in FIG. 17C, the piezo 136 is controlled as divided to the first to the fourth section 136a to 136d, and as arranged along with the longitudinal direction L corresponding to the respective driving electrodes 132a to 132d.

However, the first piezo 136 is formed integrally, the first to the fourth section 136a to 136d of the first piezo 136 have an identical direction of polarization. Thus, when polar characters of the voltage applied to the respective driving electrodes 132a to 132d are identical, deformation directions of the respective sections 136a to 136d of the first piezo 136 become identical. Contrary, when polar characters of the voltage applied to the first to the respective driving electrodes 132a to 132d are different, the respective sections 136a to 136d of the first piezo 136 deform in reverse direction, respectively.

For example, when electric voltage is applied to the respective driving electrodes 132a to 132d so as to be polar characters of the first and the second driving electrodes 132a, 132b are positive, polar characters of the third and the fourth driving electrodes 132c, 132d are negative, the piezo 136 deforms as shown in FIG. 20A. Namely, deformation of contracting towards the long side direction L of the antidust filter 118 occurs to the first and the second section 136a, 136b of the first piezo 136.

Against this, elongated deformation towards the long side direction L of the antidust filter 118 occurs to the third and the fourth sections 136c, 136d of the first piezo 136. Note that, the first common electrode 134 which is omitted in FIG. 20A is held as ground potential.

As mentioned above, in spite of the first piezo 136 is formed integrally and having substantially uniform polar direction, the deformations are controlled as each of the first to the fourth sections 136a to 136b in response to the respective driving electrodes 132a to 132d. However, these are included in modified versions of the present embodiments that the respective section 136a to 136d of the piezo 136 or the first common electrode 134 are divisionally formed as the driving electrode 132. By the first vibrator 120 comprises a plurality of the driving electrodes, the antidust filter 118 may be driven efficiently, even under high order vibration mode which cannot eliminate to generate vibration nodes 95 at a position where the vibrator is provided.

Contrary to the above, the first portion 135a of the second common electrode 135 in the vibrator 121 is arranged on the second piezo 137 opposite to the first to fourth detection electrodes 133a to 133d, as shown in FIG. 17C. During dust removing operation, voltage differences corresponding to deformation generated on the second piezo 137 occur between the first portion 135a of the second common electrode 135 and the respective detection electrodes 133a to 133d.

The first to fourth detection electrodes 133a to 133d are connected with the detection circuit 74 via the switching circuit 70 shown in FIG. 17A during the dust removing operation. Voltage change occurring to the first to fourth detection electrode 133a to 133d may be detected individually, via the detection circuit 74. Namely, as shown in FIG. 17C, the respective detection electrode 133a to 133d may individually detect voltage changes occurring in response to deformation of respective sections 137a to 137d of the second piezo 137 which are opposite to any one of detection electrodes 133a to 133d.

Also, the second piezo 137 is formed integrally as similar with the first piezo 186 and comprises an identical polarization direction. Thus, when deformation directions of the respective sections 137a to 137d are an identical, polar characters of voltage detected by the respective detection electrodes 133a to 133d will be an identical. Contrary this, when the deformation direction of the respective sections 137a to 137d are reverse direction, the polar characters of voltage detected by the respective detection electrodes 133a to 133d will be opposite.

For example, in FIG. 20A, since contraction deformations to the long side direction L of the antidust filter 118 occur on the first and second sections 137a, 137b, electric potential to make polar character of electrodes positive is generated on the first and the second detection electrodes 133a, 133b. To the contrary, since elongated deformations to the long side direction L of the antidust filter 118 occur on the third and fourth sections 137c, 137d, electric potential to make polar character of electrodes positive negative is generated on the third and the fourth detection electrodes 133a, 133b. Note that, the first and the second common electrodes 134, 135 which are omitted in FIG. 20A are held as ground potential.

Here, the respective detection electrodes 133a to 133d of the second vibrator 121 are provided corresponding to the respective driving electrodes 132a to 132d of the first vibrator 120. Namely, in the present embodiment, the first vibrator 120 and the second vibrator 121 have substantially identical form, providing spaces between the respective detection electrodes 133a to 133d are substantial equal to providing spaces of the respective driving electrodes 132a to 132d.

It is preferable that the first driving electrode 132a and the first detection electrode 133a are symmetrically provided along vibration direction L of the antidust filter 118. With respect to the second to fourth driving electrodes 132b to 132d and the second to fourth detection electrodes 133b to 133d are similar too. Also, the first driving electrode 132a and the first detection electrode 133a may be provided at positions where distances from the vibration nodes 95 of the bending vibration being substantially identical each other. Thereby, with respect to the second to fourth driving electrodes 132b to 132d are provided at positions where distances from the vibration nodes 95 of the bending vibration to them are substantially identical to distances from the vibration nodes 95 to the second to fourth detection electrodes 133b to 133d.

Further, the respective detection electrodes 133a to 133d may be provided at positions where displacements generated by the bending vibration are substantially synchronized with the respective driving electrodes 132a to 132d. Alternatively, the respective detection electrodes 133a to 133d may be provided at positions where displacements generated by the bending vibration are shifted substantially a half cycle to the respective driving electrodes 132a to 132d. Thereby, it is possible to make a relation that detected signals 189a to 189d detected by the respective detection electrodes 133a to 133d may be synchronized or half cycle shifted with the corresponding driving signals 85a to 85d.

Note that, the switching circuit 70 shown in FIG. 17A may electrically connect the respective detection electrodes 133a to 133d to the antidust filter driving circuit 56 by instructions from the body CPU 50 instead of the detection circuit 74. The detection electrodes 133a to 133d may be used as driving electric electrodes so as to generate bending vibration on the antidust filter 118 by connecting respective detection electrodes 133a to 133d to the antidust filter driving circuit 56.

In this case, deformation acceleration of the surface of the antidust filter 118 may becomes larger and the antidust effect may be increased since forces for generating the bending vibration are provided by both of the first vibrator 120 and the second vibrator 121. Note that, phases of the driving signals added to the respective driving electrodes 132a to 132d and the respective detection electrodes 133a to 133d are adjusted so that vibration generated by the first vibrator 120 and the vibration generated by the second vibrator 121 are overlapped each other.

Figure 19A:
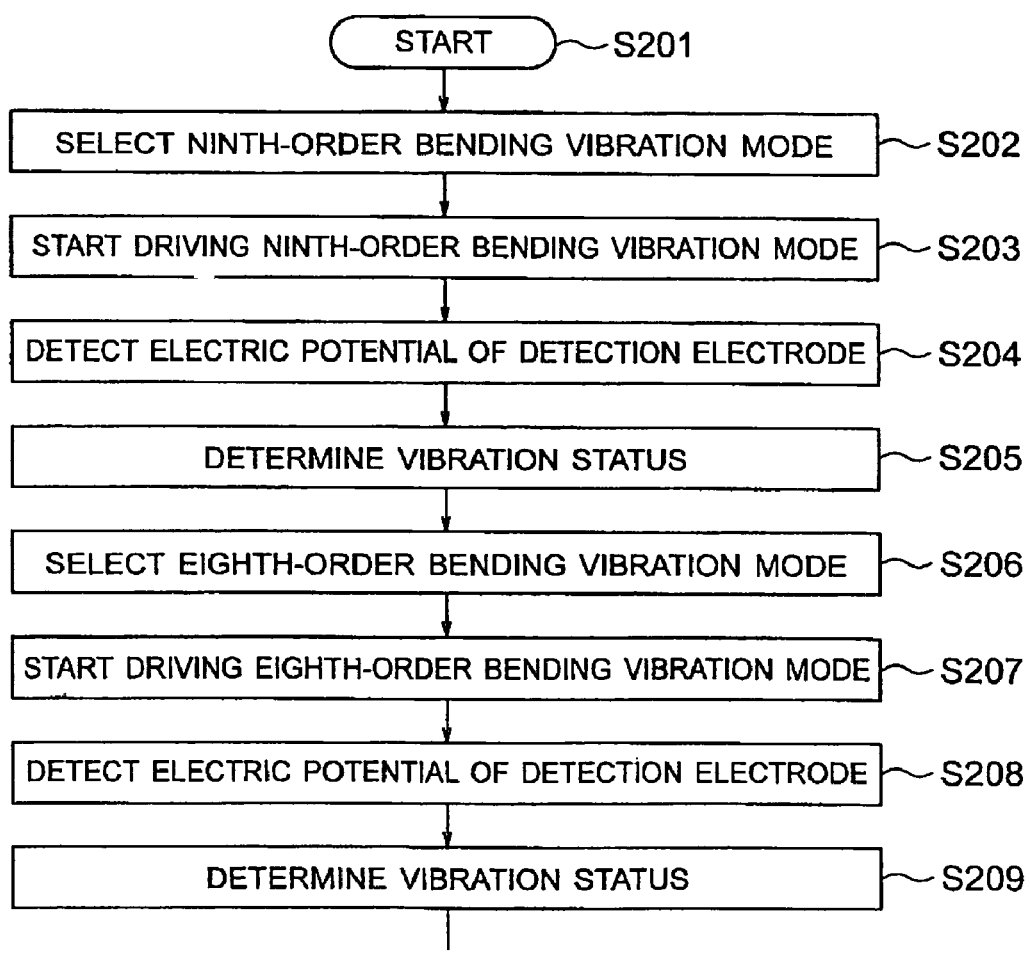
FIG. 19A is a first half portion of a flow chart showing a series of processes in antidust operation of a camera shown in FIG. 14.
Figure 19B:
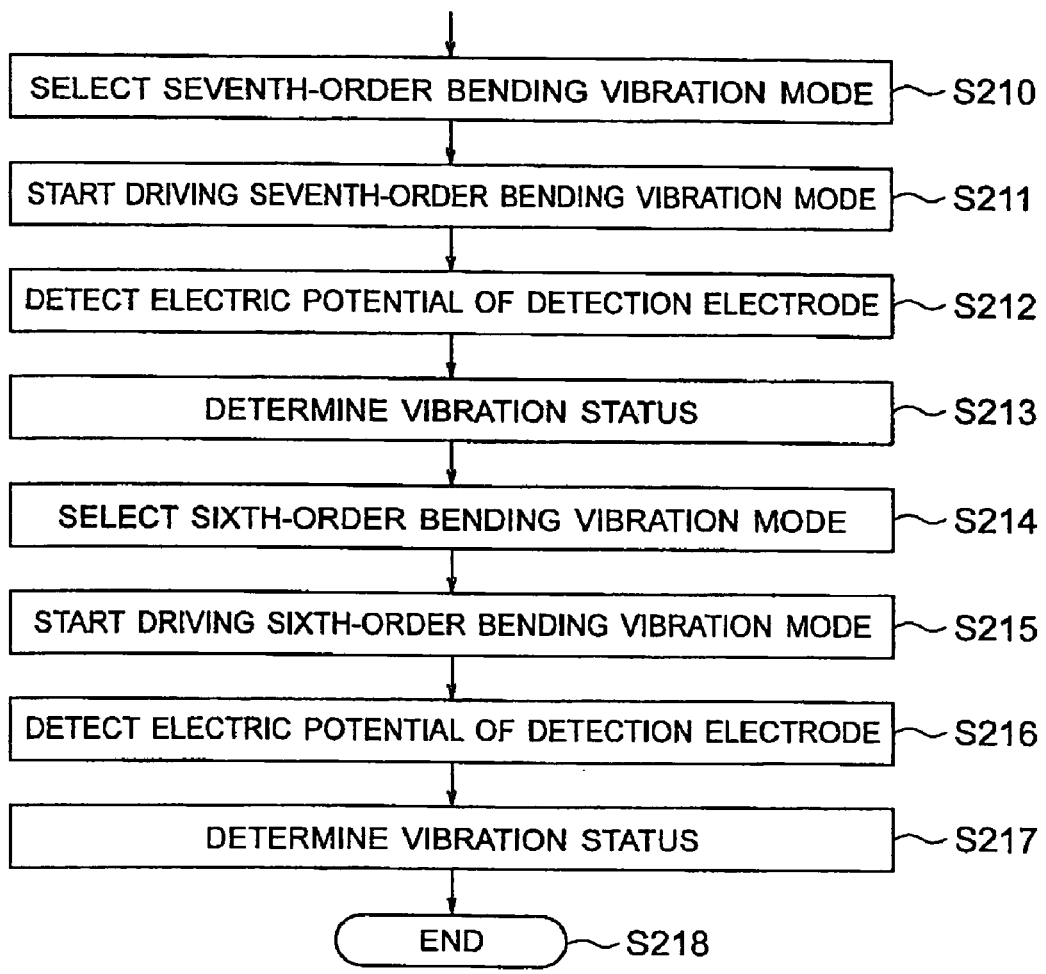
FIG. 19B a latter portion of a flow chart showing a series of processes in antidust operation of a camera shown in FIG. 14.

A series of procession at dust removing operation in the camera 2a shown in FIG. 14a will be specified by using flow charts shown in FIG. 19A and FIG. 19B. In a step S201, the body CPU 50 outputs a dust removing operation starting signal to commence the dust removing operation. The dust removing operation may be started in response to a predetermined action of the camera such as power ON action and the like, also, it may be started in response to selecting signal based on user actions from menu button and the like provided with a main body.

After starting the dust removing operation, an order of the bending vibration generated on the antidust filter 118 shown in FIG. 14 is determined (step S202). Here, the antidust driving circuit 56 according to the present embodiment may generate a sixth order bending vibration (FIG. 20D), a seventh order bending vibration (FIG. 20C), an eighth order bending vibration (FIG. 20B) and a ninth order bending vibration (FIG. 20A) on the antidust filter 118.

FIG. 8 shows a relation of a frequency of the driving signal applied to the first vibrator 120 and a vibration acceleration of the bending vibration generated on the antidust filter 118, under a predetermined condition of environment, such as temperature and the like. In the antidust filter 118 according to the present embodiment, when the first vibrator 120 is driven at standard resonance frequencies f1 to f4, the vibration acceleration of the bending vibration generated at the antidust filter 118 takes local maximum value. When the first vibrator 120 is driven at frequencies adjacent to the standard resonance frequencies f1 to f4 respectively, the corresponding sixth to ninth order vending vibrations occurs on the antidust filter 118 as shown in FIG. 20D to FIG. 20A. Note that, the information relating to the standard resonance frequencies f1 to f4 are recorded on the EEPROM 60 and the like shown in FIG. 14.

In the step S202, the vibration mode selecting circuit 80 selects the ninth-order vibration mode by receiving the dust removing operation starting signal from the body CPU 50. The vibration mode selecting circuit 80 instructs the antidust filter driving circuit 56 to drive the first vibrator 120 at the ninth-order bending vibration mode.

In a step S203, the antidust filter driving circuit 56 drives the first vibrator 120 at the ninth-bending vibration mode. In the present embodiment, the antidust filter driving circuit 56 outputs driving signals 85a to 85d shown in FIG. 9A to the first to the fourth driving electrodes 132a to 132d shown in FIG. 17A.

At this time, a driving frequency which is an inverse number of a driving cycle T1 is swept from a first value f4+Δf which is higher by a predetermined value Δf than the standard resonance frequency f4 shown in FIG. 8 to a second value f4−Δf which is lower by a predetermined value Δf from the standard resonance frequency f4. This is because, the resonance frequency, in which the bending acceleration on the antidust filter 118 at the ninth bending vibration mode is being local maximum value, changes in response to a condition of the antidust filter 118 provided.

In this manner, the antidust filter driving circuit 56 outputs driving signals with changing the driving frequencies of the driving signal from the first value f4+Δf to the second value f4−Δf to drive the vibrator 120. Therefore, the antidust filter driving circuit 56 may generate bending vibration to the antidust filter 118 so that the vibration acceleration of the antidust filter 118 becomes local maximum value in spite of provided condition of the antidust filter 118. Namely, since the antidust filter driving circuit 56 may provide the larger vibration acceleration to the antidust filter 118, effective dust removing can be operated.

In the ninth vibration mode, a ninth bending vibration shown in FIG. 20A is generated. In the ninth bending vibration, a standing wave having ten vibration nodes 95 occur on the antidust filter 118. Also, the first vibrator 120 and the second vibrator 121 fixed on the surface of the antidust filter 118 vibrate in accordance with the standing wave generated at the surface of the antidust filter 118. In the ninth-bending vibration, one vibration node 95 of the vibration nodes 95 which are generated on the antidust filter 118, occurs at a position sandwiched between the second driving electrode 132b and the third driving electrode 132c.

In the ninth-vibration mode, phases of driving signals to be output to the first and the second driving electrode 132a and 132b and phase of driving signals to be output to the third and the fourth driving electrodes 132c, 132d are different, respectively. A first driving signal 85a of FIG. 9A shows a driving signal to be output to the first driving electrode 132a, a second driving signal 85b shows a driving signal to be output to the second driving electrode 132b respectively, a third driving signal 85c shows a driving signal to be output to the third driving electrode 132c, a fourth driving signal 85d shows a driving signal to be output to the fourth driving electrode 132*d*, respectively. Also, the first to fourth driving signals 85*a* to 85*d* shown in FIG. 9A correspond to polar characters and magnitudes of the voltage applied to the first to fourth driving electrodes 132*a* to 132*d*.

The first driving signal 85*a* and the second driving signal 85*b* are different from the third driving signal 85*c* and the fourth driving signal 85*d* in phases at half cycle. Also, the first driving signal 85*a* and the second driving signal 85*b* have opposite polar characters to those of the third driving signal 85*c* and the fourth driving signal 85*d* in the case of comparing at the same time. Namely, in the ninth vibration mode, the polar characters of the first driving signal 85*a* and the second driving signal 85*b* shown in FIG. 20A are reverse with respect to the polar characters of the third driving signal 85*c* and the fourth driving signal 85*d*.

As above, in the ninth vibration mode, the driving signals 85*a* to 85*b* as shown in FIG. 9A are output to the respective driving electrodes 132*a* to 132*d*. Thereby, as shown in FIG. 20A, respective sections 136*a* to 136*d* of the first piezo 136 receive deformations suitable to deforming direction. Note that, FIG. 20A shows vibration status of the antidust filter 18 at the time t1 shown in FIG. 9A.

Namely, the antidust filter 118 may receive a force which amplifies oscillation of the bending vibration from the respective sections 136*a* to 136*d* of the first piezo 136. In this manner, the antidust filter driving circuit 56 may vibrate the antidust filter 118 efficiently by outputting the driving signals which are suitable to the bending vibration generated on the antidust filter 118 to the respective electrodes 132*a* to 132*d* of the vibrator.

As shown in FIG. 20A, the detection circuit 74 shown in FIG. 17A detects electric potential of the respective detection electrodes 133*a* to 133*d* of the second vibrator 121 (step S204) at the same time of generating bending vibration to the antidust filter 118 by the driving electrodes 132*a* to 132*d*. Note that, the body CPU 50 outputs a signal to the switching circuit 70 at first of the step S204 or before starting of the step S204 to electrically connect the respective detection electrodes 133*a* to 133*d* and the detection circuit 74.

A left side graph of FIG. 21A shows a first to fourth detecting signals 189*a* to 189*d* to be output from the first to fourth detection electrodes 133*a* to 133*d* in the ninth bending vibration mode shown in FIG. 20A. Since respective sections 137*a* to 137*d* of the second piezo 137 shown in FIG. 20A are integrally fixed to the antidust filter 118 via the second common electrode shown in FIG. 17C, they are deformed by receiving a force from the bending vibration generated on the antidust filter 118. According to the deformation of the respective sections 137*a* to 137*d* of the second piezo 137 shown in FIG. 20A, voltage difference corresponding to the deformation is generated between the respective detection electrodes 133*a* to 133*d* facing to the respective sections 137*a* to 137*d* and the second common electrode 135. Therefore, the detection circuit 74 electrically connected with the respective detection electrodes 133*a* to 133*d* may detect the first to fourth detection signal 189*a* to 189*d* shown in FIG. 21A.

In a step S205, vibration status of the antidust filter 118 is determined as to whether it is normal or not based on the detection signals 189*a* to 189*d* shown in FIG. 21A. Cycles T5 of the detection signals of the respective detection signals 189*a* to 189*d* substantially conforms to cycles of the bending vibrations generated to the respective driving electrodes 132*a* to 132*d*, amplitudes A1 to A4 of the detection signals 189*a* to 189*d* are substantially proportional to amplitudes of the bending vibration generated to the respective driving electrodes 132*a* to 132*d*.

Therefore, according to analyzing the detected signals 189*a* to 189*d* by the body CPU 50 and the like, vibration status of the antidust portion may be inspected. For example, in case that fixation of the first vibrator 120 and the antidust filter 118 is insufficient, the amplitudes A1 to A4 of the detection signals 189*a* to 189*b* become smaller value to the designed value, the malfunction of the vibration is detected. Alternatively, in that case, the cycle T5 of the detection signals 189*a* to 189*d* become different values from the driving cycle T1 of the driving signals 86*a* to 86*d*, the malfunction of the vibration is detected.

Prior to analyzing the detection signals 189*a* to 189*d* shown in FIG. 21A, polar characters of the detection signals 189*a* to 189*d* may be adjusted in response to polar characters of the driving signals 85*a* to 85*d* (FIG. 9A) to be output to the driving electrodes 132*a* to 132*d* corresponding to the respective detection electrodes.

For example, in the ninth bending vibration mode, the first driving signal 85*a* and the second driving signal 85*b* shown in FIG. 9A are that polar characters thereof are reversed against the third driving signal 85*c* and the fourth driving signal 85*d*. Consequently, the first driving signal 85*a* and the second driving signal 85*b* shown in FIG. 9A are overlapped with inverting polar characters thereof to the third driving signal 85*c* and the fourth driving signal 85*d*.

In this manner, a fifth detection signal 189*e* shown in a right side of the FIG. 21A may be obtained by overlapping the detection signals 189*a* to 189*d* with or without inverting the polar characters, according to relations of polar characters between the driving signals 85*a* to 85*d*. The fifth detection signal 189*e* is that amplitude of the signal A5 is larger with respect to the first to fourth detection signal 189*a* to 189*d*, and includes high detection sensitivity of bending vibration. Therefore, by inspecting the vibration status of the antidust filter 118 and the antidust portion 111 including thereof with using the fifth detection signal 189*e*, inspection with high credibility may be operated with reducing effects of background noise and the like. Also, since it is possible to operate inspection even if the electric charge generated by one detection electrode is low, the second vibrator 121 may be downsized.

Note that, as a method for adjusting the polar characters of the detection signals, it is not limited to the above mentioned inverting polar characters, for example, a method for shifting phases of the detection signals 189*a* to 189*b* in response to phase shifting of the driving signal to be output to corresponding driving electrodes may be used.

After detecting the vibration status in the ninth-order bending vibration mode, in a step S206 shown in FIG. 19A, the vibration mode selecting circuit 80 selects the eighth-order vending mode. Then, the vibration mode selecting circuit 80 instructs the antidust filter driving circuit 56 so as to drive the first vibrator 120 under the eighth bending vibration mode.

In a step S207, the antidust filter driving circuit 56 starts to drive the first vibrator 120 under the eighth bending vibration mode. In the present embodiment, the antidust filter driving circuit 56 outputs a driving signal shown in FIG. 9B to the respective driving electrodes 132*a* to 132*d* shown in FIG. 17A.

Driving frequencies which are inverse numbers of driving frequencies T2 shown in FIG. 9B are swept from a first value f3+Δf which is higher by a predetermined value Δf than the standard resonance frequency f3 shown in FIG. 8 to a second value f3−Δf which is lower by a predetermined value Δf from the standard resonance frequency f3.

In the eighth vibration mode, the eighth-order bending vibration is generated as shown in FIG. 20B. In the eighth-order bending vibration, a standing wave having nine vibration nodes 95 are generated on the antidust filter 118. Also the first and the second vibrators 120, 121 vibrate in accordance with a standing wave generated on a surface of the antidust filter 118. In the eighth-order bending vibration, one vibration node 95 of the vibration nodes 95, which are generated on the antidust filter 118 and the first and the second vibrators 120, 121, occur at a position where the third driving electrode 132*c* is provided.

FIG. 9B shows driving signals to be output to the respective driving electrodes 132*a* to 132*d* under the eighth-order vibration mode. A fifth driving signal 86*a* shows a driving signal to be output to the first driving electrode 132*a*, and a sixth driving signal 86*b* shows a driving signal to be output to the second driving electrode 132*b*, respectively. Also, a seventh driving signal 86*c* of FIG. 9B shows a driving signal to be output to the third driving electrode 132*c*, an eighth driving signal 86*d* shows a driving signal to be output to the fourth driving electrode 132*d*, respectively.

In the eighth-order vibration mode, phases of driving signals to be output to the first and the second driving electrode 132*a*, 132*b*, a phase of a driving signal to be output to the third driving electrode 132*c*, and a phase of a driving signal to be applied to the fourth driving electrode 132*d* are different, respectively. Note that, the fifth to eighth driving signals 86*a* to 86*d* shown in FIG. 9B correspond to polar characters and magnitudes of the voltage applied to the first to fourth driving electrodes 132*a* to 132*d*.

There is phase difference at half cycle between the fifth or sixth driving signals 86*a*, 86*b* and the eighth driving signal 86*d* to be output to an electrode provided at a position where one vibration node 95 is sandwiched between the electrodes to be output the fifth or sixth driving signals 86*a*, 86*d* and the position (refer to FIG. 20B). Also, comparing the respective driving signals at same time, the fifth driving signal 86*a* and the sixth driving signal 86*b* have opposite polar character to that of the eighth driving signal 86*d*.

Also, a seventh driving signal 86*c* (FIG. 9B) which becomes 0 in spite of the time, is output to the third driving electrode 132*c* provided at a position including the node 95 of the vibration. Thereby, under the eighth-order vibration mode, an electric potential of the third driving electrode 132*c* is held at ground as similar with the first common electrode 134.

In this manner, in the eighth vibration mode, there are differences in phases between the third driving electrode 132*c* provided at a position including the node 95 of the vibration and the first, the second or the fourth driving electrodes 132*a*, 132*b*, 132*d* provided at positions not including the nodes 95 of the vibration.

Namely, in the eighth vibration modes, phases of the driving signals to be output to the respective driving electrodes 132*a* to 132*d* are changed in response to positioning relation between the nodes 95 of the vibration and the respective driving electrodes 132*a* to 132*d*. Thus, in the eighth-order vibration mode, the respective sections 136*a*, 186*b*, 136*d* of the first piezo shown in FIG. 20B receive deformations suitable to deforming direction of abdominal of the vibration in the bending vibration. Further, a third section 136*c* is not applied the voltage generating deformation, and a third section 136*c* is held at ground potential in response to that a deformation amount adjacent to the node 95 of the vibration is small. Note that, FIG. 20B shows vibration status of the antidust filter 118 at the time t2 shown in FIG. 9B.

In this manner, the antidust filter 118 may receive a force which amplifies oscillation of the bending vibration from the respective sections 136*a*, 136*b*, 136*d* of the first piezo 136.

Also, since the third section 136*c* is provided at a position including the node 95 of the vibration, the voltage of the third driving electrode 132*c* is held at ground. Namely, the antidust filter driving circuit 56 may drive the vibrator 120 with saving electric power and maintaining antidust effect, since the voltage of the third driving electrode 132*c* provided at the position including the nodes 95 and having small amplitude of the bending vibration is not changed.

Under a condition that the eighth-order bending vibration is generated shown in FIG. 20B by the driving electrodes 132*a* to 132*d*, the detection circuit 74 shown in FIG. 17A detects electric potential of the respective detection electrodes 133*a* to 133*d* of the second vibrator 121 (step S208).

A left side graph of FIG. 21B shows a sixth to ninth detecting signals 190*a* to 190*d* to be output from the first to fourth detection electrodes 133*a* to 133*d* in the eight bending vibration mode shown in FIG. 20B. In a step S209, vibration status of the antidust filter 118 is determined as to whether it is normal or not based on the detection signals 190*a* to 190*d*. Cycles T6 of the detection signals of the respective detection signals 190*a* to 190*d* substantially conforms to cycles of the bending vibrations generated on the antidust filter 118, amplitudes A6 to A9 of the detection signals 190*a* to 190*d* are substantially proportional to amplitudes of the bending vibration generated on the antidust filter 118.

Here, the third detection electrode 133*c* which corresponds to the third driving electrode 132*c* is provided at a position including the node 95 of the vibration, as shown in FIG. 20B. Thus, deformation amount of the third section 137*c* which is opposite to the third detection electrode is small, there is a case that the amplitude A8 of the eighth detection signal 190*c* is too small to inspect the vibration status of the antidust filter 118.

Contrary to the above, the first detection electrode 133*a*, the second detection electrode 133*b* and the fourth detection electrode 133*d* which correspond to the first driving electrode 132*a*, the second driving electrode 132*b* and the fourth driving electrode 132*d* are provided at positions not including the node 95 of the vibration. Therefore, detection signals having amplitudes which are available to inspect the vibration of the antidust filter 118 can be obtained from the first detection electrode 133*a*, the second detection electrode 133*b* and the fourth detection electrode 133*d*.

As mentioned above, the detection electrode of the present embodiment are provided as corresponding to the driving electrodes, it is possible to detect the vibration appropriately, even if the node 95 of the vibration occurs at the positions where the detection electrodes are provided. Namely, even in case of like this, since the driving electrodes to which the driving signals effective to generate the bending vibration are output, are existing, the vibration status of the antidust portion 111 can be inspected by the detection signals from the detection electrodes corresponding to those driving electrodes.

Also, in the eighth-order bending vibration mode, polar characters of the detection signals 190*a* to 190*d* may be adjusted in response to polar characters of the driving signals 86*a* to 86*d* (FIG. 9B) to be output to the corresponding driving electrodes 132*a* to 132*d*.

For example, in the eighth-order bending vibration mode, polar characters of voltage of the fifth driving signal 86*a* and the sixth driving signal 86*b* shown in FIG. 9B are inverse to the eighth driving signal 86*d*. Consequently, polar characters or the sixth detection signal 190*a* and the seventh detection signals 190*b* shown in FIG. 21B are overlapped with inverting polar characters thereof to the ninth detection signal 190*d*. However, in the eighth-order vibration mode, since the third driving electrode 132*c* is held at ground, the eighth detection signal 190*c* of the third detection electrode 133*c* is excluded from the overlapping. Because, the eighth detection signal 190*c* has small amplitude A8 and large noise ratio.

In this manner, by overlapping the detection signals 190*a* to 190*d* as polar characters thereof reversed according to relation of polar characters between the driving signals 86*a* to 86*d*, the tenth detection signal 190*e* shown at right side of FIG. 21B may be obtained. A tenth detection signal 190*e* has larger amplitude A10 than that of the fifth to ninth detection signal 190*a* to 190*d* and high detecting sensitivity of the bending vibration. Therefore, reliable inspection can be operated by inspecting vibration status of the antidust filter 118 with using the tenth detection signal 190*e* so as to reduce effects of background noise and the like.

Next, in a step S210 shown in FIG. 19B, the vibration mode selecting circuit 80 selects the seventh-order vibration mode. The vibration mode selecting circuit 80 instructs the antidust filter driving circuit 56 so as to drive the first vibrator 120 under the seventh bending vibration mode.

In a step S211, the antidust filter driving circuit 56 starts to drive the first vibrator 120 under the seventh-order bending vibration mode. In the present embodiment, the antidust filter driving circuit 56 outputs a driving signal shown in FIG. 9C to the respective driving electrodes 132*a* to 132*d* shown in FIG. 17A. Driving frequencies which are inverse numbers of driving frequencies T3 shown in FIG. 9C are swept from a first value f2+Δf which is higher by a predetermined value Δf than the standard resonance frequency f2 shown in FIG. 8 to a second value f2−Δf which is lower by a predetermined value Δf from the standard resonance frequency f2.

Figure 20C:
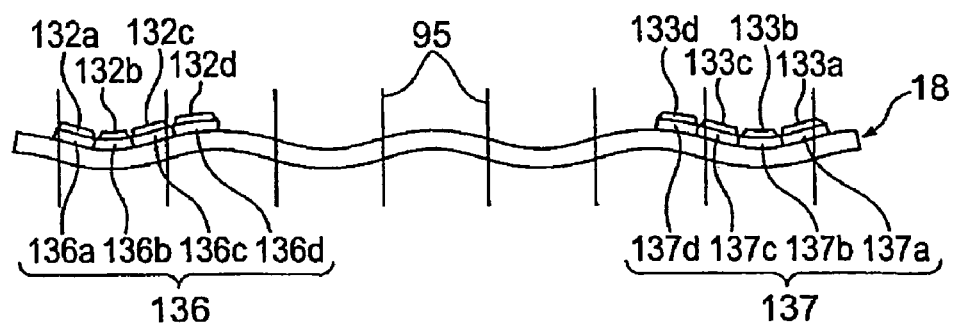
FIG. 20C is a pattern diagram showing an antidust filter in a status that seventh-order bending vibration is added by a vibrator.
Figure 20D:
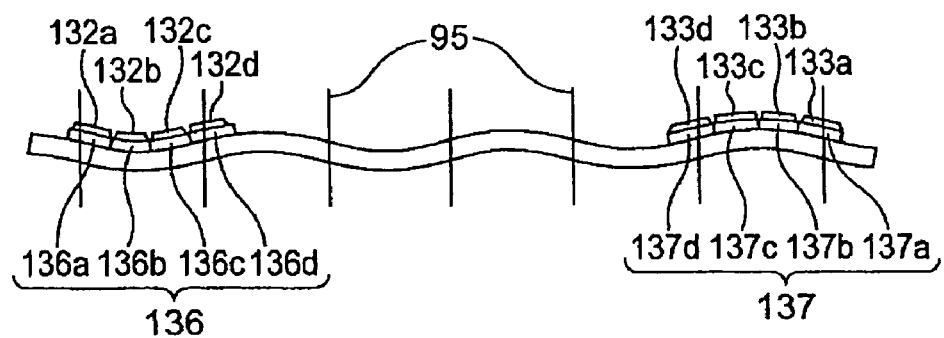
FIG. 20D is a pattern diagram showing an antidust filter in a status that sixth-order bending vibration is added by a vibrator.

In the seventh-order vibration mode, the seventh-order bending vibration is generated as shown in FIG. 20C. In the seventh-order bending vibration, a standing wave having eight vibration nodes 95 generated on the antidust filter 118. Also the first and the second vibrators 120, 121 vibrate in accordance with a standing wave generated on a surface of the antidust filter 118. Further, one vibration node 95 of the vibration nodes 95, which are generated on the antidust filter 118 and the first and the second vibrators 120, 121, occurs at a position where the first driving electrode 132*a* and another one vibration node 95 occurs at a position where the third driving electrode 132*c* is provided.

FIG. 9C shows driving signals to be output to the respective driving electrodes 132*a* to 132*d* under the seventh vibration mode. A ninth driving signal 87*a* shows a driving signal to be output to the first driving electrode 132*a*, a tenth driving signal 87*b* shows a driving signal to be output to the second driving electrode 132*b*, a eleventh driving signal 87*c* of FIG. 9C shows a driving signal to be output to the third driving electrode 132*c* and a twelfth driving signal 87*d* shows a driving signal to be output to the fourth driving electrode 132*d*, respectively. Also, the ninth to twelfth driving signals 87*a* to 87*d* shown in FIG. 9C correspond to polar characters and magnitudes of the voltage applied to the first to fourth driving electrodes 132*a* to 132*d*.

In the seventh bending vibration mode, the first and third driving electrodes 132*a*, 132*c* are provided at positions including the nodes 95 of the vibration, as shown in FIG. 20C. The driving signals 87*a*, 87*c* kept their output values being 0 constantly are output to the first and third driving electrodes 132*a*, 132*c* as shown in FIG. 9C. Thereby, the electric potentials of the first and third electrodes 132*a*, 132*c* in the seventh-order bending vibration mode are held as ground as similar with the first common electrode 134.

Also, as shown in FIG. 20C, the second driving electrode 132*b* is provided against the fourth driving electrode 132*d* by sandwiching one vibration node 95. As shown in FIG. 9C, there is a half cycle of phase shifting between the tenth driving signal 87*b* to be output to the second driving electrode 132*b* and the twelfth driving signal 87*d* to be output to the fourth driving electrode 132*d*. Also, comparing the respective driving signals at the same time, the tenth driving signal 87*b* is being inverse polar character to the twelfth driving signal 87*d*. Note that, the effects obtained by changing the driving signals are similar with the eighth vibration mode. Also, FIG. 20C shows vibration status of the antidust filter 118 at a time T3 shown in FIG. 3.

In a condition that the seventh bending vibration shown in FIG. 20C is generated by the driving electrodes 132*a* to 132*d*, the detection circuit 74 shown in FIG. 17A detects potentials of the respective detection electrodes 133*a* to 133*d* of the second vibrator 121 (step S212).

A graph left side of FIG. 21C shows an eleventh to fourteenth detection signals 191*a* to 191*d* to be output from the first to fourth detection electrodes 133*a* to 133*d*. In a step S213, vibration status of the antidust filter 118 is determined as to whether it is normal or not based on the detection signals 191*a* to 191*d*. A cycle T7 of the detection signals 191*a* to 191*d* substantially conform with a cycle of bending vibration generated on the antidust filter 118, amplitudes A11 to A14 of the detection signals 191*a* to 191*d* are substantially proportional to amplitudes generated on the antidust filter 118.

Here, the first detection electrode 133*a* corresponding to the first driving electrodes 132*a* and third detection electrode 133*c* corresponding to the third driving electrode 132*c* are provided at positions including the nodes 95 of the vibration, as shown in FIG. 20C. Thus, deformation amounts of the first and third sections 137*a*, 137*c* are small, and there is a case that the amplitudes A11, A13 of the eleventh and thirteenth detection signals 191*a*, 191*c* are too small to use vibration inspection.

Contrary to the above, the second detection electrode 133*b* corresponding to the second driving electrode 132*b* and the fourth detection electrode 133*d* corresponding to the fourth driving electrode 132*d* are provided at positions excluding the node 95 of the vibration. Therefore, driving signals having amplitudes which are available to inspect the vibration of the antidust filter 118 can be obtained from the second detection electrode 133*b* and the fourth detection electrode 133*d*.

As mentioned above, since the detection electrodes of the present embodiment are provided as corresponding to the driving electrodes, it is possible to detect the vibration appropriately, even if the nodes 95 of the vibration generated at the positions where the detection electrodes are provided. Namely, even in case of like this, since the driving electrodes to which the driving signals effective to generate the bending vibration are output are existing, the vibration status of the antidust portion 111 can be inspected by the detection signals from the detection electrodes corresponding to those driving electrodes.

Also, in the seventh bending vibration mode, polar characters of the detection signals 191*a* to 191*d* may be adjusted in response to polar characters of the driving signals 87*a* to 87*d* (FIG. 9C) to be output to the corresponding driving electrodes 132*a* to 132*d*. The fifth detection signal 191*e* shown in a right side of FIG. 21C is a signal overlapped the twelfth detection signal 191*b* and the fourteenth detection signal 191*d* with inverting polar characters of either one of the signals.

A fifteenth detection signal 191*e* has the larger amplitude A15 of the signal than that of the eleventh to fourteenth detection signals 191*a* to 191*d* and high detecting sensitivity of the bending vibration. Therefore, reliable inspection can be operated by inspecting vibration status of the antidust filter 118 with using the fifteenth detection signal 191e so as to reduce effects of background noise and the like.

Next, in a step S214 shown in FIG. 19B, the vibration mode selecting circuit 80 selects the sixth-order vibration mode. The vibration mode selecting circuit 80 instructs the antidust filter driving circuit 56 so as to drive the first vibrator 120 under the sixth-order bending vibration mode.

In a step S215, the antidust filter driving circuit 56 starts to drive the first vibrator 120 under the sixth bending vibration mode. In the present embodiment, the antidust filter driving circuit 56 outputs a driving signal shown in FIG. 9D to the respective driving electrodes 132a to 132d shown in FIG. 17A. Driving frequencies which are inverse numbers of driving frequencies T4 shown in FIG. 9D are swept from a first value f1+Δf which is higher by a predetermined value Δf than the standard resonance frequency f1 shown in FIG. 8 to a second value f1−Δf which is lower by a predetermined value Δf from the standard resonance frequency f1.

In the sixth vibration mode, the sixth-order bending vibration is generated as shown in FIG. 20D. In the sixth-order bending vibration, a standing wave having seven vibration nodes 95 are generated on the antidust filter 118. Also the first and the second vibrators 120, 121 vibrate in accordance with a standing wave generated on a surface of the antidust filter 118. Further, one of the vibration nodes 95 which are generated on the antidust filter 118 and the first and the second vibrators 120, 121, occurs at a position where the first driving electrode 132a and another one vibration node 95 occurs at a position where the fourth driving electrode 132d is provided.

In the driving signals shown in FIG. 9D, a thirteenth driving signal 88a shows a driving signal to be output to the first driving electrode 132a, a fourteenth driving signal 88b shows a driving signal to be output to the second driving electrode 132b, a fifteenth driving signal 88c shows a driving signal to be output to the third driving electrode 132c and a sixteenth driving signal 88d shows a driving signal to be output to the fourth driving electrode 132d, respectively. Also, the thirteenth to sixteenth driving signals 88a to 88d shown in FIG. 9D correspond to polar characters and magnitudes of the voltage applied to the first to fourth driving electrodes 132a to 132d.

In the sixth-order bending vibration mode, the first and fourth detection electrodes 132a, 132d are provided at positions including the nodes 95 of the vibration, as shown in FIG. 20D. The thirteenth and sixteenth driving signals 88a, 88d kept their output values being 0 constantly are output to the first and fourth driving electrodes 132a, 132d as shown in FIG. 9D. Thereby, the electric potentials of the first and fourth electrodes 132a, 132d in the sixth-order bending vibration mode are held as ground as similar with the first common electrode 134.

Also, as shown in FIG. 20D, the second driving electrode 132b and the third driving electrode 132c are provided between two adjacent nodes 95 of vibration. As shown in FIG. 9D, the fourteenth driving signal 88b to be output to the second driving electrode 132b and the fifteenth driving signal 88c to be output to the third driving electrode 132c are that these phases are substantially conformed. Also, comparing the respective driving signals at the same time, the fourteenth driving signal 88b is being an identical polar character to the fifteenth driving signal 88c.

In the sixth-order bending vibration mode, since polar characters of two driving signals to be output to the second driving electrode 132b and the third driving electrode 132c which are provided between the two adjacent vibration nodes 95 are conformed, deformation directions (a direction along the optical axis) of the second and third sections are conformed, it may be provided the large vibration acceleration to the surface of the antidust filter. Therefore, it is available to vibrate the antidust filter efficiently.

Also, since the first and fourth sections 136a, 136d are provided at positions including the nodes 95 of the vibration, the voltage of the first and fourth driving electrodes 132a, 132d are held at ground. Namely, the antidust filter driving circuit 56 may drive the vibrator 120 with saving electric power and maintaining antidust effect, due to the voltage of the first and fourth driving electrodes 132a, 132d provided at the positions including the nodes 95 and having small amplitude of the bending vibration are not changed. Note that, FIG. 20D shows vibration status of the antidust filter 118 at the time t4 shown in FIG. 9D.

Under a condition that the sixth-order bending vibration is generated shown in FIG. 20D by the driving electrodes 132a to 132d, the detection circuit 74 shown in FIG. 17A detects electric potential of the respective detection electrodes 133a to 133d of the second vibrator 121 (step S216).

Figure 21D:
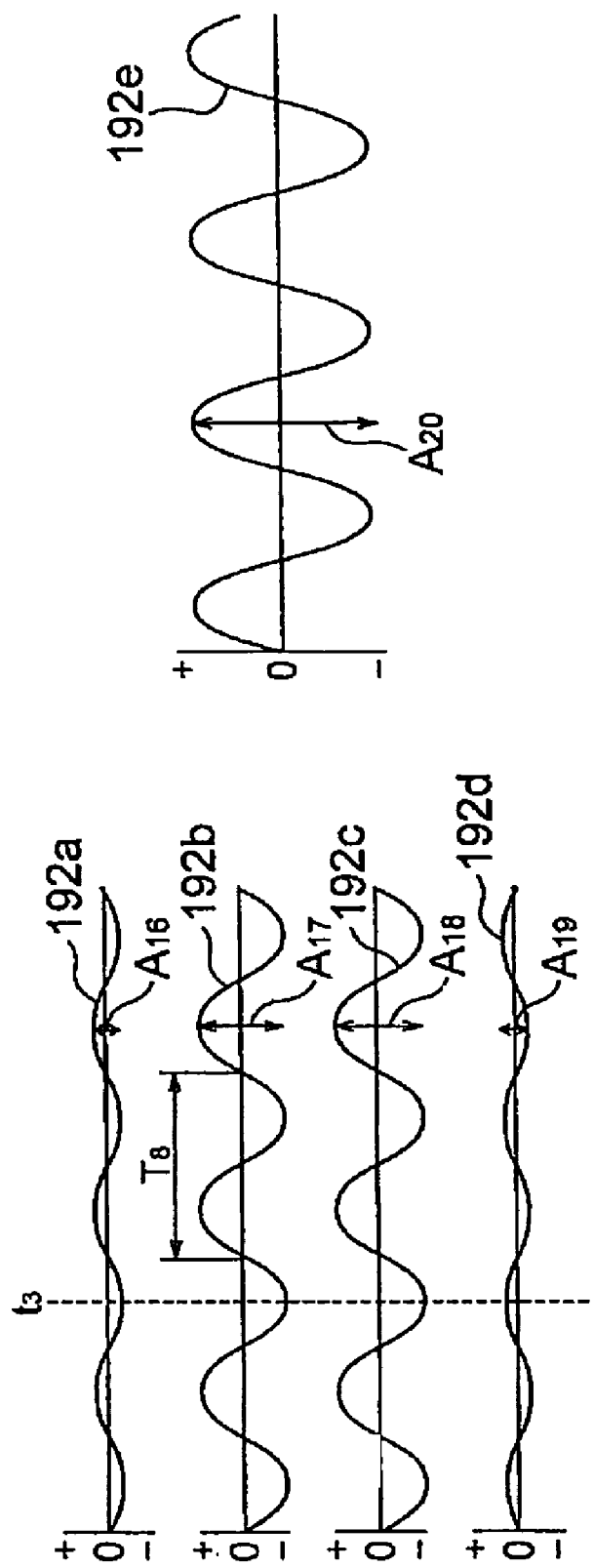
FIG. 21D shows an example of a signal to be detected by a detecting electrode when sixth-order bending vibration is occurred.

A left side graph of FIG. 21D shows a sixteenth to nineteenth detecting signals 192a to 192d to be output from the first to fourth detection electrodes 133a to 133d in the sixth-order bending vibration mode shown in FIG. 20D. In a step S217, vibration status of the antidust filter 118 is determined as to whether it is normal or not based on the detection signals 192a to 192d. Cycles T8 of the detection signals of the respective detection signals 192a to 192d substantially conforms to cycles of the bending vibrations generated on the antidust filter 118, amplitudes A16 to A19 of the detection signals 192a to 192d are substantially proportional to amplitudes of the bending vibration generated on the antidust filter 118.

Here, the first detection electrode 133a which corresponds to the first driving electrode 132a and the fourth detection electrode 133d which corresponds to the fourth driving electrode 132d are provided at positions including the nodes 95 of the vibration, as shown in FIG. 20D. Thus, deformation amounts of the first and fourth sections 137a, 137d which are opposite to the first and fourth detection electrodes 133a, 133d are small, there is a case that the amplitudes A16, A19 of the sixteenth and nineteenth detection signals 192a, 192d are too small to inspect the vibration status of the antidust filter 118.

Contrary to the above, the second detection electrode 133b which correspond to the second driving electrode 132b and the third detection electrode 133c which correspond to the third driving electrode 132c are provided at positions excluding the nodes 95 of the vibration. Therefore, detecting signals having amplitudes which are available to inspect the vibration of the antidust filter 118 can be obtained from the second detection electrode 133b and the third detection electrode 133c.

As mentioned above, the detection electrode of the present embodiment are provided as corresponding to the driving electrodes, it is possible to detect the vibration appropriately, even if the node 95 of the vibration generated at the positions where the detection electrodes are provided. Namely, even in case of like this, since the driving electrodes to which the driving signals effective to generate the bending vibration are output, are existing, the vibration status of the antidust filter 118 can be inspected by the detection signals from the detection electrodes corresponding to those driving electrodes.

Also, in the sixth bending vibration mode, polar characters of the detection signals 192a to 192d may be adjusted in response to polar characters of the driving signals 88a to 88d (FIG. 9D) to be output to the corresponding driving electrodes 132a to 132d. The twentieth detection signal 192e shown in a right side of FIG. 21D is a signal overlapped the seventeenth detection signal 192*b* and the eighteenth detection signal 192*c* without inverting polar characters.

A twentieth detection signal 192*e* has an larger amplitude A20 of the signal than the sixteenth to nineteenth detection signals 192*a* to 192*d* and high detecting sensitivity of the bending vibration. Therefore, reliable inspection can be operated by inspecting vibration status of the antidust filter 118 with using the twentieth detection signal 192*e* so as to reduce adverse effects of background noise and the like.

From the ninth vibration mode to the sixth vibration mode is finished, a series of dust removing operation is finished (step S218). When finishing the dust removing operation, the body CPU 50 shown in FIG. 14 may display a result of vibration inspection of the antidust filter 118 on the display portion 55, or may record the result to the EEPROM 60 and the like. When malfunction is detected in any vibration modes, the body CPU 50 may causes displaying a predetermined performance to the display portion 55. Also, the body CPU 50 may cause to turn off the dust removing operation, or execute a re-inspection of the vibration status to the antidust filter driving circuit 56.

Driving times of the respective bending vibration can be set to appropriate time in response to amount and kind of the dust adhered to the antidust filter. For example, it is available to set driving times of the respective vibration modes are 200 to 300 msec, a time of a series of the dust removing operation from start (step S201) to the finish (step S210) may be set to an about 1.0 sec. As above, the antidust driving filter 56 in the present embodiment causes to drive the first vibrator 120 by receiving controlling from the body CPU 50 so as to perform the dust removing operation. The body CPU 50 may control the antidust filter driving circuit 56 so that the respective driving electrodes 132*a* to 132*d* output the driving signals whose phases are different respectively. Since the respective driving electrodes 132*a* to 132*d* are controlled by the driving signals whose phases are different respectively, the respective sections 136*a* to 136*d* of the piezo 136 corresponding to the respective electrodes may be changeable so as to provide forces appropriate to the bending vibration generated on the antidust filter 118.

Also, as orders of the bending vibration generated on the antidust filter 118 are not limited to sixth to ninth, it may be available to adopt any combination of orders, if the combination of orders may change the node position of the vibration. By changing position of node of vibration at the bending vibration, it becomes available to remove away the dust and the like at whole surface of the antidust filter, and the antidust effects are increased. Namely, in a specific vibration mode, the dust and the like remained without blown away at the node 95 of the vibration on the surface of the antidust filter 118, is blown away in the other vibration mode by the acceleration of the vibration, because the node 95 position of the vibration is changed. As a result of this, it becomes possible to remove the dust at whole area of the outer face 118*a* of the antidust filter 118.

The antidust portion 111 according to the present embodiment comprises the second vibrator 121 to detect vibration of the antidust filter 118 in addition to the first vibrator 120 to generate vending vibration to the antidust filter 118. The detection electrodes 133*a* to 133*d* of the second vibrator 121 are provided as corresponding to the driving electrodes 132*a* to 132*d* of the first vibrator 120, as shown in FIG. 20A to FIG. 20D. Therefore, detection signals corresponding to the driving signals to be output to the respective driving electrodes 132*a* to 132*d* may be obtained from the corresponding detection electrodes 133 at 133*d*, it is available to inspect the vibration of the antidust filter 118 as to whether there is malfunction or not.

Also, the second vibrator 121 including a plurality of detection electrodes may detect the vibration of the antidust filter 118 by at least one of detection electrodes provided at positions where abdominal of the vibration is included, even under the vibration mode that the node 95 of the vibration occurs at a position of other detection electrode is provided. Thereby, the antidust portion 111 may inspect the vibration status appropriately even under high order vibration modes in which many vibration nodes 95 generated to the antidust filter 118.

Also, as shown in right side graphs of FIG. 21A to FIG. 21D, in the inspection using the antidust portion 111 according to the present embodiment, the sensitivity of the vibration detection may be increased due to overlap detection signals with adjusting polar characters of the detection signals obtained from a plurality of the detection electrodes. The adjusting polar characters is performed that, the detection signals having same polar characters are overlapped as they are, the detection signals having different polar characters are overlapped after inverting either one of the polar characters.

Further, when the inspection for the dust removing is not operated, the bending vibration may be generated on the antidust filter 118 by connecting the detection electrodes 133*a* to 133*d* shown in FIG. 17A with the antidust filter driving circuit 56 by the switching circuit 70 so as to cooperate the second vibrator 121 and the first vibrator 120. In this case, since forces to generate the bending vibration are given from both the first vibrator 120 and the second vibrator 121, deformation acceleration of the surface of the antidust filter 118 becomes larger, and the dust removing effect can be increased.

Fifth Embodiment

Figure 22A:
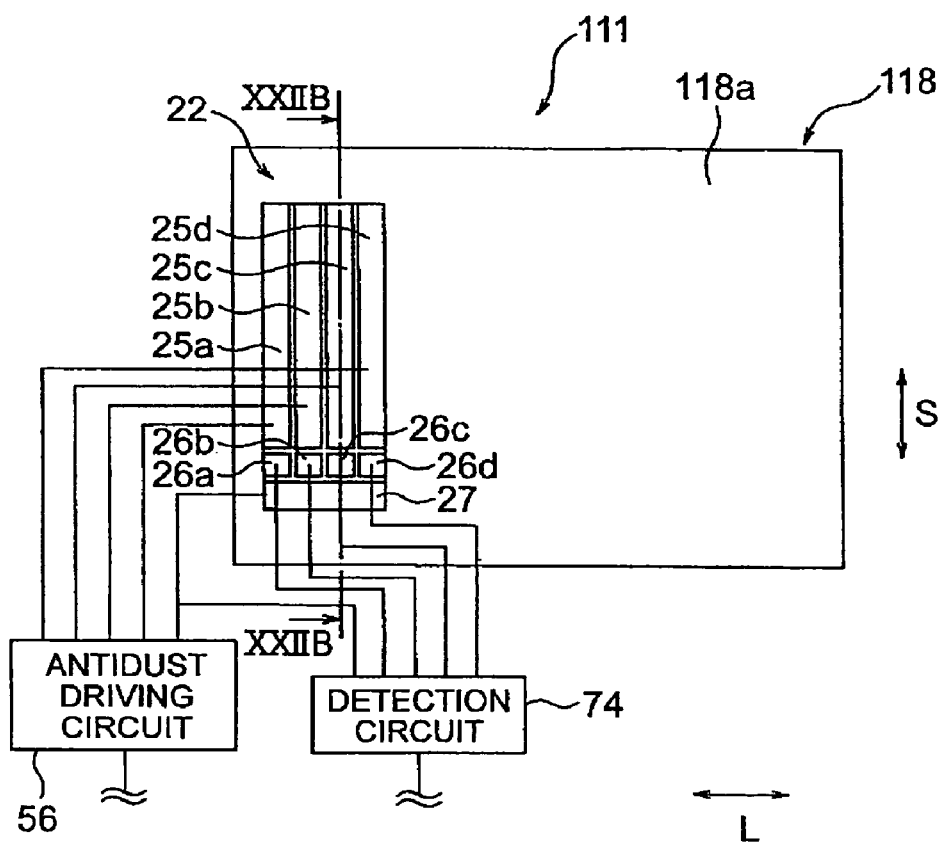
FIG. 22A is a plane view of an antidust portion according to a fifth embodiment of the present invention.
Figure 22B:
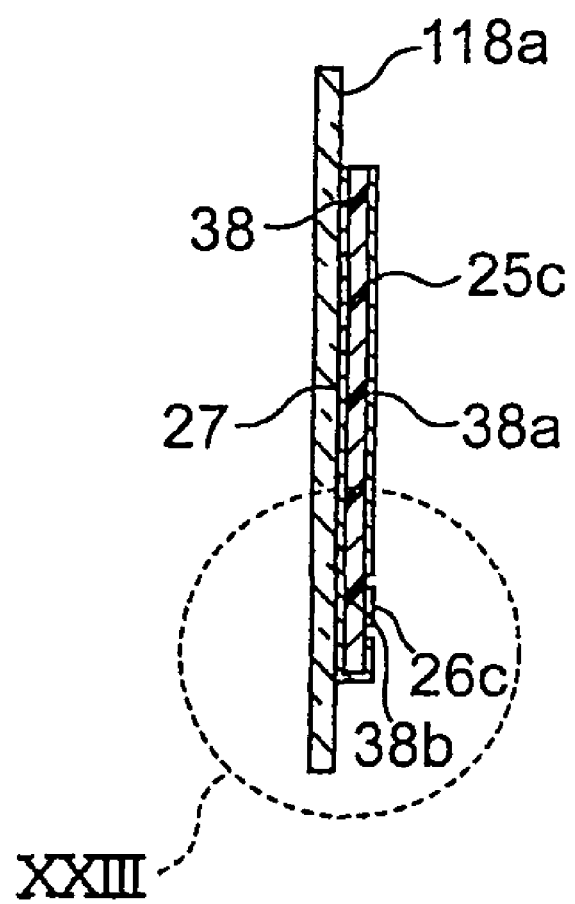
FIG. 22B is a cross sectional view along a line XXIIB-XXIIB in FIG. 22A.

FIG. 22A is a plane view of an antidust portion 111 according to a fifth embodiment of the present invention, FIG. 22B is a cross sectional view along a line XXIIB-XXIIB in FIG. 22A. In an antidust portion 111 according to the fifth embodiment, one third vibrator 22 is provided on an outer face of an antidust filter 118. Although a camera comprising the antidust portion according to the fifth embodiment differs at points that the third vibrator 22 is provided on the antidust filter 118 and a detection circuit 74 is directly connected with a detection electrode without a switching circuit, other constitutions are an identical with the fourth embodiment.

The third vibrator 22 is mounted at one side of a long side direction of an antidust filter 118. The third vibrator 22 comprises four sheets of a first to fourth driving electrodes 25*a* to 25*d* which are electrically insulated respectively and arranged along with the longitudinal direction L. Also, the third vibrator 22 comprises four sheets of a first to fourth detection electrode 26*a* to 26*d* arranged on extended portions from first to fourth driving electrodes 25*a* to 25*d* along a short side direction S. The first to fourth detection electrodes 26*a* to 26*d* are insulated respectively, also, the adjacent driving electrodes and detection electrodes are insulated respectively.

Further, as shown in a cross sectional view of FIG. 22, the third vibrator 22 comprises a third common electrode 27 equipped on an outer face 118*a* of the antidust filter 118. A third piezo 38 is provided between the third common electrode 27 and the driving electrodes 25*a* to 25*d*, the detection electrodes 26*a* to 26*d*.

Figure 23:
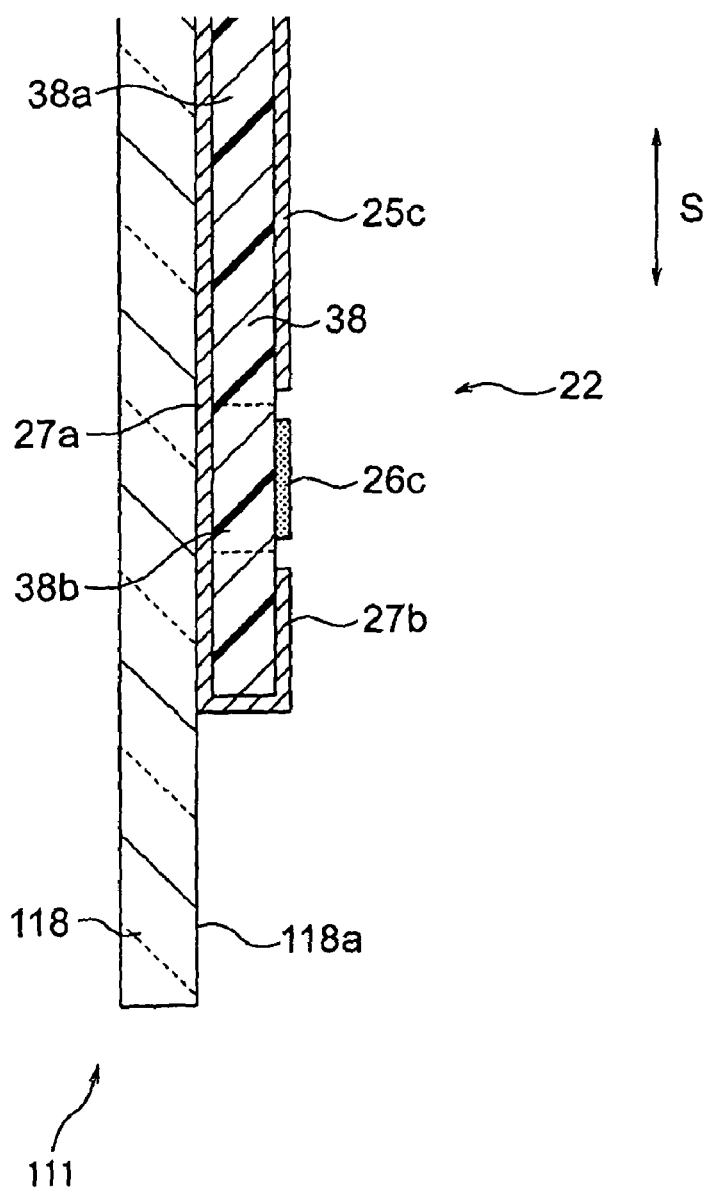
FIG. 23 is a main enlarged cross sectional view enlarging one portion of the cross sectional view of FIG. 22B.

FIG. 23 is an enlarged drawing of one portion of a cross sectional view of the antidust portion 111 shown in FIG. 22B.

The third common electrode 27 comprises a first section 27a opposite to driving electrode such as a third driving electrode 25c and the like, and a second section 27b as bent from the first section 27a. The first section 27a is provided on a surface of the antidust filter 118 side in the third piezo 38. The second section 27b is provided at a surface opposite to the surface of the antidust filter 118 side in the third piezo 38. Namely, on the surface and the opposite surface of the antidust filter 118 in the third piezo 38, the driving electrode (the third driving electrode 25c) and the detection electrode (the third detection electrode 26c) are arranged along with the short side direction of the antidust filter 118.

The detection electrodes 26a to 26c and the driving electrodes 25a to 25d are divided as four sections along with the long side direction L of the antidust filter 118, contrary, the third common electrode 27 and the third piezo are formed integrally.

The first to fourth driving electrodes 25a to 25d are electrically connected with an antidust filter driving circuit 56 shown in FIG. 22A. The antidust filter driving circuit 56 outputs driving signals selected by a vibration mode selecting circuit 80 shown in FIG. 14 to the respective first to fourth driving electrodes 25a to 25d individually. As similar with the fourth embodiment, the antidust filter driving circuit 56 may generate a bending vibration on the antidust filter 118 by changing voltages provided to the first to fourth driving electrodes 25a to 25d so as to deform the third piezo 38.

Contrary to the above, the first to fourth detection electrodes 26a to 26d are electrically connected with a detection circuit 74 shown in FIG. 22A. As similar with the fourth embodiment, the detection circuit 74 detects change of the voltage according to deformation of the third piezo 38 (refer to FIG. 22B) provided between the respective detection electrodes 26a to 26d and the third common electrode 27, via the detection electrodes 26a to 26d. The detection circuit 74 may inspect vibration status of the antidust filter 118 on the basis of detection signals to be output from the detection electrodes 26a to 26d.

The third piezo 38 shown in FIG. 22B comprises a driver 38a to be deformed by voltage added from the driving electrodes so as to generate bending vibration to the antidust filter 118 and a detector 38b which may generate electrical charge on the detection electrodes by the bending vibration transmitted from the antidust filter 118. Although a size of the detector 38b is not particularly limited, if it may detect bending vibration generated on the antidust filter 118, 5% to 10% degree of the piezo 38 and the like is preferable. This is because, if the driver 38a is larger, further large force may be provided to the antidust filter 118.

With respect to the antidust portion 111 according to the fifth embodiment shown in FIG. 22A, as similar with the fourth embodiment, it may perform dust removing by generating bending vibration on the antidust filter 118 as shown flow charts of FIG. 19A and FIG. 19B. Also, it may perform inspection of vibration generated on the antidust filter 118 with performing the dust removing.

A camera comprising the antidust portion 111 according to the fifth embodiment, although the detection electrodes 26a to 26d cannot be used to drive the antidust filter 118 unless the switching circuit is added. Except for that point, it performs the effect similar with the antidust portion 111 according to the fourth embodiment. Also, since the antidust portion 111 may inspect bending vibration generated on the antidust filter 118 at the same time with generating bending vibration to the antidust filter 118 by one third vibrator 22, it may contribute to downsizing and to decreasing the number of components.

Sixth Embodiment

Figure 24:
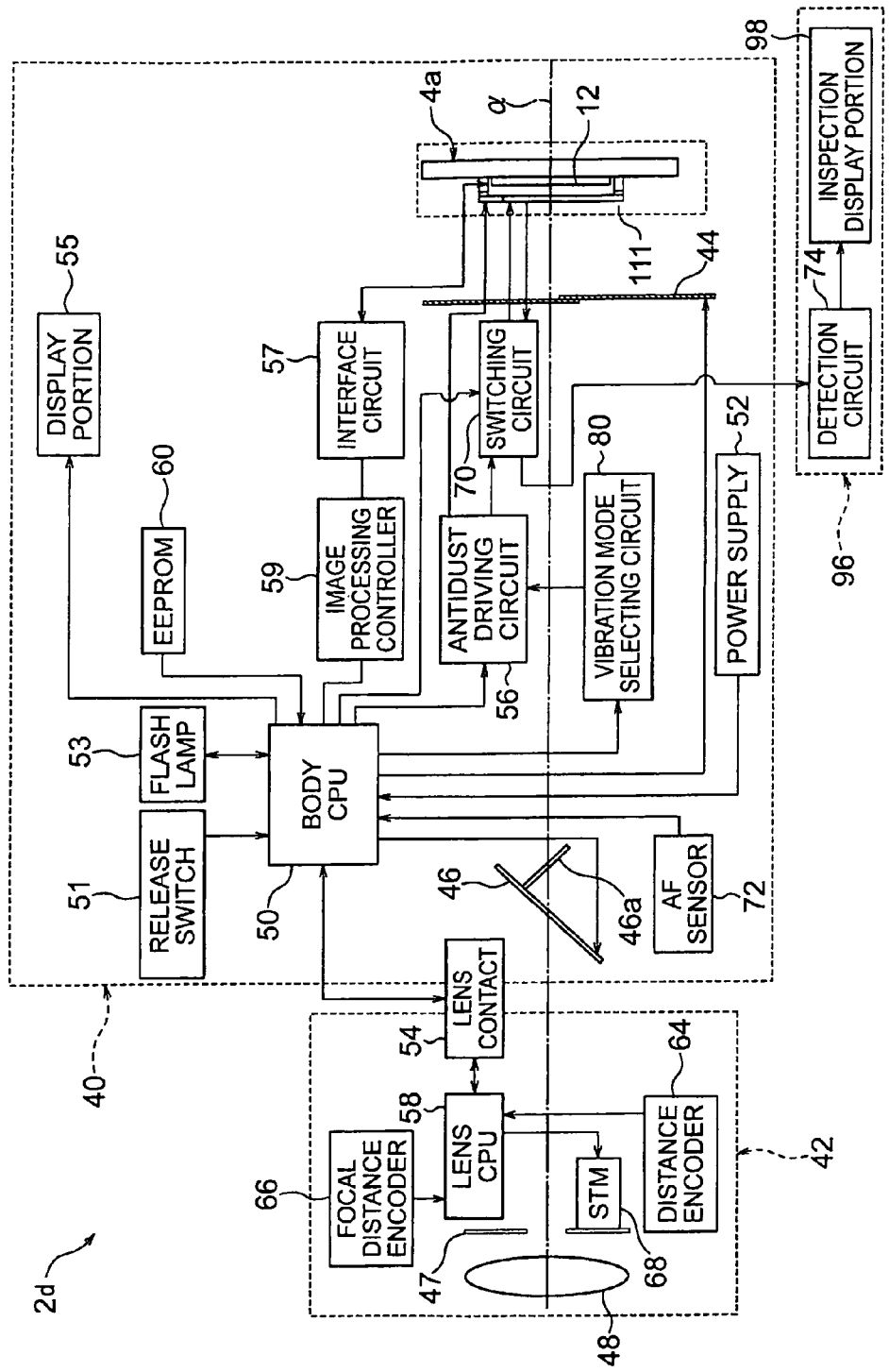
FIG. 24 is whole block diagram of a camera and an inspection device according to a sixth embodiment of the present invention.

FIG. 24 is a block diagram showing a camera according to a sixth embodiment. The camera 2d according to the sixth embodiment does not comprise a detection circuit 74 in a camera body 40. Other constitutions are similar with the camera according to the fourth embodiment shown in FIG. 14 and the like.

The camera shown in FIG. 24 is connected with an inspection apparatus at the time of vibration inspection performed in manufacturing process and the like. A detection circuit 74 is provided at the inspection apparatus 96 and the detection circuit 74 is electrically connected with a second vibrator 121 via a switching circuit 70.

Therefore, in inspection operations by flow charts of FIGS. 19A, 6B, the detection signals 189 to 192 shown in FIG. 21A to FIG. 21D are displayed in an inspection display portion 98 and the like provided on the inspection apparatus 96. In this manner, in the camera according to the sixth embodiment, since the detection circuit 74 is not provide in the camera body 40 internally, it is a simple system compared with the constitution shown in FIG. 14. Note that, in a vibration inspection operated in the manufacturing process and the like of the camera, the camera can be selected as failure article and conforming article in response to an inspection result.

Other Embodiments

As shown in FIG. 9A to FIG. 9D, although the driving signals in the above embodiments are rectangular waves, as driving signals are not limited thereto, for example, it may be driving signals such as sine wave whose outputs thereof changing transitionally. Also, phase differences between the respective driving signals may be set as arbitrarily values to be set appropriately in response to positional relation between a node 95 of vibration and corresponding electrode.

Also, the body CPU 50 is not only used to inspect the antidust portion 111 operates normally or not, but the body CPU 50 may change the driving signals to be output by the antidust filter driving circuit 56 with using detection signals. For example, the body CPU 50 may remove the dust adhered on the antidust filter by detecting the peak of vibration acceleration shown in FIG. 8 from the detected signal so that the antidust filter 118 is bending vibrated under vibration frequencies adjacent to the peak of the vibration acceleration.

Further, arranging directions of the driving electrodes and the detection electrodes may be arranged along with propagation direction of the bending vibration, also it may be arranged along a short side direction S of the antidust filter shown 118 in FIG. 17A and the like. With respect to numbers of the driving electrodes and the detecting electrodes, they may be changed in response to orders of vibration and the like to be generated on the antidust filter 118. As well, above mentioned embodiments may be combined with each other accordingly.

The invention claimed is:
1. A vibration device comprising;
 a vibrator which generates bending vibration on a predetermined member; and
 a controller which controls a driver to drive the vibrator, wherein;
  the vibrator comprises a plurality of driving electrodes electrically insulated respectively, the controller controls the driver to make phases of driving signals respectively output to the plurality of driving electrodes changeable relatively and adjust an order of the bending vibration, wherein
the driving electrodes comprise a first driving electrode arranged at a position including a vibration node and a second driving electrode arranged at a position not including a vibration node,
the driver causes to differ a phase of a driving signal to be output to the first driving electrode and a phase of a driving signal to be output to the second driving electrode.

2. The vibration device as set forth in claim 1, wherein; when varying the bending vibration order, number of the driving electrodes existing between adjacent two vibration nodes is changed.

3. The vibration device as set forth in claim 1, wherein; number of the driving electrodes existing between adjacent two vibration nodes are more than two.

4. The vibration device as set forth in claim 1, wherein; the controller changes the phase of the driving signal relative to a positioning relation of a vibration node and the driving electrodes.

5. The vibration device as set force in claim 1, wherein; in one of vibration modes, the driver causes to differ a phase of driving signal to be output to a first driving electrode and a phase of a driving signal to be output to a second driving electrode in which a vibration node exists the first and second driving electrodes.

6. The vibration device as set force in claim 1, wherein; a phase difference of a driving signal to be output from the driver to a first driving electrode and a driving signal to be output to a second driving electrode positioned to sandwich one of vibration nodes between the first and second driving electrodes is 180° in one of vibration modes.

7. The vibration device as set force in claim 1, wherein; a plurality of the driving electrodes are arranged between two adjacent vibration nodes, and
the driver is controlled that polarities of the driving signals to be output to the plurality of driving electrodes arranged between two adjacent vibration nodes are the same with each other.

8. The vibration device as set forth in claim 1, wherein; the vibrator comprises a piezoelectric element, and a common electrode arranged on the piezoelectric element opposite to the driving electrode,
the driver outputs a driving signal so as to hold electric potential of the common electrode as substantially constantly.

9. The vibration device as set forth in claim 1, wherein; the vibrator comprises a piezoelectric element and a common electrode arranged on the piezoelectric element opposite to the driving electrode,
the driver outputs the driving signals capable of holding electrical potential of the common electrode substantially constantly the driving electrode arranged at a position where a vibration node is included.

10. The vibration device as set forth in claim 1, wherein; the vibrator comprises a piezoelectric element and a common electrode,
the common electrode includes a first portion arranged on a first face of the piezoelectric element opposite to the driving electrode, and a second portion arranged on a second face of the piezoelectric element as bent from the first portion to sandwich the piezoelectric element.

11. An antidust device comprising the vibration device as set forth in claim 1, wherein;
the predetermined member is a light transmissive member passing through a light guided by an optical system,
the light transmissive member is provided between an image pick-up element obtaining an image from the optical system and the optical system.

12. A camera comprising the antidust device as set forth in claim 11.

13. A method for inspecting the vibration device as set forth in claim 1 comprising steps of;
connecting at least one of the driving electrode with a detector which detects a detection signal generated by the driving electrode, instead of the driver,
detecting the detection signal generated by the driving electrode connected with the detector to inspect vibration status of the predetermined member.

14. The method for inspecting the vibration device as set forth in claim 13, wherein;
the driving electrode connected with the detector is arranged at a position where the vibration node is not included in at least one of vibration modes.

15. A method for manufacturing a vibration device using a method for inspecting the vibration device as set forth in claim 13.

16. An antidust device comprising the vibration device as set forth in claim 1, wherein:
the vibrator comprises a plurality of detection electrodes electrically insulated respectively and electrically connected with a detector which detects vibration of the predetermined member, and the detection electrodes are provided to correspond to the driving electrodes.

17. The vibration device as set forth in claim 16 further comprising;
a switcher to switch a first status that the detection electrode is connected with the detector, and a second status that the detection electrode is connected with the driver.

18. The vibration device as set forth in claim 16, wherein; the detection electrodes are provided respectively at positions where displacement generated by the bending vibration are substantially synchronized with corresponding the driving electrodes.

19. The vibration device as set forth in claim 16 wherein: the driver is controlled to make a voltage given to one of the driving electrodes variable and generate vibrations having different orders.

20. The vibration device as set forth in claim 16 wherein; the detector adjusts polarities of detection signals detected from the detection electrodes in response to polarities of driving signals to be output to the driving electrodes.

21. The vibration device as set forth in claim 16, wherein; the driving electrodes are provided on one end portion of the predetermined member, and
the detecting electrodes are provided on the other end portion of the predetermined member.

22. The vibration device as set forth in claim 16 wherein the vibrator comprises;
a piezoelectric element and a common electrode arranged on the piezoelectric element opposite to the driving electrodes, and
the common electrode is provided on a surface of the predetermined member.

23. The vibration device as set forth in claim 16, wherein; the predetermined member is an optical component passing through a light guided by an optical system, and the optical component is provided between an image pickup element obtaining an image from the optical system and the optical system.

24. A camera comprising the vibration device as set forth in claim 16.

25. A method for inspecting the vibration device as set forth in claim 1, the method comprising:
- connecting the driver electrically with a first electrode of the vibrator,
- outputting a driving signal to the first electrode so as to occur the bending vibration,
- connecting electrically a detector which detects the bending vibration with a second electrode of the vibrator, and
- detecting the bending vibration based on a detection signal from the detector.

26. The method for inspecting a vibration device as set forth in claim 25, wherein;
- the detector is connected with a display device which is available to display the detection signal.

27. The method for inspecting a vibration device as set forth in claim 25, wherein;
- the second electrode is electrically connectable with the driver, and
- a connection of the second electrode is switched between the driver and the detector.

28. A method for manufacturing a vibration device using the method for inspecting a vibration device as set forth in claim 25.

29. A vibration method using the vibration device as set forth in claim 1, the method comprising:
- generating bending vibration of an order to a predetermined member by using vibrator having a plurality of driving electrodes electrically insulated with each other,
- changing relative phases of driving signals to be output respectively to plurality of the driving electrodes, and
- generating bending vibration of another order different from the order to the predetermined member by using the vibrator.

30. The vibration method as set forth in claim 29, wherein;
number of the driving electrodes existing between adjacent two vibration nodes is different between the bending vibration of the first order and the bending vibration of the second order.

31. The vibration method as set forth in claim 29, wherein;
a phase of the driving signal is changed in connection with a positional relation between vibration node of the bending vibration and the driving electrodes.

32. The vibration method as set forth in claim 29, wherein;
the driving signals are different in phase between the driving electrode arranged at a position including vibration node and the driving electrode arranged at a position not including vibration node.

33. The vibration method as set forth in claim 29, wherein;
there is 180° phase difference of the driving signals between a first driving electrode and a second driving electrode arranged at a position where one vibration node is included between the first and second driving electrodes.

34. The vibration method as set forth in claim 29, wherein;
polar properties of the driving signals are conformed between the driving electrodes arranged between adjacent two vibration nodes.

* * * * *